United States Patent
Senapati et al.

(10) Patent No.: US 12,498,349 B2
(45) Date of Patent: Dec. 16, 2025

(54) SCALABLE HIGH-THROUGHPUT ISOELECTRIC FRACTIONATION PLATFORM FOR EXTRACELLULAR NANOCARRIERS

(71) Applicant: University of Notre Dame du Lac, South Bend, IN (US)

(72) Inventors: Satyajyoti Senapati, South Bend, IN (US); Hsueh-Chia Chang, South Bend, IN (US); Himani Sharma, South Bend, IN (US); David Go, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 468 days.

(21) Appl. No.: 18/173,248

(22) Filed: Feb. 23, 2023

(65) Prior Publication Data
US 2023/0314371 A1  Oct. 5, 2023

Related U.S. Application Data

(60) Provisional application No. 63/268,483, filed on Feb. 24, 2022.

(51) Int. Cl.
*G01N 27/447* (2006.01)
*B01L 3/00* (2006.01)
*G01N 33/543* (2006.01)

(52) U.S. Cl.
CPC .. *G01N 27/44795* (2013.01); *B01L 3/502761* (2013.01); *G01N 27/44782* (2013.01); *G01N 27/44791* (2013.01); *G01N 33/54386* (2013.01); *B01L 2200/0652* (2013.01);
(Continued)

(58) Field of Classification Search
CPC ....... G01N 27/44795; G01N 27/44791; G01N 27/44782; G01N 33/54386; B01L 3/502761; B01L 2200/0652; B01L 2400/0406
See application file for complete search history.

(56) References Cited

U.S. PATENT DOCUMENTS

| | | |
|---|---|---|
| 9,005,417 B1 | 4/2015 | Sommer et al. |
| 10,620,157 B2 | 4/2020 | Kim et al. |
| 10,669,572 B2 | 6/2020 | Marczak et al. |

(Continued)

FOREIGN PATENT DOCUMENTS

| | | | | |
|---|---|---|---|---|
| JP | 06-130035 A | * | 5/1994 | ............ G01N 27/26 |
| WO | 2022226285 A1 | | 10/2022 | |

OTHER PUBLICATIONS

EPO machine-generated English langauage translation of H Matsumoto JP H06-130035 A, patent published May 13, 1994 (Year: 1994).*

(Continued)

*Primary Examiner* — Alexander S Noguerola
(74) *Attorney, Agent, or Firm* — Michael Best & Friedrich LLP

(57) ABSTRACT

Described herein is a bias-free high-throughput and high-yield continuous isoelectric fractionation (CIF) nanocarrier fractionation technique based on distinct isoelectric points. The nanocarrier fractionation platform is enabled by a robust and tunable linear pH profile provided by water-splitting at a bipolar membrane and stabilized by flow without ampholytes.

23 Claims, 61 Drawing Sheets

Specification includes a Sequence Listing.

(52) U.S. Cl.
CPC ......... *B01L 2300/0645* (2013.01); *B01L 2300/0864* (2013.01); *B01L 2400/0406* (2013.01)

(56) References Cited

U.S. PATENT DOCUMENTS

2009/0176315 A1 7/2009 Han et al.
2012/0138469 A1 6/2012 Yager et al.

OTHER PUBLICATIONS

Wang et al., "Review—Liquid biopsy technologies based on membrane microfluidics: High-yield purification and selective quantification of biomarkers in nanocarriers," Electrophoresis 2020, 41, 1878-1892 (Year: 2020).*
Ghosh et al., "Rapid Isolation of Extracellular Vesicles from Cell Culture and Biological Fluids Using a Synthetic Peptide with Specific Affinity for Heat Shock Proteins," PLOS ONE, Oct. 2014 | vol. 9 | Issue 10 | e110443 (Year: 2014).*
Epple et al., "Medulloblastoma Exosome Proteomics Yield Functional Roles for Extracellular Vesicles," PLoS ONE, Jul. 2012 | vol. 7 | Issue 7 | e42064 (Year: 2012).*
Albrecht et al., "Cascaded free-flow isoelectric focusing for improved focusing speed and resolution," Analytical chemistry 79(24): 9364-9371 (2007).
Chang, H.-C. et al. "Understanding Electrokineitcs at the Nanoscale-a Perspective", Biomicrofluidics, 3, 012001 (2009).
Chang, H.-C., et al. "Competition Between Dukhin's and Rubinstein's Electrokinetic Modes", Phys Rev E, 86, 046319 (2012).
Cheng, L.-J. et al. "Microscale p H regulation by splitting water." Biomicrofluidics 5.4 (2011): 046502.
Cheng, L.-J. et al. "Switchable pH actuators and 3D integrated salt bridges as new strategies for reconfigurable microfluidic free-flow electrophoretic separation." Lab on a Chip 14.5 (2014): 979-987.
Cui et al., "Multistage isoelectric focusing in a polymeric microfluidic chip," Analytical chemistry 77(24): 7878-7886 (2005).
Davies, R. T., et al. (2012). "Microfluidic filtration system to isolate extracellular vesicles from blood." Lab on a Chip 12(24): 5202-5210.
Lamparski, H. G., et al (2002). "Production and characterization of clinical grade exosomes derived from dendritic cells." Journal of immunological methods 270(2): 211-226.
Li, P., et al (2017). "Progress in exosome isolation techniques." Theranostics 7(3): 789-804.
Liu, F. et al. "The exosome total isolation chip." ACS nano 11.11 (2017): 10712-10723.
Slouka, Z., et al. "Microfluidic Systems with Ion-Selective Membranes", Annual Review of Analytical Chemistry, 7, 317-335 (2014).
Tauro, B. J., et al. (2012). "Comparison of ultracentrifugation, density gradient separation, and immunoaffinity capture methods for isolating human colon cancer cell line LIM1863-derived exosomes." Methods 56(2): 293-304.
Van Deun, J., et al. (2014). "The impact of disparate isolation methods for extracellular vesicles on downstream RNA profiling." Journal of extracellular vesicles 3(1): 24858.
Wang et al., "Liquid biopsy technologies based on membrane microfluidics: High-yield purification and selective quantification of biomarkers in nanocarriers," Electrophoresis 41(21):1878-1892 (2020).
Willms, E., et al. (2016). "Cells release subpopulations of exosomes with distinct molecular and biological properties." Scientific reports 6: 22519.
Woo, H.-K., et al (2017). "Exodisc or rapid, size-selective, and efficient isolation and analysis of nanoscale extracellular vesicles from biological samples." ACS nano 11(2): 1360-1370.

* cited by examiner pH gradient generation

Formation of pH gradient

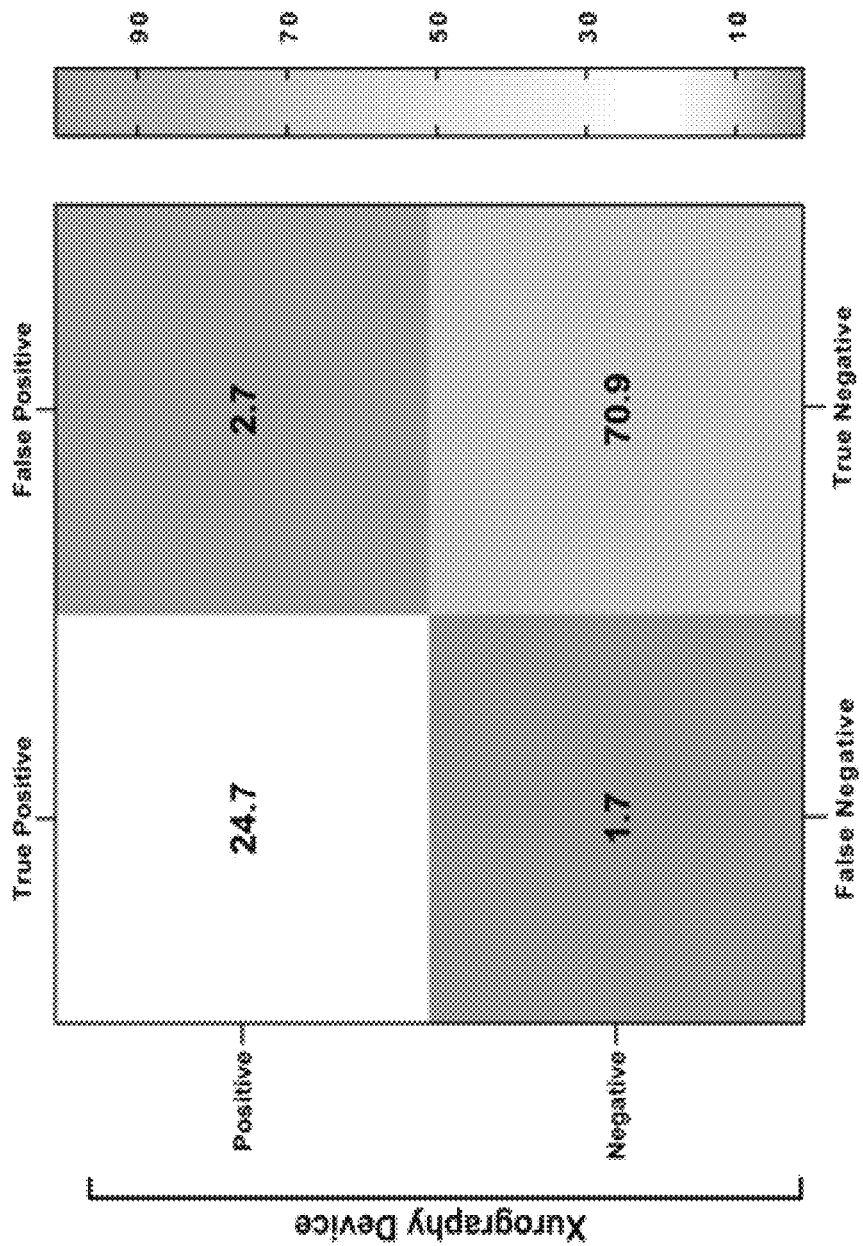

FIG. 11A

3D Print Device

|  | | False Negative | True Negative |
|---|---|---|---|
| True | | 1.83E+07 | 1.18E+06 |
| False | | 1.49E+06 | 1.08E+08 |

FIG. 11B

Xurography Device

|  | | False Negative | True Negative |
|---|---|---|---|
| True | | 6.60E+07 | 7.14E+06 |
| False | | 4.44E+06 | 1.89E+08 |

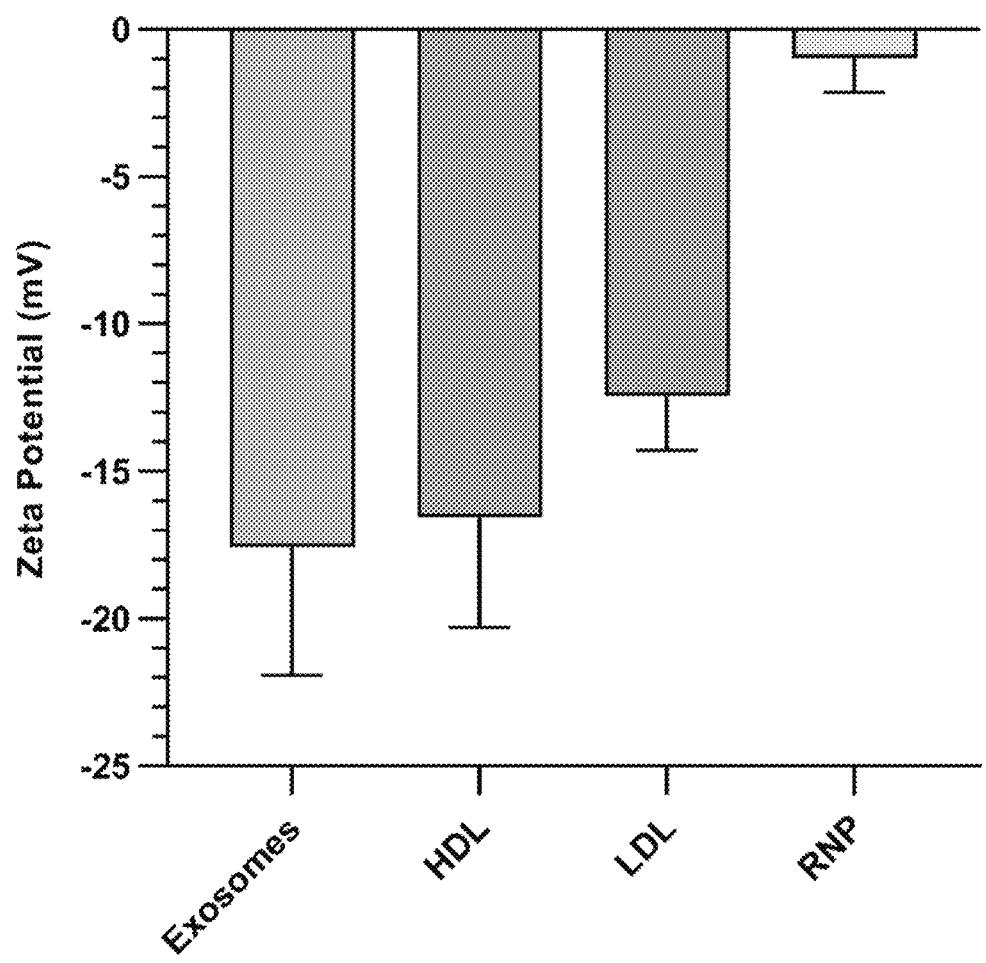

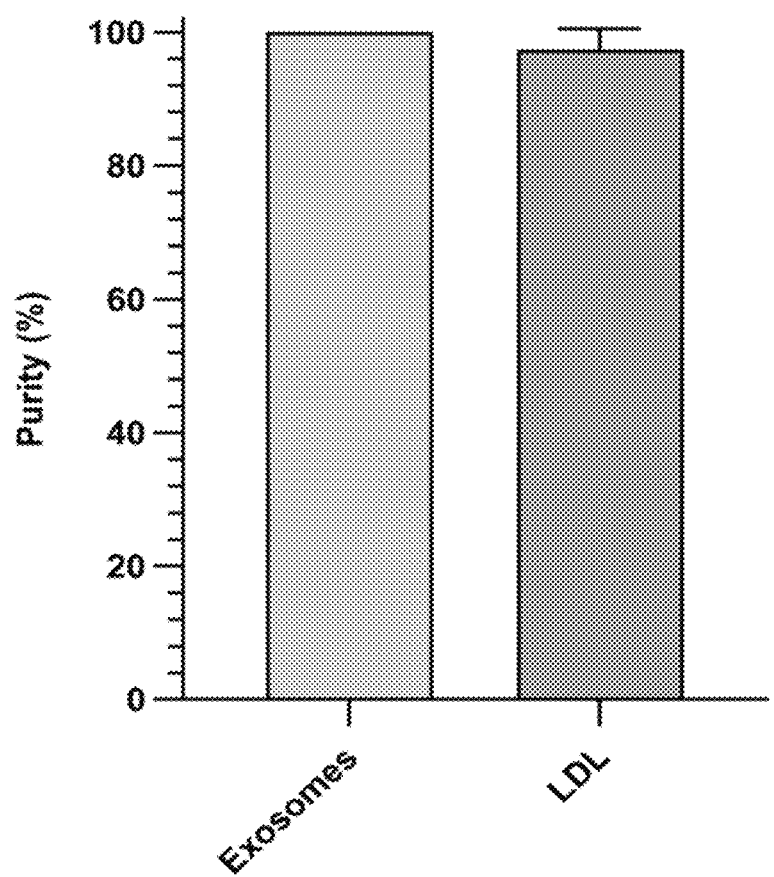

SEQUENCE LISTING

```
Sequence total quantity: 1
SEQ ID NO: 1            moltype = DNA   length = 22
FEATURE                 Location/Qualifiers
source                  1..22
                        mol_type = other DNA
                        organism = synthetic construct
SEQUENCE: 1
tagcttatca gactgatgtt ga                                              22
```

SCALABLE HIGH-THROUGHPUT ISOELECTRIC FRACTIONATION PLATFORM FOR EXTRACELLULAR NANOCARRIERS

CROSS-REFERENCE TO RELATED APPLICATIONS

This application claims priority to U.S. Provisional Patent Application No. 63/268,488 filed on Feb. 24, 2022, which is incorporated by reference herein in its entirety.

FEDERALLY SPONSORED RESEARCH

This invention was made with government support under grant number 4UH3 CA241684 awarded by the National Institutes of Health. The government has certain rights in the invention.

REFERENCE TO SEQUENCE LISTING

This application was filed with a Sequence Listing XML in ST.26 XML format accordance with 37 C.F.R. § 1.831. The Sequence Listing XML file submitted in the USPTO Patent Center, "092012-9159-US02_sequence_listing_xml_10 Jan. 2023.xml," was created on Jan. 10, 2023, contains 1 sequences, has a file size of 2.01 Kbytes, and is incorporated by reference in its entirety into the specification.

BACKGROUND

Extracellular RNAs (exRNAs) that are secreted in physiological fluids (e.g., blood, urine, lymph fluids) by host cells encode complex cellular communication signatures and thus serve as promising biomarkers for various disease states, even if this has been best investigated in the context of cancers. ExRNA are encased and protected by three general classes of nanoscale molecular shuttles—extracellular vesicle (EVs), lipoprotein (LLPs), and ribonucleic protein (RNPs)—many with several subtypes (e.g., small, and large EVs, or HDL, LDL, VLDL). It is now understood that these nanocarriers encompass specific functional molecules including metabolites, genetic materials, proteins, and act as vehicles by transferring these biomolecules from the donor cells from which they are derived to recipient cells. Nanocarrier intercellular signaling is hence fundamental to the cellular basis of disease progression. Studies thus far have suggested that the cargo of different nanocarriers are distinct and functionally diverse, making it difficult to resolve their itineraries upon release. For example, it is recently realized that the majority of circulating RNAs in blood are in RNP complexes with RNA-binding proteins, many of them overlap with those in vesicular EVs and LLPs. It is likely that these RNPs carry waste RNAs from the cells and should hence be removed if EV or LLP RNAs are of interest. On the other hand, the >1900 RNPs themselves, particularly RNPs with specific pairings of proteins and RNAs, have themselves become promising biomarkers for cancer and other stress-granule related diseases. However, the current RNP isolation technologies have extremely low yield. The most common cross-linking and immunoprecipitation (CLIP) and affinity capture technologies often offer very low yield, thus rendering quantification of RNAs impractical.

The inherent challenge of physically separating and isolating these nanocarriers from a biofluid stems from their overlapping size and mass distributions, particularly for small nanocarriers like RNP. Currently, the most widely used for nanocarrier separation techniques (LLPs and EVs) are multi-stage ultracentrifugation (UC) and nanoporous membrane-based ultrafiltration (UF). However, these conventional technologies are time and labor-intensive and can be plagued by low yields, poor isolation purity, and clogging (e.g., UF), thus manifesting in inaccurate downstream analysis. Asymmetric-flow field-flow fractionation (AF4) rapidly separates extracellular nanoparticles based on their hydrodynamic size and has a large dynamic range but similar to UC, heterogeneous nanoparticle populations with overlapping sizes cannot be isolated from each other and require an additional electric field-based separation step in conjunction with AF4 to achieve a better isolation purity. Other physical fractionation technologies based on deterministic lateral displacement, acoustofluidics, dielectrophoresis and size-exclusion chromatography, although promising, have only been successful thus far in isolating larger nanocarriers like EVs and often with low purity.

What is needed is a high throughput continuous isoelectric fractionation for separation of nanocarriers.

SUMMARY

One embodiment described herein is a system for continuous isoelectric fractionation and isolation of a plurality of biomolecules with high resolution, the system comprising: a microfluidic device comprising: a plurality of chips comprising: a first chip comprising: a water inlet; a bipolar membrane junction; a first chip microchannel capillary network; a first chip chamber comprising a gradually diverging or widening geometry configured to generate an initial coarse pH gradient running transverse to a fluid flow; and one or more first chip outlets; and one or more subsequent separation chips comprising: one or more separation chip inlets; a separation chip microchannel capillary network; a sample inlet configured to load a biological sample containing the plurality of biomolecules; a separation chip chamber comprising a gradually diverging or widening geometry configured to generate a fine pH gradient running transverse to the fluid flow; a positive electrode and a negative electrode configured to apply a current across the separation chip chamber; and one or more separation chip outlets; and fluid connections between the one or more first chip outlets and the one or more separation chip inlets for the transfer of select subset pH zones from the first chip to the one or more subsequent separation chips; a voltage source connected to the microfluidic device; and a pump connected to the microfluidic device for inducing the fluid flow. In one aspect, the bipolar membrane junction comprises an ion-exchange membrane-based bipolar junction comprising a plurality of ion-exchange membranes, a positive electrode, and a negative electrode. In another aspect, the plurality of ion-exchange membranes comprises one or more cation exchange membranes and one or more anion exchange membranes. In another aspect, each of the one or more cation exchange membranes and the one or more anion exchange membranes has a thickness of about 400 μm to about 700 μm. In another aspect, each of the one or more cation exchange membranes and the one or more anion exchange membranes has a thickness of about 500 μm to about 600 μm. In another aspect, the bipolar membrane junction dissociates water into $H_3O^+$ and $OH^-$ ions. In another aspect, the first chip microchannel capillary network partitions the $H_3O^+$ and $OH^-$ ions downstream of the bipolar membrane junction. In another aspect, the first chip microchannel capillary network is connected to the first chip chamber through a first chip microchannel capillary network outlet and a first chip chamber inlet. In another aspect, the connection between the first chip microchannel capillary network outlet and the first chip chamber inlet comprises an angle of about 45°. In another aspect, the initial coarse pH gradient comprises a pH gradient from about 0.5 to about 13.5. In another aspect, the initial coarse pH gradient comprises a pH gradient from about 2 to about 11. In another aspect, the fine pH gradient comprises a pH gradient encompassing a pH range between any two pH values from about 0.5 to about 13.5. In another aspect, the plurality of chips are formed from one or more materials comprising one or more of polyethylene terephthalate (PET), polycarbonate (PC), polypropylene (PP), polyimide (PI), or polyethersulphone (PES). In another aspect, the fluid connections comprise one or more tube components formed from one or more materials comprising one or more of polyethylene terephthalate (PET), polycarbonate (PC), polypropylene (PP), polyimide (PI), polyethersulphone (PES), or silicone. In another aspect, the first chip chamber has a trapezoidal-shaped geometry. In another aspect, the trapezoidal-shaped geometry has dimensions equal to about 20 mm×26 mm×37 mm (b1×b2×l). In another aspect, the separation chip chamber has a trapezoidal-shaped geometry. In another aspect, the trapezoidal-shaped geometry has dimensions equal to about 9 mm×26 mm×37 mm (b1×b2×l). In another aspect, the select subset pH zones transferred from the first chip to the one or more subsequent separation chips are based on the specific isoelectric points of the plurality of biomolecules. In another aspect, the plurality of biomolecules comprises extracellular RNA (exRNA) nanocarriers comprising extracellular vesicles, lipoproteins, ribonucleoproteins, or combinations thereof. In another aspect, the plurality of biomolecules comprises small extracellular vesicles, large extracellular vesicles, exosomes, high-density lipoproteins, low-density lipoproteins, very-low-density lipoproteins, ribonucleoproteins, or combinations thereof. In another aspect, the voltage source applies a voltage (V) of about 20 V to about 220 V to the microfluidic device.

Another embodiment described herein is a method for continuous isoelectric fractionation and isolation of a plurality of biomolecules with high resolution, the method comprising: obtaining a biological sample from a subject; and subjecting the biological sample to a system comprising: a microfluidic device comprising: a plurality of chips comprising: a first chip comprising: a water inlet; a bipolar membrane junction; a first chip microchannel capillary network; a first chip chamber comprising a gradually diverging or widening geometry configured to generate an initial coarse pH gradient running transverse to a fluid flow; and one or more first chip outlets; and one or more subsequent separation chips comprising: one or more separation chip inlets; a separation chip microchannel capillary network; a sample inlet configured to load the biological sample containing the plurality of biomolecules; a separation chip chamber comprising a gradually diverging or widening geometry configured to generate a fine pH gradient running transverse to the fluid flow; a positive electrode and a negative electrode configured to apply a current across the separation chip chamber; and one or more separation chip outlets; and fluid connections between the one or more first chip outlets and the one or more separation chip inlets for the transfer of select subset pH zones from the first chip to the one or more subsequent separation chips; a voltage source connected to the microfluidic device; and a pump connected to the microfluidic device for inducing the fluid flow. In one aspect, the plurality of biomolecules comprises extracellular RNA (exRNA) nanocarriers comprising extracellular vesicles, lipoproteins, ribonucleoproteins, or combinations thereof. In another aspect, the plurality of biomolecules comprises small extracellular vesicles, large extracellular vesicles, exosomes, high-density lipoproteins, low-density lipoproteins, very-low-density lipoproteins, ribonucleoproteins, or combinations thereof. In another aspect, the biological sample is selected from one or more of blood, serum, or plasma. In another aspect, the initial coarse pH gradient comprises a pH gradient from about 0.5 to about 13.5. In another aspect, the initial coarse pH gradient comprises a pH gradient from about 2 to about 11. In another aspect, the fine pH gradient comprises a pH gradient encompassing a pH range between any two pH values from about 0.5 to about 13.5. In another aspect, the select subset pH zones transferred from the first chip to the one or more subsequent separation chips are based on the specific isoelectric points of the plurality of biomolecules. In another aspect, the method has an isoelectric point difference (ΔpI) resolution of about 0.3 ΔpI for the plurality of biomolecules. In another aspect, the biological sample is added to the sample inlet of the one or more subsequent separation chips at a flow rate of about 1 mL/hour to about 15 mL/hour.

Another embodiment described herein is a system for continuous isoelectric fractionation and isolation of a plurality of extracellular RNA (exRNA) nanocarriers with high resolution, the system comprising: a microfluidic device comprising: a plurality of chips formed from one or more materials comprising one or more of polyethylene terephthalate (PET), polycarbonate (PC), polypropylene (PP), polyimide (PI), or polyethersulphone (PES), the plurality of chips comprising: a first chip comprising: a water inlet; an ion-exchange membrane-based bipolar junction configured to dissociate water into $H_3O^+$ and $OH^-$ ions, the bipolar junction comprising one or more cation exchange membranes and one or more anion exchange membranes, a positive electrode, and a negative electrode, wherein each of the one or more cation exchange membranes and the one or more anion exchange membranes has a thickness of about 500 μm to about 600 μm; a first chip microchannel capillary network positioned downstream of the ion-exchange membrane-based bipolar junction and configured to partition the $H_3O^+$ and $OH^-$ ions; a first chip chamber comprising a trapezoidal-shaped geometry and configured to generate an initial coarse pH gradient running transverse to a fluid flow, wherein the first chip microchannel capillary network is connected to the first chip chamber through a first chip microchannel capillary network outlet and a first chip chamber inlet at an angle of about 45°, and wherein the initial coarse pH gradient comprises a pH gradient from about 0.5 to about 13.5; and one or more first chip outlets; and one or more subsequent separation chips comprising: one or more separation chip inlets; a separation chip microchannel capillary network positioned downstream of the one or more separation chip inlets and configured to partition the $H_3O^+$ and $OH^-$ ions; a sample inlet configured to load a biological sample containing the plurality of exRNA nanocarriers; a separation chip chamber comprising a trapezoidal-shaped geometry configured to generate a fine pH gradient running transverse to the fluid flow, wherein the fine pH gradient comprises a pH gradient encompassing a pH range between any two pH values from about 0.5 to about 13.5; a positive electrode and a negative electrode configured to apply a current across the separation chip chamber; and one or more separation chip outlets, wherein the plurality of exRNA nanocarriers are fractionated into different separation chip outlets based on the specific isoelectric points of the plurality of exRNA nanocarriers; and fluid connections between the one or more first chip outlets and the one or more separation chip inlets for the transfer of select subset pH zones from the first chip to the one or more subsequent separation chips, wherein the fluid connections comprise silicone tubing, and wherein the select subset pH zones transferred from the first chip to the one or more subsequent separation chips are based on the specific isoelectric points of the plurality of exRNA nanocarriers; a voltage source configured to apply a voltage (V) of about 20 V to about 220 V to the microfluidic device; and a pump connected to the microfluidic device for inducing the fluid flow.

Another embodiment described herein is a method for continuous isoelectric fractionation and isolation of a plurality of exRNA nanocarriers with high resolution, the method comprising: obtaining a biological sample comprising the plurality of exRNA nanocarriers from a subject; and subjecting the biological sample to a system for continuous isoelectric fractionation as described herein.

DESCRIPTION OF THE DRAWINGS

FIG. 1A shows a schematic of the integrated CIF microfluidic platform consisting of a pH gradient chip and a separation chip connected by transfer tubes. The inset shows a photograph of an experimentally generated pH profile in the pH gradient chip. FIG. 1B shows an illustration of the water-splitting module of the pH gradient chip which utilizes two bipolar membranes (AEM-CEM sandwiched together; AEM: Anion-Exchange Membrane and CEM: Cation-Exchange Membrane) to dissociate water into $H_3O^+$ and $OH^-$ ions and subsequently transport them through splitter-mixer microchannels to obtain a stable and high-resolution pH gradient. FIG. 1C shows an illustration of the fractionation of RNP, HDL, LDL, and exosomes based on their distinct isoelectric points (pIs) in the high-resolution pH gradient in the separation chip.

FIG. 3A shows simulated concentration profiles of monovalent buffer anion ($A^-$) and cation ($B^+$) in Boltzmann equilibrium and $H_3O^+$ and $OH^-$ in negative Boltzmann equilibrium along the normalized width of a straight channel. FIG. 3B shows a plot of the simulated pH profile at different downstream locations until it stabilized into a linear pH profile (FIG. 2C). FIG. 3C shows line plots of the pH profiles at various downstream locations in the trapezoidal geometry, depicting stretching of linear pH profile by $2l \cdot \tan(\theta)/w$ as compared to the straight channel (FIG. 2A-B). The inset shows a pH gradient surface plot obtained by FEM simulation of the pH gradient chip. FIG. 3D shows line plots of the pH profiles at various downstream locations of the trapezoidal geometry of the separation chip depicting a high-resolution pH gradient. The inset shows a pH gradient surface plot of the separation chip obtained by FEM with the same geometry parameters as the experimental device. FIG. 3E shows collapsed data of the pH profile at the normalized outlet location that was obtained experimentally (FIG. 2D), theoretically, and by FEM numerical simulations of a trapezoidal geometry. FIG. 3F shows the extracted pH profile (blue color) with respect to the normalized width of the trapezoidal chamber, and the extracted pH profile in the separation chip (orange color) is shown with the normalized width of the trapezoidal chamber. The top right inset shows an experimental image snapshot of the trapezoidal chamber in the pH gradient chip whose colors are produced by pH indicator dye. The bottom left inset shows an experimental image snapshot of the high-resolution pH gradient obtained in the separation chip by transferring a pH range of 3 to 5 from the pH gradient generation chip.

FIG. 6A shows a chip for pH gradient generation with a pH range of 1-13. FIG. 6B shows the deflection of labelled LDL in the chip under a voltage bias of 100 V (left image) and 150 V (right image). FIG. 6C shows the deflection of labelled HDL in the chip under a voltage bias of 100 V (left image) and 150 V (right image).

FIG. 7A shows schematics of the experimental procedure in which a pH of 2-10 is transferred downstream from the pH generation chip to the separation chip (left images), and experimental images of the device working in continuous manner with image snapshots of the pH profile in the pH gradient chip and separation chip (right image).

FIG. 10A shows a complete workflow of the auto CIF analyzer with an image analysis pipeline of xurography and 3D printed chips. FIG. 10D shows a confusion matrix generated for a xurography-based chip also showing excellent pixel-wise classification accuracy for the ilastik classifier trained to identify the ROI. Similarly, as described above, the numbers shown in the boxes represent the percentage prediction accuracy in which a pixel is classified in vertical labels as compared to its true class shown horizontally. FIG. 10O shows that the yields of HDL and LDL from human plasma are 63.82+6.1% and 57.67+2.53%, respectively.

FIG. 11A-B show tables containing the raw data of true positive, true negative, false positive, and false negative values obtained by summation of all pixels in the test images of 3D printed (FIG. 11A) and xurography-based (FIG. 11B) chips.

FIG. 16A-S show a demonstration of the separation of a binary equimolar mixture in 1×PBS buffer solution of HDL and LDL; HDL and RNP; and LDL and exosomes. FIG. 16A shows a bar graph of the zeta potential of exosomes, HDL, LDL, and RNP measured in PBS buffer at pH=7.4 (n=7).

as compared to all other outlets (* indicates p=2.35×10⁻⁵;  indicates p=2.44×10⁻⁵; * indicates p=3.12×10⁻⁵). FIG. 16Q-S show line intensity plots obtained from the fluorescence image of the separation chip for the fractionation of binary mixtures of HDL and LDL (FIG. 16Q), HDL and RNP (FIG. 16R), and LDL and exosomes (FIG. 16S), respectively. All data in bar plots are shown as mean±standard deviation. For statistical significance, a two-tailed Student's t-test was used with Welch's correction, and a p-value less than 0.05 was considered significant.

FIG. 17C shows that the purity of the mixture fractionation at the exosome outlet was evaluated to be 99.99997±5.77×10⁻⁶%, whereas at the LDL outlet it was evaluated to be 97.32567±3.19564% (n=4).

FIG. 21C shows a surface plot of the pH profile for a straight channel obtained from FEM simulation. FIG. 21D shows the pH profile obtained in the trapezoidal channel of a 3D-printed chip.

FIG. 22A shows heatmaps of the yield of RNP, LDL, exosomes, and HDL for all 5 outlets of the separation chip (n=3). FIG. 22B shows the yield of RNP across all 5 outlets, with statistically significant differences between the RNP outlet (outlet 5) as compared to all other outlets (*indicates $p=4.08 \times 10^{-3}$;  indicates $p=4.08 \times 10^{-3}$; * indicates $p=4.08 \times 10^{-3}$; **** indicates $p=4.08 \times 10^{-3}$). FIG. 22C shows column plots showing the yield of RNP, LDL, exosomes, and HDL obtained at the RNP outlet (outlet 5) with statistically significant differences between RNP as compared to all other nanocarriers (* indicates $p=4.08 \times 10^{-3}$;  indicates $p=4.13 \times 10^{-3}$; * indicates $p=4.83 \times 10^{-3}$). FIG. 22D shows a pie chart depicting the purity (93.39±0.88%) of RNP isolation from plasma (n=3) obtained at the RNP outlet (outlet 5).

DETAILED DESCRIPTION

Figure 1A:
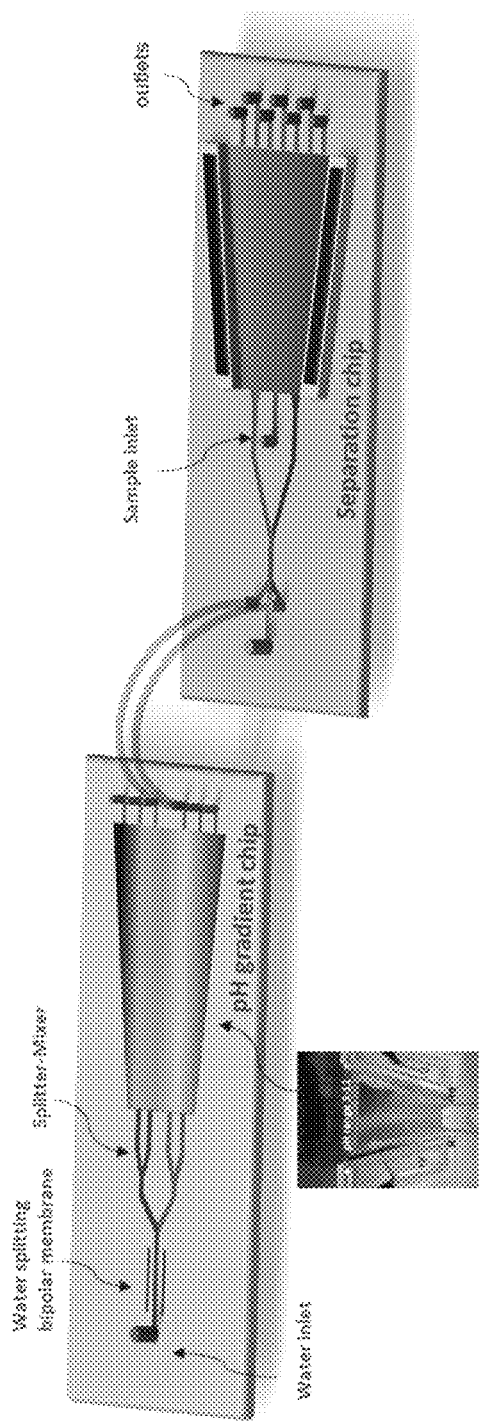
FIG. 1A-C show the design and operation of the CIF microfluidic device.

Unless otherwise defined, all technical and scientific terms used herein have the same meaning as commonly understood by one of ordinary skill in the art. For example, any nomenclatures used in connection with, and techniques of biochemistry, molecular biology, immunology, microbiology, genetics, cell and tissue culture, and protein and nucleic acid chemistry described herein are well known and commonly used in the art. In case of conflict, the present disclosure, including definitions, will control. Exemplary methods and materials are described below, although methods and materials similar or equivalent to those described herein can be used in practice or testing of the embodiments and aspects described herein.

As used herein, the terms "amino acid," "nucleotide," "polynucleotide," "vector," "polypeptide," and "protein" have their common meanings as would be understood by a biochemist of ordinary skill in the art. Standard single letter nucleotides (A, C, G, T, U) and standard single letter amino acids (A, C, D, E, F, G, H, I, K, L, M, N, P, Q, R, S, T, V, W, or Y) are used herein.

As used herein, the terms such as "include," "including," "contain," "containing," "having," and the like mean "comprising." The present disclosure also contemplates other embodiments "comprising," "consisting of," and "consisting essentially of," the embodiments or elements presented herein, whether explicitly set forth or not.

As used herein, the term "a," "an," "the" and similar terms used in the context of the disclosure (especially in the context of the claims) are to be construed to cover both the singular and plural unless otherwise indicated herein or clearly contradicted by the context. In addition, "a," "an," or "the" means "one or more" unless otherwise specified.

As used herein, the term "or" can be conjunctive or disjunctive.

As used herein, the term "substantially" means to a great or significant extent, but not completely.

As used herein, the term "about" or "approximately" as applied to one or more values of interest, refers to a value that is similar to a stated reference value, or within an acceptable error range for the particular value as determined by one of ordinary skill in the art, which will depend in part on how the value is measured or determined, such as the limitations of the measurement system. In one aspect, the term "about" refers to any values, including both integers and fractional components that are within a variation of up to ±10% of the value modified by the term "about." Alternatively, "about" can mean within 3 or more standard deviations, per the practice in the art. Alternatively, such as with respect to biological systems or processes, the term "about" can mean within an order of magnitude, in some embodiments within 5-fold, and in some embodiments within 2-fold, of a value. As used herein, the symbol "~" means "about" or "approximately."

All ranges disclosed herein include both end points as discrete values as well as all integers and fractions specified within the range. For example, a range of 0.1-2.0 includes 0.1, 0.2, 0.3, 0.4 . . . 2.0. If the end points are modified by the term "about," the range specified is expanded by a variation of up to ±10% of any value within the range or within 3 or more standard deviations, including the end points.

As used herein, the terms "control," or "reference" are used herein interchangeably. A "reference" or "control" level may be a predetermined value or range, which is employed as a baseline or benchmark against which to assess a measured result. "Control" also refers to control experiments or control cells.

Extracellular nanocarriers (exosomes, lipoproteins, and ribonucleoproteins) of protein and nucleic acids mediate intercellular communication and are clinically adaptable as distinct circulating biomarkers. However, the overlapping size and density of the nanocarriers have so far prevented their efficient physical fractionation, thus impeding independent downstream molecular assays. Described herein is a report a bias-free high-throughput and high-yield continuous isoelectric fractionation (CIF) nanocarrier fractionation technique based on their distinct isoelectric points. This nanocarrier fractionation platform is enabled by a robust and tunable linear pH profile provided by water-splitting at a bipolar membrane and stabilized by flow without ampholytes. The unique linear pH profile that allows easy tuning is a result of rapid equilibration of the water dissociation reaction and stabilization by flow. The platform is automated with a Machine Learning procedure to allow recalibration for different physiological fluids and nanocarriers. The optimized technique has a resolution of 0.3 Apl, sufficient to separate all nanocarriers and even subclasses of nanocarriers. Its performance is then evaluated with plasma samples. Comprehensive, high-purity (>93%) and high-yield (>78%) probe-free isolation of ribonucleoproteins from 0.75 ml of plasma in 30 minutes is demonstrated, significantly outperforming the affinity-based and highly biased gold standards having low yield and day-long protocol. Binary fractionation of exosomes and different lipoproteins is also achieved with similar superior performance.

Described herein is the highest throughput (12 mL/hour, about one-thousand times higher than previous reports), continuous isoelectric fractionation (CIF) platform for bias-free isolation of exosomes, lipoproteins (HDL, LDL), and RNPs from biofluids based on their distinct isoelectric points (pIs). Unlike the previous microfluidics free flow isoelectric focusing efforts, there is no external feed of acidic/basic solutions and internal distributors or ampholytes to sustain the pH gradient in the design. Instead, on-chip stable linear pH gradient is produced and maintained by a pair of bipolar ion-exchange membranes (IEMs), whose high fields lead to water splitting by the Wien effect and the production of high concentrations of $H_3O^+$ and $OH^-$ that are spatially segregated by the transverse field. The low and high pH gradients are then extracted and spatially extended in a trapezoidal separation chip to produce a higher resolution gradient. This robust scalability effectively allows us to fractionate, multiple nanocarriers with a large dynamic range of pIs (minimum ApI of 0.3) and the modular design enables parallel and sequential (high dimension) separations. No prior designs have the resolution to separate nanocarriers, even at their thousand-fold lower throughputs. Furthermore, a machine learning-based approach allows rapid selection of the optimal pH gradients for different physiological fluids and different nanocarriers, in the presence of contamination and equipment noise. The CIF technology was optimized by fractionating various combination of binary mixture of exRNA nanocarriers spiked in buffer (yield>80% and purity>90%) and demonstrate its performance with 20× diluted human plasma. In particular, the utility of the platform was demonstrated for small nanocarriers by isolating RNPs from EVs and LLPs with high-purity (>93%) and high-yield (>78%) from 0.75 mL of 20× diluted plasma in 30 minutes, which represent significant improvements (<1% yield with a day-long protocol) over the current gold standard.

In some embodiments, a fine pH gradient may comprise a pH gradient encompassing a pH range between any two pH values from about 0.5 to about 13.5, including all integers within the specified range. For example, in certain embodiments, the fine pH gradient comprises a pH gradient from about 0.5 to about 2, about 1 to about 3, about 2 to about 4, about 3 to about 5, about 4 to about 6, about 5 to about 7, about 6 to about 8, about 7 to about 9, about 8 to about 10, about 9 to about 11, about 10 to about 12, about 11 to about 13, or about 12 to about 13.5, including all integers within the specified ranges. In other embodiments, the fine pH gradient comprises a pH gradient from any two pH values intervening between the various ranges described above.

One embodiment described herein is a system for continuous isoelectric fractionation and isolation of a plurality of biomolecules with high resolution, the system comprising: a microfluidic device comprising: a plurality of chips comprising: a first chip comprising: a water inlet; a bipolar membrane junction; a first chip microchannel capillary network; a first chip chamber comprising a gradually diverging or widening geometry configured to generate an initial coarse pH gradient running transverse to a fluid flow; and one or more first chip outlets; and one or more subsequent separation chips comprising: one or more separation chip inlets; a separation chip microchannel capillary network; a sample inlet configured to load a biological sample containing the plurality of biomolecules; a separation chip chamber comprising a gradually diverging or widening geometry configured to generate a fine pH gradient running transverse to the fluid flow; a positive electrode and a negative electrode configured to apply a current across the separation chip chamber; and one or more separation chip outlets; and fluid connections between the one or more first chip outlets and the one or more separation chip inlets for the transfer of select subset pH zones from the first chip to the one or more subsequent separation chips; a voltage source connected to the microfluidic device; and a pump connected to the microfluidic device for inducing the fluid flow. In one aspect, the bipolar membrane junction comprises an ion-exchange membrane-based bipolar junction comprising a plurality of ion-exchange membranes, a positive electrode, and a negative electrode. In another aspect, the plurality of ion-exchange membranes comprises one or more cation exchange membranes and one or more anion exchange membranes. In another aspect, each of the one or more cation exchange membranes and the one or more anion exchange membranes has a thickness of about 400 µm to about 700 µm. In another aspect, each of the one or more cation exchange membranes and the one or more anion exchange membranes has a thickness of about 500 µm to about 600 µm. In another aspect, the bipolar membrane junction dissociates water into $H_3O^+$ and $OH^-$ ions. In another aspect, the first chip microchannel capillary network partitions the $H_3O^+$ and $OH^-$ ions downstream of the bipolar membrane junction. In another aspect, the first chip microchannel capillary network is connected to the first chip chamber through a first chip microchannel capillary network outlet and a first chip chamber inlet. In another aspect, the connection between the first chip microchannel capillary network outlet and the first chip chamber inlet comprises an angle of about 45°. In another aspect, the initial coarse pH gradient comprises a pH gradient from about 0.5 to about 13.5. In another aspect, the initial coarse pH gradient comprises a pH gradient from about 2 to about 11. In another aspect, the fine pH gradient comprises a pH gradient encompassing a pH range between any two pH values from about 0.5 to about 13.5. In another aspect, the plurality of chips are formed from one or more materials comprising one or more of polyethylene terephthalate (PET), polycarbonate (PC), polypropylene (PP), polyimide (PI), or polyethersulphone (PES). In another aspect, the fluid connections comprise one or more tube components formed from one or more materials comprising one or more of polyethylene terephthalate (PET), polycarbonate (PC), polypropylene (PP), polyimide (PI), polyethersulphone (PES), or silicone. In another aspect, the first chip chamber has a trapezoidal-shaped geometry. In another aspect, the trapezoidal-shaped geometry has dimensions equal to about 20 mm×26 mm×37 mm (b1×b2×l). In another aspect, the separation chip chamber has a trapezoidal-shaped geometry. In another aspect, the trapezoidal-shaped geometry has dimensions equal to about 9 mm×26 mm×37 mm (b1×b2×l). In another aspect, the select subset pH zones transferred from the first chip to the one or more subsequent separation chips are based on the specific isoelectric points of the plurality of biomolecules. In another aspect, the plurality of biomolecules comprises extracellular RNA (exRNA) nanocarriers comprising extracellular vesicles, lipoproteins, ribonucleoproteins, or combinations thereof. In another aspect, the plurality of biomolecules comprises small extracellular vesicles, large extracellular vesicles, exosomes, high-density lipoproteins, low-density lipoproteins, very-low-density lipoproteins, ribonucleoproteins, or combinations thereof. In another aspect, the voltage source applies a voltage (V) of about 20 V to about 220 V to the microfluidic device.

Another embodiment described herein is a method for continuous isoelectric fractionation and isolation of a plurality of biomolecules with high resolution, the method comprising: obtaining a biological sample from a subject; and subjecting the biological sample to a system comprising: a microfluidic device comprising: a plurality of chips comprising: a first chip comprising: a water inlet; a bipolar membrane junction; a first chip microchannel capillary network; a first chip chamber comprising a gradually diverging or widening geometry configured to generate an initial coarse pH gradient running transverse to a fluid flow; and one or more first chip outlets; and one or more subsequent separation chips comprising: one or more separation chip inlets; a separation chip microchannel capillary network; a sample inlet configured to load the biological sample containing the plurality of biomolecules; a separation chip chamber comprising a gradually diverging or widening geometry configured to generate a fine pH gradient running transverse to the fluid flow; a positive electrode and a negative electrode configured to apply a current across the separation chip chamber; and one or more separation chip outlets; and fluid connections between the one or more first chip outlets and the one or more separation chip inlets for the transfer of select subset pH zones from the first chip to the one or more subsequent separation chips; a voltage source connected to the microfluidic device; and a pump connected to the microfluidic device for inducing the fluid flow. In one aspect, the plurality of biomolecules comprises extracellular RNA (exRNA) nanocarriers comprising extracellular vesicles, lipoproteins, ribonucleoproteins, or combinations thereof. In another aspect, the plurality of biomolecules comprises small extracellular vesicles, large extracellular vesicles, exosomes, high-density lipoproteins, low-density lipoproteins, very-low-density lipoproteins, ribonucleoproteins, or combinations thereof. In another aspect, the biological sample is selected from one or more of blood, serum, or plasma. In another aspect, the initial coarse pH gradient comprises a pH gradient from about 0.5 to about 13.5. In another aspect, the initial coarse pH gradient comprises a pH gradient from about 2 to about 11. In another aspect, the fine pH gradient comprises a pH gradient encompassing a pH range between any two pH values from about 0.5 to about 13.5. In another aspect, the select subset pH zones transferred from the first chip to the one or more subsequent separation chips are based on the specific isoelectric points of the plurality of biomolecules. In another aspect, the method has an isoelectric point difference (ΔpI) resolution of about 0.3 ΔpI for the plurality of biomolecules. In another aspect, the biological sample is added to the sample inlet of the one or more subsequent separation chips at a flow rate of about 1 mL/hour to about 15 mL/hour.

Another embodiment described herein is a system for continuous isoelectric fractionation and isolation of a plurality of extracellular RNA (exRNA) nanocarriers with high resolution, the system comprising: a microfluidic device comprising: a plurality of chips formed from one or more materials comprising one or more of polyethylene terephthalate (PET), polycarbonate (PC), polypropylene (PP), polyimide (PI), or polyethersulphone (PES), the plurality of chips comprising: a first chip comprising: a water inlet; an ion-exchange membrane-based bipolar junction configured to dissociate water into $H_3O^+$ and $OH^-$ ions, the bipolar junction comprising one or more cation exchange membranes and one or more anion exchange membranes, a positive electrode, and a negative electrode, wherein each of the one or more cation exchange membranes and the one or more anion exchange membranes has a thickness of about 500 µm to about 600 µm; a first chip microchannel capillary network positioned downstream of the ion-exchange membrane-based bipolar junction and configured to partition the $H_3O^+$ and $OH^-$ ions; a first chip chamber comprising a trapezoidal-shaped geometry and configured to generate an initial coarse pH gradient running transverse to a fluid flow, wherein the first chip microchannel capillary network is connected to the first chip chamber through a first chip microchannel capillary network outlet and a first chip chamber inlet at an angle of about 45°, and wherein the initial coarse pH gradient comprises a pH gradient from about 0.5 to about 13.5; and one or more first chip outlets; and one or more subsequent separation chips comprising: one or more separation chip inlets; a separation chip microchannel capillary network positioned downstream of the one or more separation chip inlets and configured to partition the $H_3O^+$ and $OH^-$ ions; a sample inlet configured to load a biological sample containing the plurality of exRNA nanocarriers; a separation chip chamber comprising a trapezoidal-shaped geometry configured to generate a fine pH gradient running transverse to the fluid flow, wherein the fine pH gradient comprises a pH gradient encompassing a pH range between any two pH values from about 0.5 to about 13.5; a positive electrode and a negative electrode configured to apply a current across the separation chip chamber; and one or more separation chip outlets, wherein the plurality of exRNA nanocarriers are fractionated into different separation chip outlets based on the specific isoelectric points of the plurality of exRNA nanocarriers; and fluid connections between the one or more first chip outlets and the one or more separation chip inlets for the transfer of select subset pH zones from the first chip to the one or more subsequent separation chips, wherein the fluid connections comprise silicone tubing, and wherein the select subset pH zones transferred from the first chip to the one or more subsequent separation chips are based on the specific isoelectric points of the plurality of exRNA nanocarriers; a voltage source configured to apply a voltage (V) of about 20 V to about 220 V to the microfluidic device; and a pump connected to the microfluidic device for inducing the fluid flow.

Another embodiment described herein is a method for continuous isoelectric fractionation and isolation of a plurality of exRNA nanocarriers with high resolution, the method comprising: obtaining a biological sample comprising the plurality of exRNA nanocarriers from a subject; and subjecting the biological sample to a system for continuous isoelectric fractionation as described herein.

It will be apparent to one of ordinary skill in the relevant art that suitable modifications and adaptations to the compositions, formulations, methods, processes, and applications described herein can be made without departing from the scope of any embodiments or aspects thereof. The compositions and methods provided are exemplary and are not intended to limit the scope of any of the specified embodiments. All of the various embodiments, aspects, and options disclosed herein can be combined in any variations or iterations. The scope of the compositions, formulations, methods, and processes described herein include all actual or potential combinations of embodiments, aspects, options, examples, and preferences herein described. The exemplary compositions and formulations described herein may omit any component, substitute any component disclosed herein, or include any component disclosed elsewhere herein. The ratios of the mass of any component of any of the compositions or formulations disclosed herein to the mass of any other component in the formulation or to the total mass of the other components in the formulation are hereby disclosed as if they were expressly disclosed. Should the meaning of any terms in any of the patents or publications incorporated by reference conflict with the meaning of the terms used in this disclosure, the meanings of the terms or phrases in this disclosure are controlling. Furthermore, the foregoing discussion discloses and describes merely exemplary embodiments. All patents and publications cited herein are incorporated by reference herein for the specific teachings thereof.

EXAMPLES

Reagents and Biosamples

Two buffers, 1×PBS (phosphate buffered saline, Fisher Scientific), consisting of 137 mM NaCl, 2.7 mM KCl, 8 mM $Na_2HPO_4$, and 2 mM $KH_2PO_4$, PH 7.4 and 10×TAE buffer (Sigma Aldrich) consisting of 400 mM Tris-acetate and 10 mM ethylenediaminetetraacetic acid (EDTA) were purchased and used as received. HDL and LDL were purchased from MyBiosource. CFSE Cell Proliferation Kit (Thermo Fisher Scientific) and Atto 550 NHS ester (Sigma Aldrich) were purchased and used for the labelling of LPPs, RNP, and commercial exosomes. MicroRNA 21 (miR21) (Integrated DNA Technologies) with a sequence of TAGCTTATCA-GACTGATGTTGA (SEQ ID NO: 1) and Cas 9 (New England Biolabs) were purchased and used for RNP complex formation. Human preadipocyte (Mesenchymal Stem Cell) exosomes (concentration>1 billion particles/vial) were purchased from a commercial vendor (Cat #EXP-F100, Zen-Bio) and stored at −80° C. upon receipt.

pH Gradient Chip

Figure 1B:
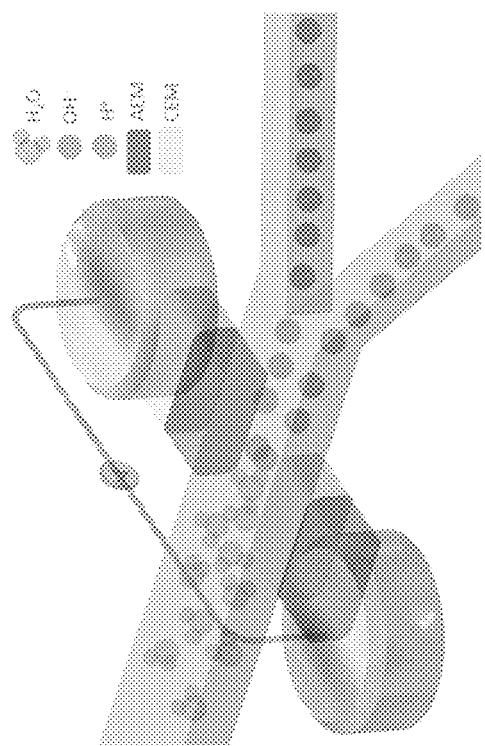
Figure 2A:
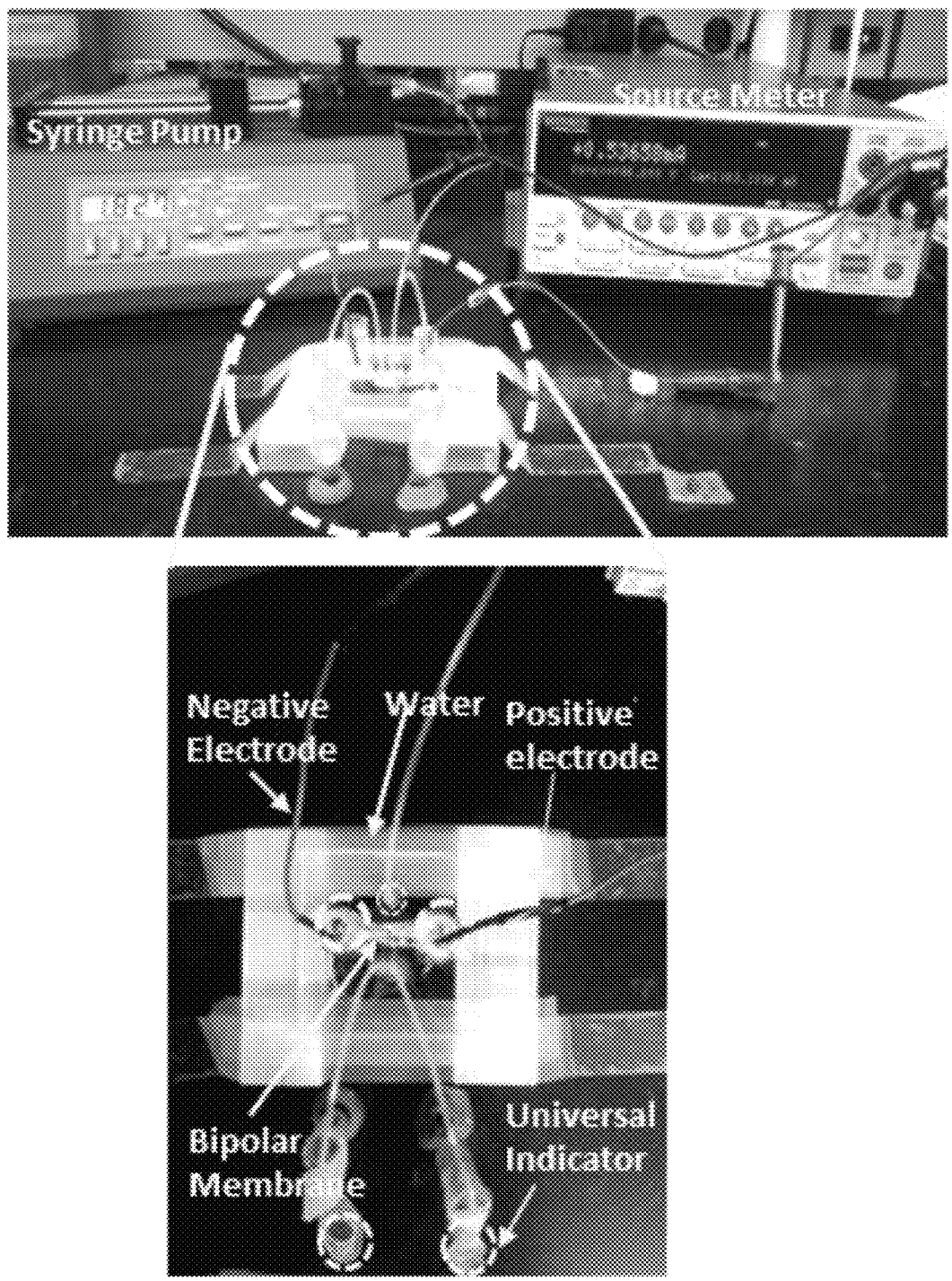
FIG. 2A shows an image of an experimental setup for testing the water splitting module of the pH gradient generation chip. The inset is a top view showing the water inlet and two electrode reservoirs for the bipolar membranes.
Figure 2B:
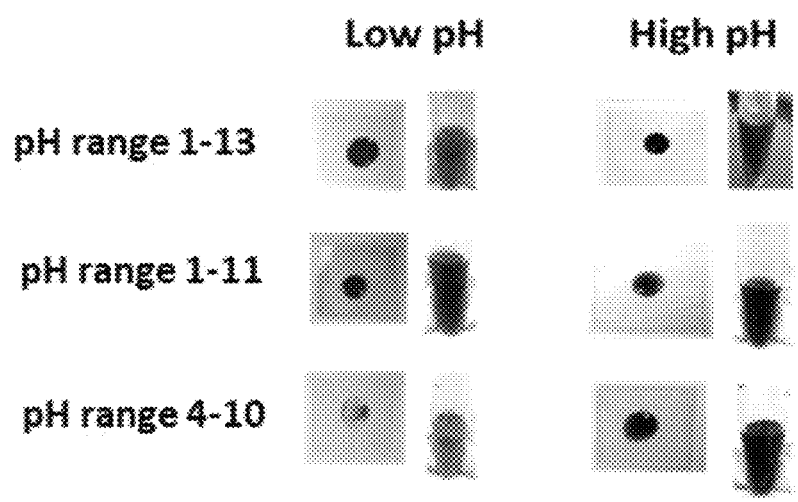
FIG. 2B shows a pH analysis of the collected samples in microcentrifuge tubes from two different outlets in FIG. 2A under different conditions of voltage bias.
Figure 2C:
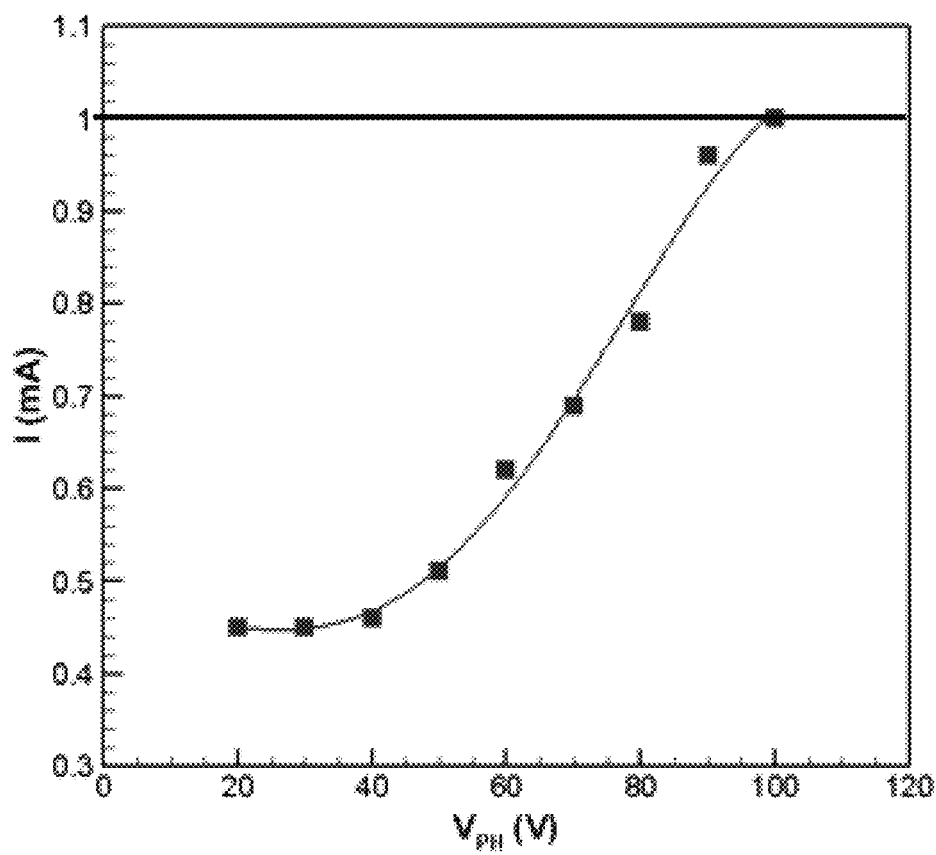
FIG. 2C shows the measured I-V characteristics of the bipolar membrane depicting a significant increase in ion current at elevated voltages due to excessive hydroxide and hydronium ion generation by water splitting.

The bipolar membrane (BiM), which is a sandwich between anion-exchange membrane (AEM) and cation-exchange membrane (CEM), was assembled in such a way that one part of the membrane was exposed to an electrolyte reservoir and the other side to the microchannel. The two bipolar membranes (500-600 μm thick) were assembled on either side of the water transporting microchannel without any cross-membrane leakage (see FIG. 1B and FIG. 2). Once filled with electrolyte, the BiM allows ion delivery into the microchannel. Under a reverse bias voltage across the two BiM reservoirs, an ion depletion zone of ~10 nm (the length of the Debye layer) appears at the AEM-CEM interface, such that the entire voltage drop occurs across this small layer. This gives rise to a field of more than 106 V/cm, which is sufficient to split water into hydronium ions ($H_3O^+$) and hydroxide ($OH^-$) ions. The $H_3O^+$ and $OH^-$ are electrophoretically driven through their respective membranes into the main channel where they are then partitioned, as shown in FIG. 2A. The high flow rate and their spatially segregated injection locations prevent extensive recombination of $H_3O^+$ and $OH^-$ into water at the injection site between the two BiMs. The amount of hydronium and hydroxide ions produced depends strongly on the applied DC bias as observed by the I-V characteristics of the BIM (FIG. 2C). The excessive ions generated by the field enhanced water dissociation at elevated voltage increase the local conductivity resulting in an increased current. The amount of water dissociation required under applied field for obtaining a robust pH gradient was further optimized in a simple microfluidic device as shown in (FIG. 2A). Under a 30 V reverse bias potential, and under an upstream flow rate of 12 mL/hour, a pH of 4 and 10 is collected at two outlets, respectively. As the voltage is increased to 80 V a pH of 1 and 11 was collected at the two extreme outlets. At 90 V, a pH of 1 and 13 were collected from the two outlets (FIG. 2B). As the voltage increases further, the current also increased significantly and it was observed that a current beyond 1 mA caused undesirable joule heating leading to bubble formation in the chip. Therefore, the optimized voltage bias and flow rate parameters were used subsequently.

This simple method does not produce any gaseous and harmful Faradaic reaction product contamination commonly observed in water electrolysis reactions. Also, as compared to other pH generation modules using either commercially available carrier ampholytes or injecting highly acidic and basic solutions through different inlets which ultimately dilutes the analyte, this method requires only a single microfluidic channel that can be bifurcated via splitter mixer channels to produce a controllable pH gradient. Note that the outlet of the splitter-mixer has an angle of 45° at the inlet to the trapezoidal chamber to avoid the formation of vortices.

Theoretical Explanation of pH Profile

In the pH gradient generation chip, the segregated $H_3O^+$ and $OH^-$ ions concentrate at the positive and negative electrodes, respectively, with a gradient opposite to their natural equilibrium Boltzmann distributions. Consequently, electroneutrality is maintained by the migrating buffer anions and cations (labelled $A^-$ and $B^+$ respectively, in FIG. 3A). Neglecting any Faradaic reaction of these inert buffer ions, they will equilibrate into their natural Boltzmann equilibria:

$$C_\pm = C_\pm^0 \exp\left(\mp \frac{|z|FE}{RT} y\right) \quad (1)$$

where $C_\pm$ denotes the concentration of $B^+$ and $A^-$ buffer ions respectively, $C_\pm^0$ is the respective reference ion concentration at the middle of the channel (y=0) where the reference potential is zero, y is the transverse coordinate with the mid-channel as the origin, E is the constant transverse electric field in an electroneutral solution, F is Faraday constant, R is the universal gas constant, T is the temperature, and z is the valency of ions.

In tandem, to preserve local electroneutrality, the reactive $H_3O^+$ and $OH^-$ ions adjust their (unequal) concentrations by rapid migration and association to form water to achieve the proper concentration for compensating the net charge due to the segregated buffer ion Boltzmann distributions (1). They hence take on the Boltzmann equilibrium concentrations of the buffer anion and cation, respectively, $C_{H_3O^+}=C_-$ and $C_{OH^-}=C_+$... These quasi-Boltzmann distributions of $H_3O^+$ and $OH^-$ are opposite of their own natural Boltzmann distributions without reaction-they obey "negative" Boltzmann distributions. The recombination and dissociation kinetics, with unequal $H_3O^+$ and $OH^-$ concentrations, are so fast that they do not reach transport equilibrium, described by their natural Boltzmann distribution, but rather reaction equilibrium to maintain electroneutrality by compensating the charge of the segregated buffer ions that are in Boltzmann distributions. The pH $\log_{10}$ ($H_3O^+$) profile is then specified by the mid-channel concentrations Co. It is a linear spatial profile with anti-reflection symmetry across the mid-plane, for a constant transverse electric field in an electroneutral solution.

The above complete association theory can be improved by allowing for rapid but reversible equilibration of the water dissociation reaction, $$2H_2O \rightleftharpoons H_3O^+ + OH^- \quad (2)$$

such that $K_w = C_{H_3O^+} C_{OH^-}$ everywhere ($K_w$ is the auto-ionization constant of water), with the $H_3O^+$ and $OH^-$ ions having concentrations that are inverse of each other—the acidic end is dominated by $H_3O^+$ and the basic end $OH^-$. At the middle of the channel, electroneutrality stipulates that this reciprocal relationship is transferred to buffer ions such that $C_+^0 C_-^0 = K_w$.

Away from the mid channel, however, local electroneutrality yields:

$$(C_{H_3O^+} - C_{OH^-}) + (C_+ - C_-) = 0 \quad (3)$$

with Boltzmann distributions (1) for the buffer ions and the reciprocal relationships between $H_3O^+$ and $OH^-$ ions and between the midchannel buffer ion concentrations, with constant $K_w$, this electroneutrality condition hence specify the hydronium ion concentration and the pH at every position. The distributions are only dependent on the midchannel anion concentration $C_-^0$ and the local transverse field E. This universal distribution applies to the pH generation chip but is also true for the separation chip when a subsection of the pH profile is extracted from the pH generation channel. The only difference is reference buffer anion concentration $C_-^0$, which is a function of the extracted segment from upstream generation chip. Hence, the linear pH profile corresponding to $$C_{H_3O^+} = C_- = C_-^0 \exp\left(\frac{|z|FE}{RT} y\right)$$

is obeyed everywhere across both channels. The trapezoidal shape of the separation chip produces an electric field E that decreases linearly downstream and the constant pH contours should be linear radial loci in the channel.

The universal "negative" Boltzmann distribution of hydronium ions, with only the mid-channel reference concentration specified by the feeds, implies that any linear section of the pH profile in the upstream chip can be stretched to any length scale in the downstream chip, depending only on the electric field E or the width of the trapezoidal microchannel when constant potential is applied at the two channel sides. This flexibility allows us to tune the pH range and spatial resolution in the separation chip to achieve high-resolution isoelectric separation. Mathematical Calculation of Linear pH Profile in Trapezoidal and Straight Channels The linear pH profile in the range [$pH_{start}$, $pH_{end}$]straight channel and trapezoidal channel in dimensionless form should appear as follows:

$$pH_{straight} = pH_{start} + \Delta pH_{straight} * \left(\frac{x}{w}\right) \quad (4)$$

$$pH_{trapezoidal} = pH_{start} + \Delta pH_{trapezoidal} * \left(\frac{x}{w + 2*l*\tan(\theta)}\right) \quad (5)$$

Since the dimensionless profile is same for both the cases:

$$pH_{trapezoidal} = pH_{straight} \quad (6)$$

$$\Delta pH_{trapezoidal} * \left(\frac{x}{w + 2*l*\tan(\theta)}\right) = \Delta pH_{straight} * \left(\frac{x}{w}\right)$$

$$\frac{\Delta pH_{trapezoidal}}{\Delta pH_{straight}} = \frac{w + 2*l*\tan(\theta)}{w}$$

$$\frac{\Delta pH_{trapezoidal} - \Delta pH_{straight}}{\Delta pH_{straight}} = \frac{2*l*\tan(\theta)}{w}$$

For the pH generation chip w=20.2 mm and l=2 6.57 mm and tan (8)=10° and the percentage increase in the pH gradient resolution in trapezoidal geometry is 63.07% as compared to the straight geometry.

On-Chip Gel Electrophoresis

Figure 14:
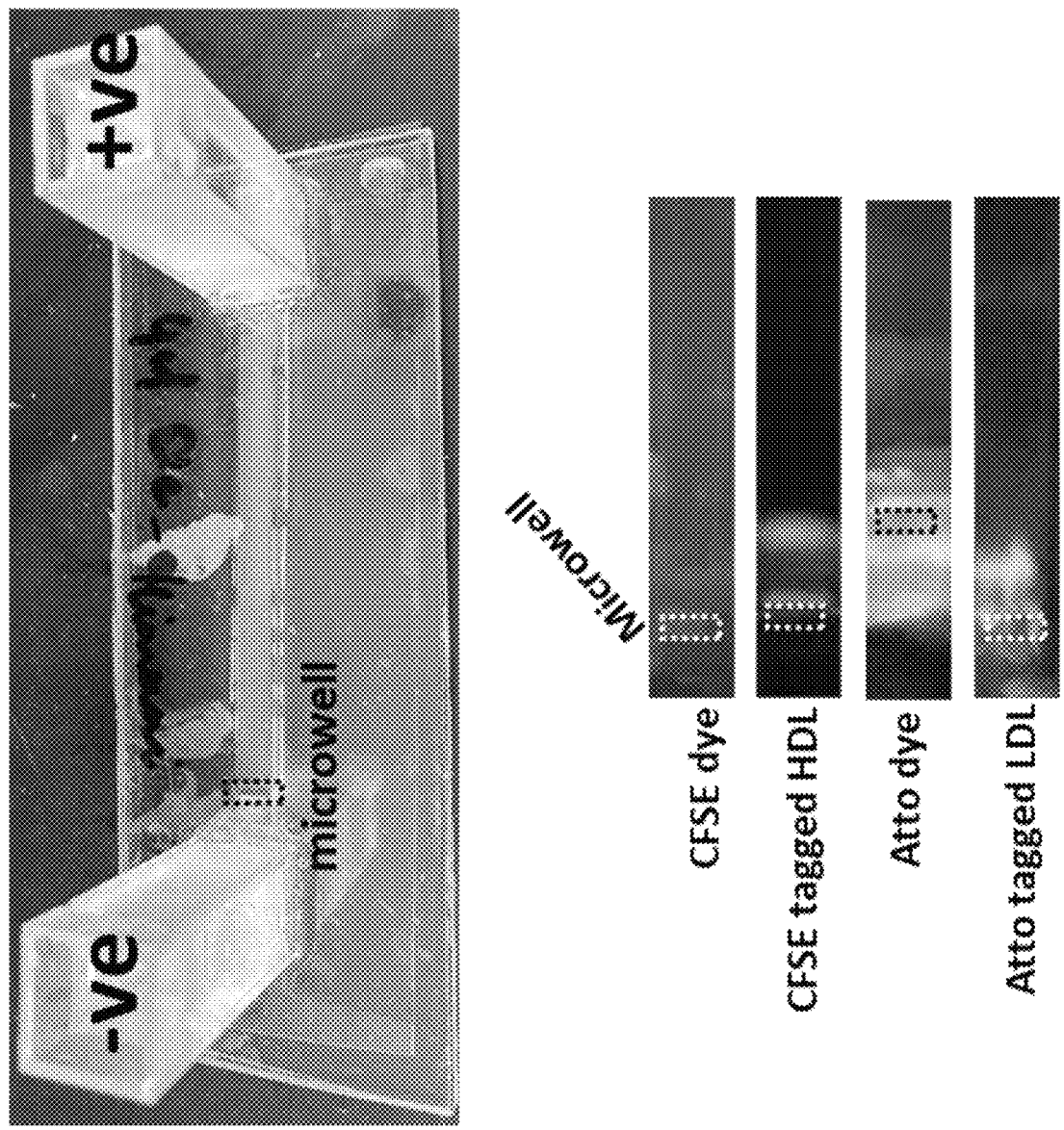
FIG. 14 shows agarose gel electrophoresis of labeled HDL and LDL. Top: An image of the agarose gel electrophoresis chip. Bottom: Agarose gel (2% w/v) electrophoresis of the pure CFSE dye, CFSE labelled HDL, pure Atto dye, and Atto dye labelled LDL. The dashed rectangular mark at the top indicates the position of the loading wells. The gel electrophoresis indicates efficient labelling of the LLPs with both LLPs moving towards the negative potentials. The CFSE dye is not fluorescent by itself, and the Atto dye moves towards the positive potential.

A 5 mm×60 mm rectangular through hole was cut in the middle of a 40 mm×80 mm acrylic sheet (8560K188, Mcmaster Carr) using a micro milling machine (Roland monoFab SRM-20, Roland DG). The sheet is then sandwiched between two 40 mm×80 mm double-sided 1 mil polyimide tape (Kapton®, PPTDE-3), which were cut using a plotter cutter (Graphtec Pro FC7000). The upper polyimide tape contained two holes for inlet as well as outlet and another hole which acts as a microwell for injecting the sample. Two plastic cuvettes acting as fluid reservoirs (97000-590, VWR) were cut and glued on top of the top sheet of polyimide tape with the holes being at the center of the cuvettes (FIG. 14). The fluid reservoirs were filled with 1×PBS buffer. 2% of heated agarose solution was injected into the chip, cooled at 4° C. for half an hour and a portion of gel in the microwell is cut. Finally, 5 μL of the sample was injected into the microwell and a voltage bias of 100 V was applied. The chip was then placed on a Dark Reader blue transilluminator (DR89 Mid-Size Transilluminator, Clare Chemical Research) for fluorescence image acquisition.

Gel Electrophoresis

Gel electrophoresis of tagged HDL, LDL, RNP and commercial exosomes was performed in 2% agarose gel made in TAE buffer in the Mini-Sub Cell GT Cell (Bio-Rad) for 30 mins at 100 V. Fluorescence image acquisition was done under a Dark Reader blue transilluminator (DR89 Mid-Size Transilluminator, Clare Chemical Research).

Sample Preparation: HDL, LDL, RNP and Exosome Preparation

A known concentration (0.28 μg/mL) of HDL and LDL in 1×PBS was labelled with CFSE dye and Atto dye respectively using manufacturer's protocols and purified using Amicon Ultra 0.5 centrifugal filter kit (Sigma-Aldrich). The conjugation of HDL and LDL with their respective dyes was then verified with on-chip gel electrophoresis (FIG. 14).

Figure 5:
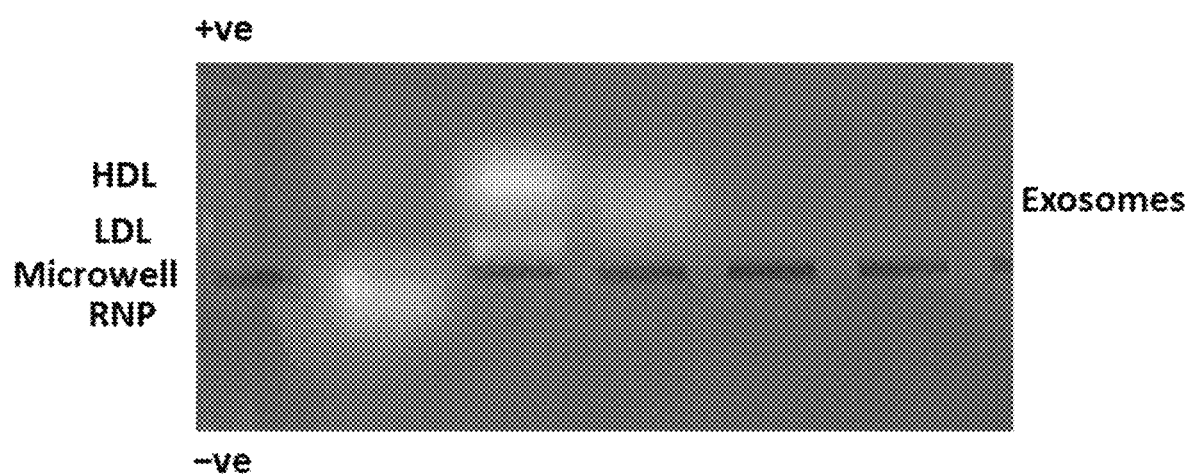
FIG. 5 shows agarose (2% w/v) gel electrophoresis of tagged HDL, LDL, RNP, and commercial exosomes.

For RNP complex formation, 1 μL miRNA was mixed with 10 μL of Cas9 protein from their original vial and then left at room temperature for 30 minutes. The complex was further diluted 100 times with 1×PBS before being stored at 4° C. until use. Cas9 was labelled with Atto dye using the manufacturer's labelling protocol and then the RNP was purified from unbound free-floating dye molecule using Amicon Ultra 0.5 centrifugal filter kit. RNP formation was verified by on-chip gel electrophoresis (FIG. 5).

For exosomes, prior to use, the cryovial was thawed by placing it in a 37° C. water bath for an hour and later centrifuged at 17000×g for 10 minutes. The labelling of exosomes was done by adding 10 μL of commercial exosomes and 2 μL CFSE dye into 1×PBS to a final volume of 2 mL.

Zeta Potential Measurement

Zeta potential of HDL, LDL, RNP, and exosomes were measured in 1×PBS (pH 7.4) buffer using NanoBrook Zeta-PALS potential analyzer (Brookhaven Instruments Corporation).

Healthy Human Plasma

Healthy human plasma samples were purchased (Zen-Bio Inc.) and collected in tubes of 10 mL with EDTA coagulant. The samples were obtained following FDA-mandated testing for pathogens.

Fractionation of Binary Mixture of Nanocarriers Spiked in Buffer

After selecting the appropriate outlets from pH gradient chip, a 3 mL nanocarrier binary mixture for three different cases (HDL-LDL, HDL-RNP and LDL-Exosome) spiked in PBS was injected into the separation chip at a flow rate of 3 mL/hour except for LDL-Exosome fractionation which ran at 1.5 mL/hour. For human plasma experiments, 1.5 mL of 20× diluted plasma was injected into the separation chip at a flow rate of 1.5 mL/hour. A voltage bias of 150 V was applied for HDL-LDL fractionation whereas 200 V was applied for HDL-RNP and LDL-Exosome fractionation.

HDL, LDL, RNP, and Exosome ELISA

Apolipoprotein A1 Human ELISA Kit (Thermo Fisher Scientific) and Human ApoB ELISA Kit (Thermo Fisher Scientific) were used for the quantification of HDL and LDL samples following the manufacturer's protocols. Briefly, 100 μL of protein samples were added to each of the 96 well plates and incubated overnight at 4° C. with gentle shaking. The samples were discarded and washed 4 times with 1× wash buffer. 100 μL of biotin conjugate was added, incubated for 1 hour with gentle shaking, and washed four times. 100 μL of Streptavidin-HRP was then added, incubated for 45 minutes with gentle shaking, and washed four times. Finally, 100 μL of TMB Substrate was added, incubated for 30 minutes, and a 50 μL of stop solution to each well.

For RNP complex quantification, EpiQuik CRISPR/Cas9 Assay ELISA Kit (Epigentek) was used following the manufacturer's protocol. 100 μL of Cas9 Binding Buffer (CBB) and 1 μL of the sample were added to each blank well and was incubated at 37° C. for 120 min. After 3 times washing with 150 μL wash buffer, 50 μL of the Cas9 Detection Complex Solution (made by mixing 1 mL of Diluted Wash Buffer, 1 μL of Detection Antibody, 1 μL of Signal Indicator, and 1 μL of Enhancer Solution) to each well and incubated for 50 minutes at room temperature. After 3 times washing, 100 μL of Developer Solution was added, incubated at room temperature for 10 minutes and 100 μL of stop solution was added to each well.

For exosome quantification, Human CD63 ELISA Kit (Thermo Fischer Scientific) was used following the manufacturer's protocol attached with the kit. In short, 100 μL of the exosome samples was added individually to the 96 well plates and incubated overnight at 4° C. with gentle shaking. The solution was washed 4 times with wash buffer before adding 100 μL of biotin conjugate for each well and incubated for 1 hour with gentle shaking. Then, 100 μL Streptavidin-HRP was added to each well and incubated for 45 minutes before discarding and further washing the solution 4 times. TMB substrate (100 μL) was then added, incubated for 30 minutes and 50 μL of Stop Solution was added to each well.

For all ELISA experiments, the 96 well plates were imaged by a microplate reader (Tecan Infinite M200 Pro) at 450 nm and were compared with the calibration curve (obtained by a 4-parameter logistic regression (4PL)) of the protein standards.

Optimized Conditions for Separating HDL and LDL

Figure 6A:
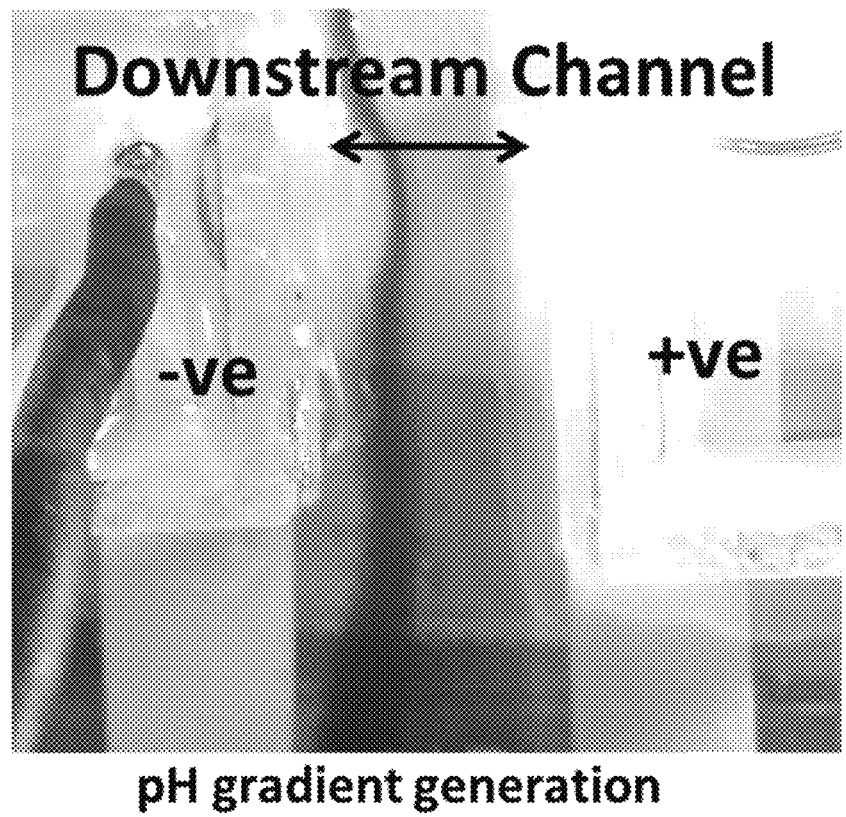
FIG. 6A-C show preliminary experiments for parameter optimization for IEF of HDL and LDL.
Figure 6B:
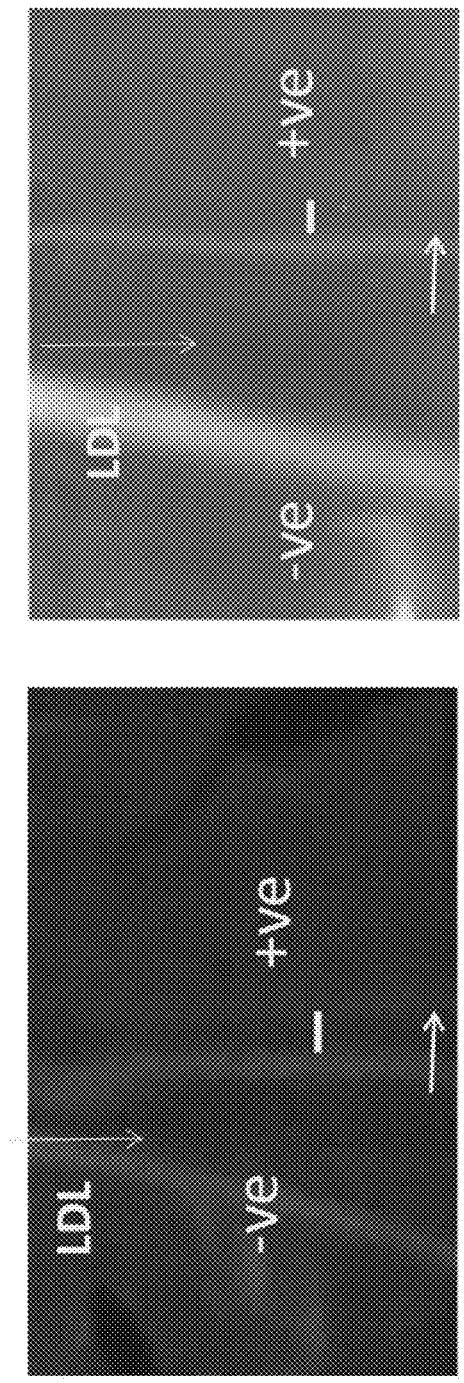
Figure 6C:
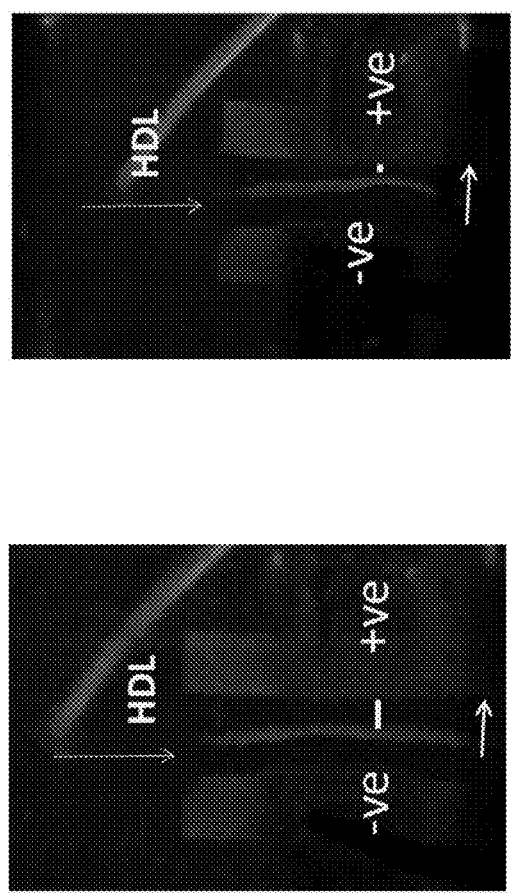

For separation of target ampholytes such as HDL and LDL, two key optimal conditions are needed: a pH range for performing pure separation and the applied voltage bias to deflect the nanocarriers prior to their residence time in the chip. The optimum condition for the latter was obtained from the charged latex nanoparticle deflection experiments. Hence, the ensuing set of experiments optimized the pH range required to sufficiently separate HDL and LDL. Initially, the pH range [1-13] obtained from the pH generation chip was used to test the isoelectric focusing of the labelled nanocarriers individually (FIG. 6A). For LDL (FIG. 6B), the particles were deflected towards their respective pIs as shown from the snapshots at voltage bias of 100 V and 150 V. Similarly, for HDL, the same behavior was observed (FIG. 6C). However, a mixture of these ampholytes cannot be separated since both the labelled ampholytes were collected from the same outlet. Therefore, these experiments suggested to lower the pH range from 1-13 to 3-6 for generating a high-resolution pH gradient for efficient recovery of these lipoproteins.

Figure 4:
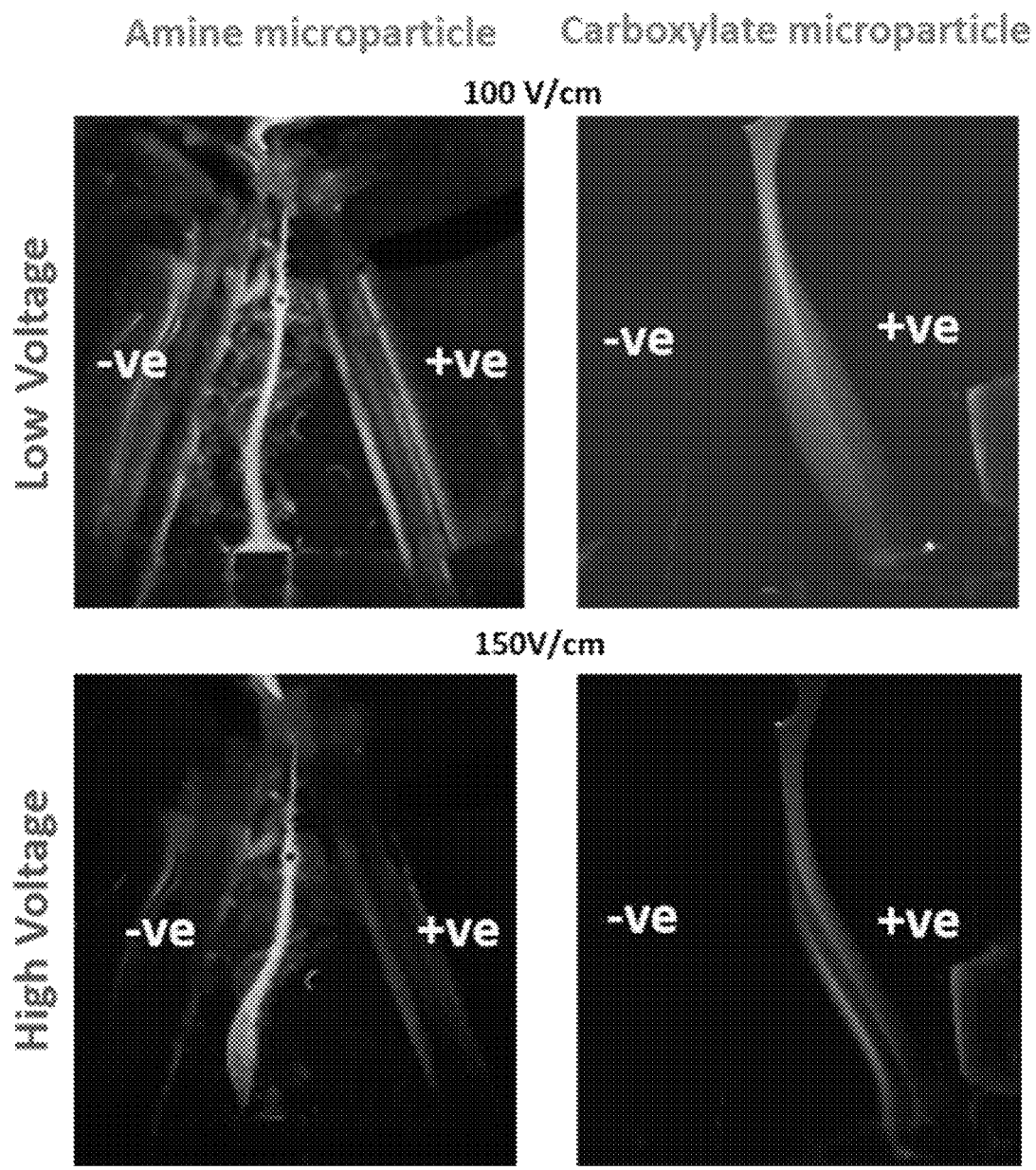
FIG. 4 shows separation chip optimization using 50 nm carboxylated and aminated polystyrene nanoparticles. Top row: The deflection of aminated (left) and carboxylated (right) nanoparticles under a potential bias of 100 V. Bottom row: Increased deflection of aminated (left) and carboxylated (right) nanoparticles under a higher potential of 150 V.

Optimized Conditions for Carboxylated and Aminated Latex Particles in the Separation Chip In order to test and optimize the performance of the separation chip, fluorescently labeled carboxylated and aminated latex nanoparticles (50 nm) were initially selected as a sample analyte. pH streams of 2 and 10 from two outlets coming from the pH generation chip was fed into the pH inlets of the separation chip whereas the labeled nanoparticles (0.25% solids (w/v)) were injected into the sample inlet of the separation chip (FIG. 4). After selecting a pH flow rate of 12 mL/hour for high throughput application, the potential applied across the chip was optimized. When a voltage bias of 100 V was applied across the separation chip, a small deflection in the carboxylated stream was observed with a broad focused peak (FIG. 4A). However, for aminated particles, the defection was minimal. As the voltage bias was increased to 150 V, a decent focusing of the particles was observed (FIG. 4B). It should be noted that in carboxylated nanoparticle separation: two focused bands were observed which should include the carboxylated particles as well as the charged fluorescent impurity (mostly fluorescent dyes). It is likely that this method can easily be extended towards the purification of nanoparticles from labeled dyes/impurities.

Optimized Conditions for Separating RNP and HDL

After successfully separating the LLPs namely HDL and LDL at a high throughput of 3 mL/hour, the CIF platform was then optimized for the separation of a RNP and LLP (HDL as the model LLP). In the previous study of HDL and LDL separation, the optimum voltage bias required to deflect the LLPs to their pIs was obtained prior to their residence time in the chip. The same voltage bias of 150 V was used in initial experiments for the separation of a mixture of HDL and RNP (see FIGS. 7A and 7B). A pH range of 2-10 (FIG. 7A) was selected to be transferred from the pH generation chip to the separation chip as the pIs of HDL and RNP lie on the acidic and basic side respectively. A series of snapshots of the experimental images (FIG. 7B) show that the nanocarriers mixture is being successfully deflected towards their respective pIs. However, the separation of these nanocarriers in the chip was not very efficient and two broad separation bands were observed as shown in the zoomed in images with the onset of separation skewed towards the acidic front. This issue was addressed by transferring a lower pH range 2-8 from the pH generation chip and increasing the voltage bias to 200 V to obtain a fine separation between RNP and HDL as shown in FIG. 8.

Xurography-Based Fabrication and Operation of CIF Device

Xurography-based pH gradient chip was fabricated by sandwiching together two polycarbonate sheets (300 μm thickness) between a double-sided Kapton tape (PPTDE-3, Katontape.com) containing the microfluidic structure using a plotter cutter (Graphtec Pro FC7000). Upstream of the pH generation chip comprises of an IEM-based water splitting slot followed by a tree-like microchannel (splitter-mixer) connected to a trapezoidal-shaped microfluidic channel downstream. The width and length of the splitter-mixer channels are 0.5 mm×26 mm while the trapezoidal-shaped chamber has a dimension of 20 mm×26 mm×37 mm (b1×b2×l). Bipolar membranes were fabricated by stacking together a Cation-Exchange Membrane (CEM) and an Anion-Exchange Membrane (AEM) (Mega a.s., Czech Republic) using UV-based glue (Acryfix). Several 5 mm pieces of polycarbonate clear tubing (McMaster-Carr) were cut and glued at inlets/outlets. 5 mL of Deionized water was injected using Multi-Syringe Programmable Syringe Pumps (Braintree Scientific) under 80 V (Keithley 2400 SourceMeter) unless otherwise specified. The device's working range was determined to be in between 9 mL/hour to 12 mL/hour and the latter was used for experiments except otherwise specified. The outlets of the pH generation chip were connected to a separation chip as well as to a dummy separation chip by silicone tubing (0.79 mm; 1/32 inch), Cole-Parmer) of the same length to minimize pressure imbalance between outlets. Similarly, the separation chip was also fabricated and operated as described above. The dimensions of the trapezoidal channel were 9 mm×26 mm×37 mm (b1×b2×l). Both sides of the trapezoidal microfluidic channel of the separation chip were exposed to two reservoirs that were filled with 4% agarose gel. 200 V was applied transverse to the sample flow unless specified otherwise, and the sample was injected at a flow rate of 3 mL/hour.

3D Printed Chip

A 3D model was designed in Solidworks 2019 (FIG. 9) and a stereolithography (.stl) file was sent to a commercial vendor (Boston Micro Fabrication, Maynard, MA) to fabricate a 3D printed chip with HTL resin.

Use of auto-CIF Analyzer for 3D-printed CIF Microfluidic Chip

Figure 10A:
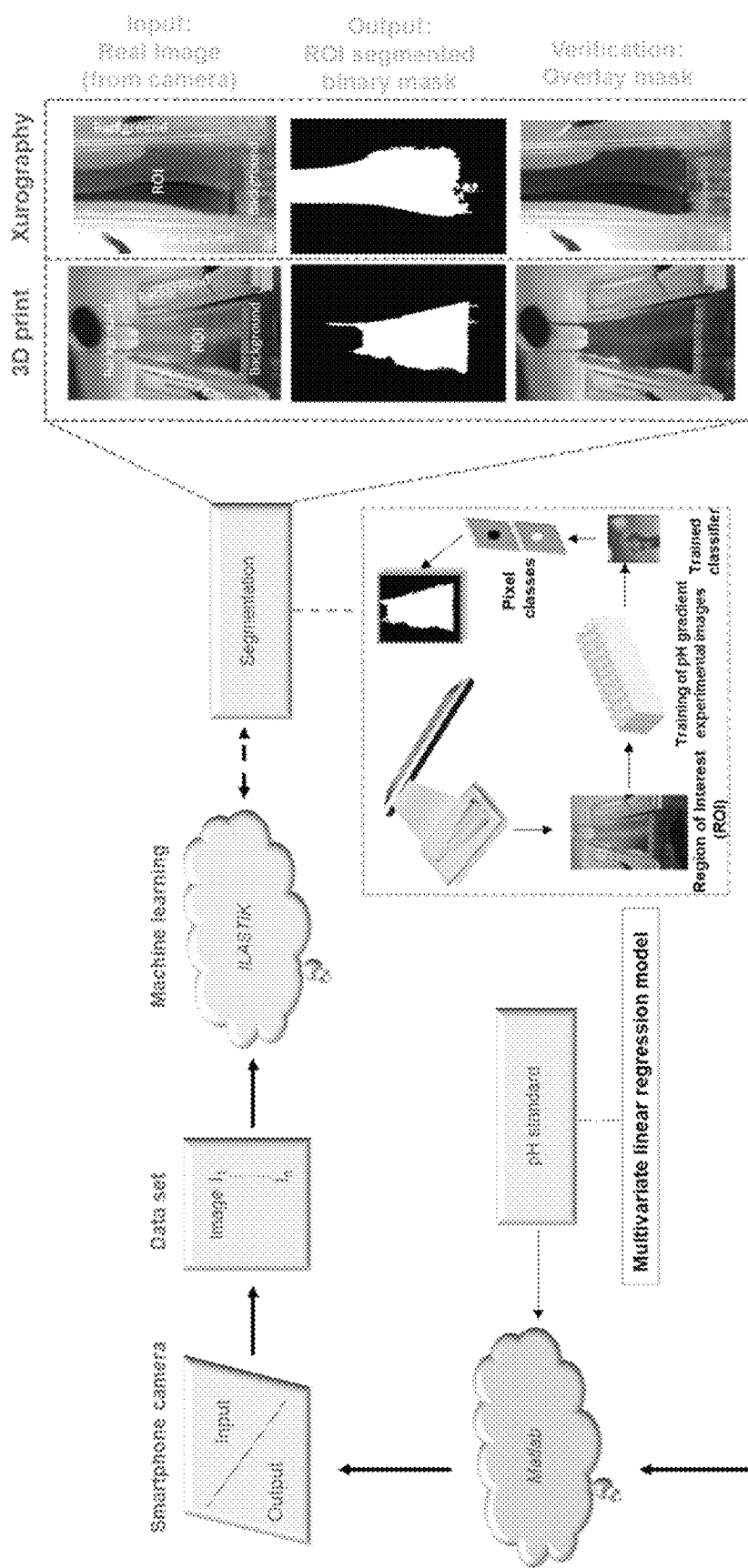
FIG. 10A-O show machine learning based auto CIF analyzer platform for improved pH judgment and experimental tunability.
Figure 10B:
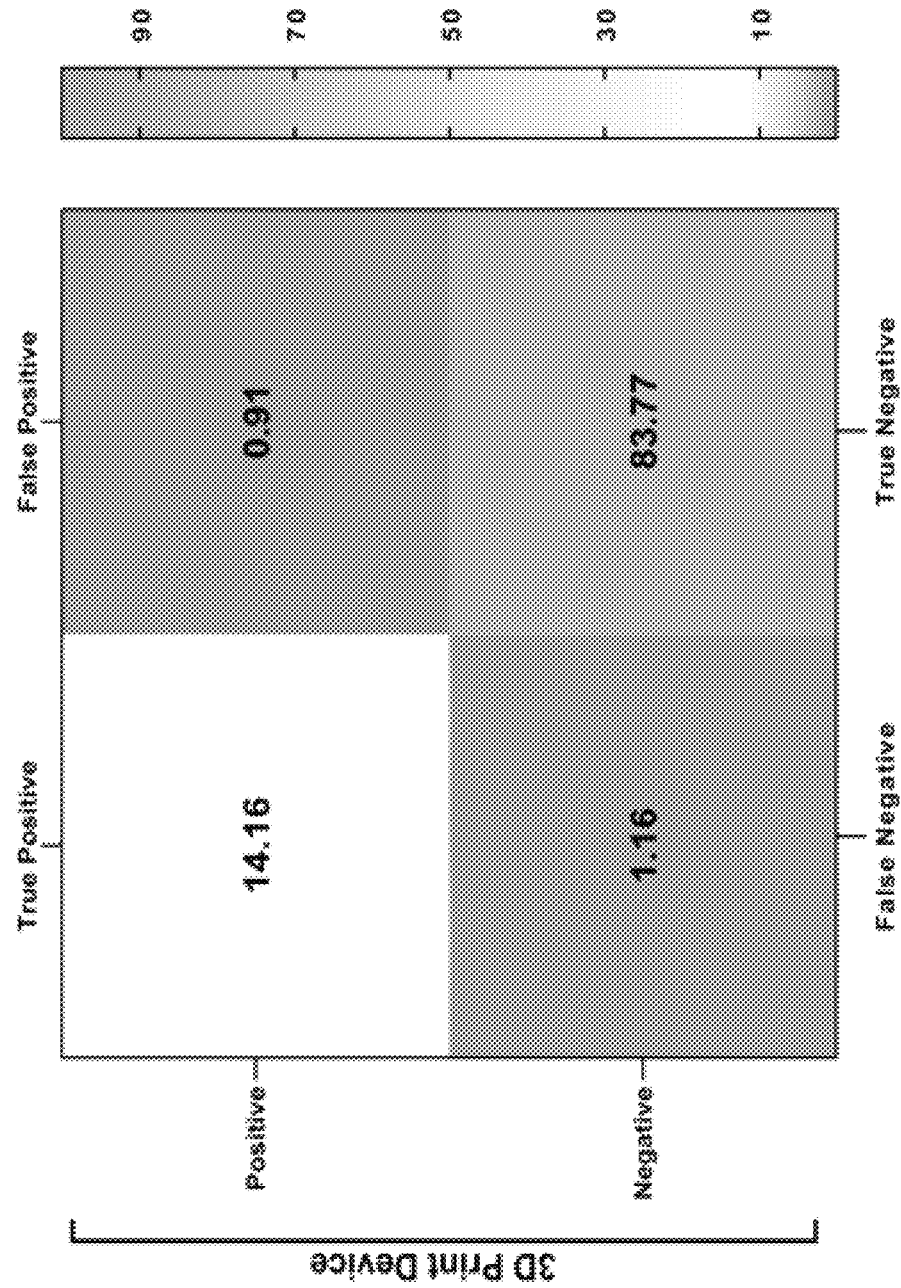
FIG. 10B shows a confusion matrix generated for the 3D printed device showing excellent pixel-wise classification accuracy for ilastik classifier trained to identify the ROI. The numbers shown in the boxes represent the percentage prediction accuracy in which a pixel is classified in vertical labels as compared to its true class shown horizontally.
Figure 10C:
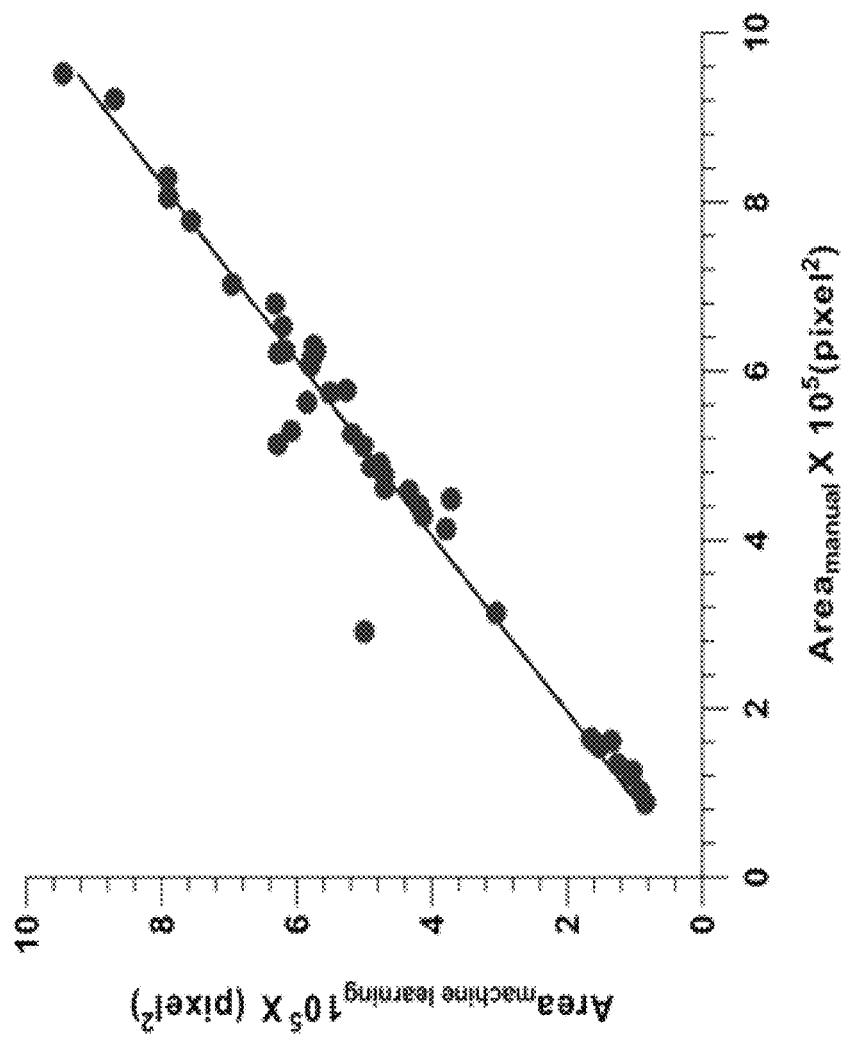
FIG. 10C shows an ROI area of test images for 3D printed chip predicted by auto-CIF versus measurement performed manually. The slope (0.96) and R square value (0.96) indicate an excellent performance of the semantic segmentation module.
Figure 10E:
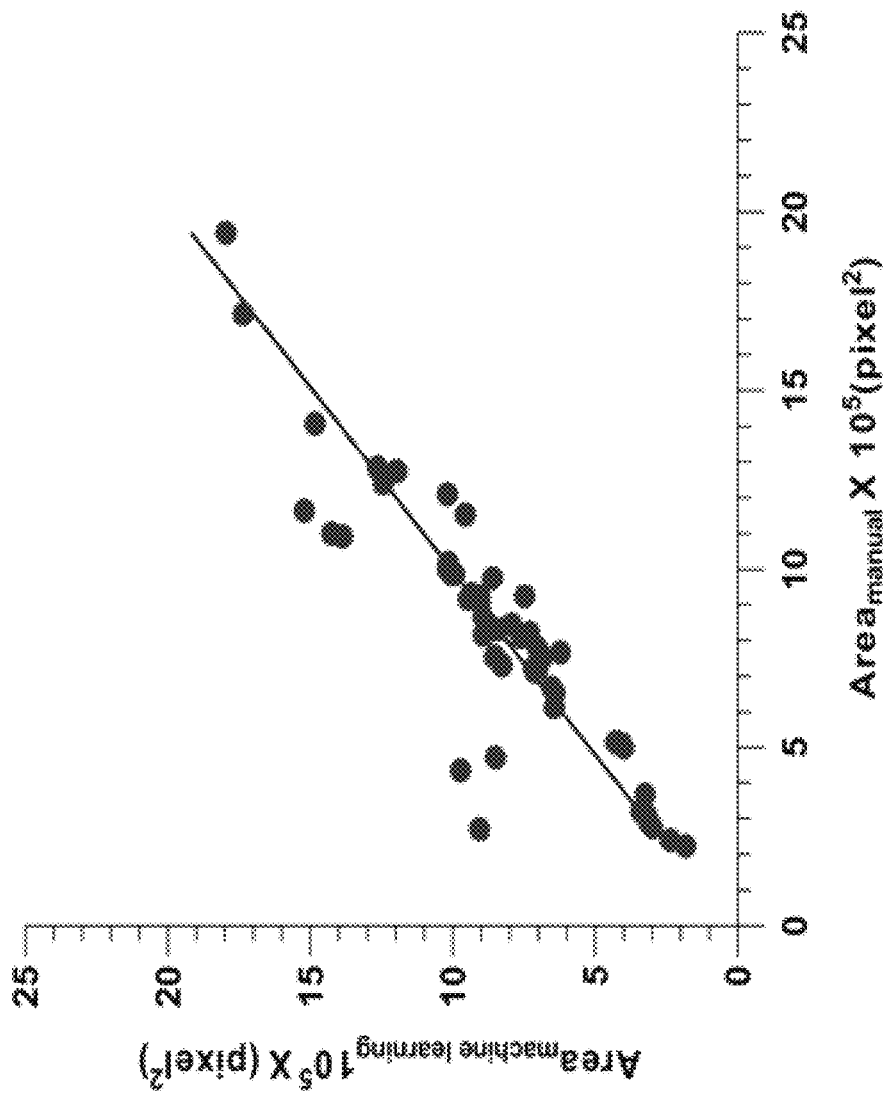
FIG. 10E shows measurements of ROI area of test images for xurography-based chip predicted by auto-CIF versus measurement of ROI area performed manually. The slope (0.97) and R square value (0.91) indicate excellent performance of the semantic segmentation module.
Figure 10F:
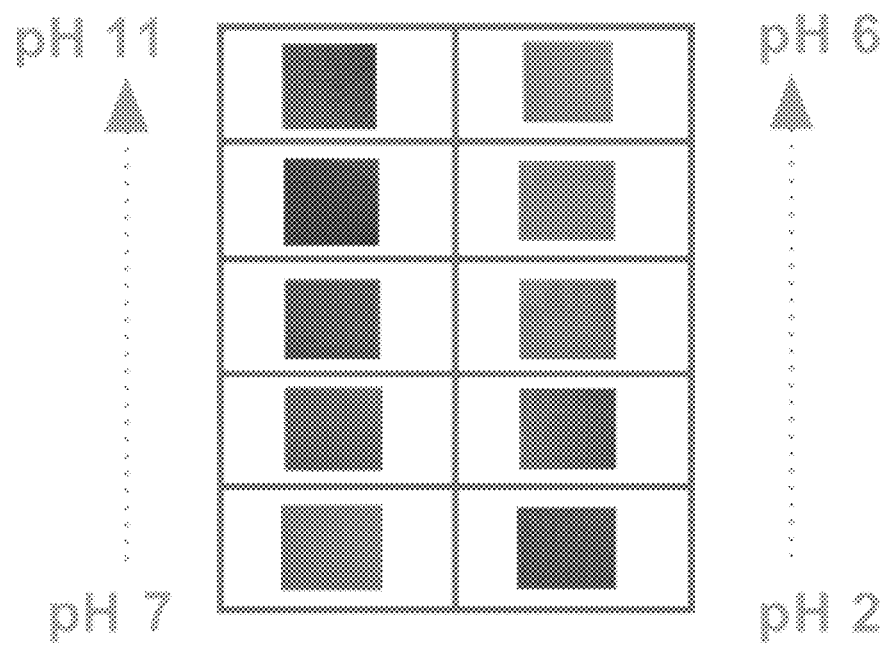
FIG. 10F shows an array of images captured in the 3D printed device corresponding to different pH values.
Figure 10G:
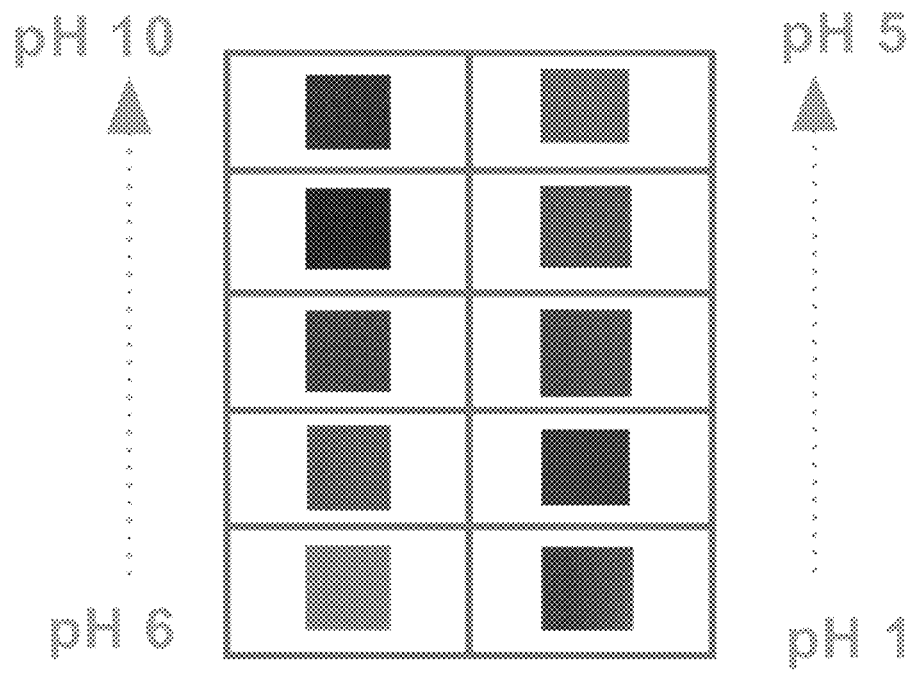
FIG. 10G shows a series of images taken from a pH reference chart (Hydrion One Drop Indicator Solution Kit 1-11).
Figure 10H:
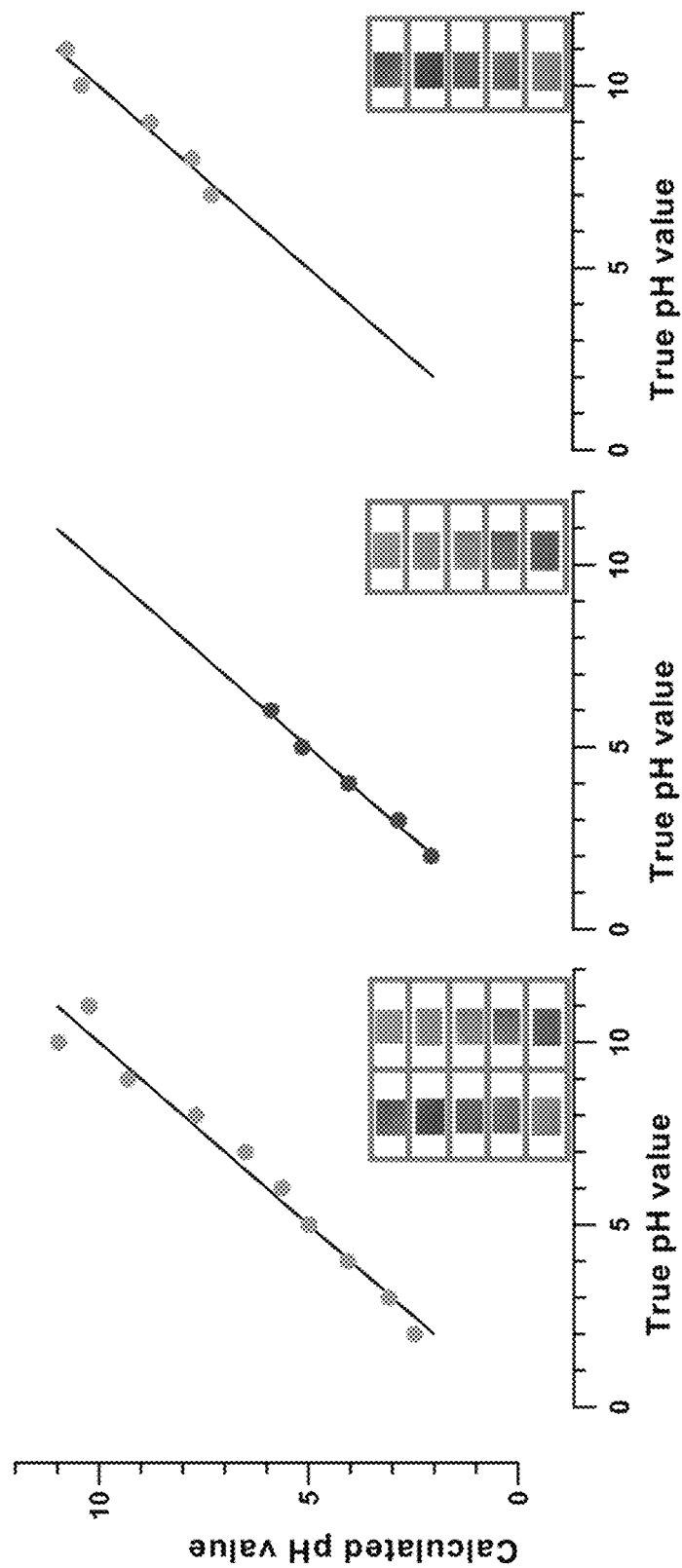
FIG. 10H shows graphs of the calculated pH value versus the true pH value for a 3D printed chip obtained by multivariate linear regression using all the normalized mean RGB values as independent variable vectors (MSE=0.573), only acidic (pH=[2-6]) normalized mean RGB values as independent variables (MSE=0.175) and only basic (pH=[7-11]) normalized mean RGB values as independent variables (MSE=0.468).
Figure 10I:
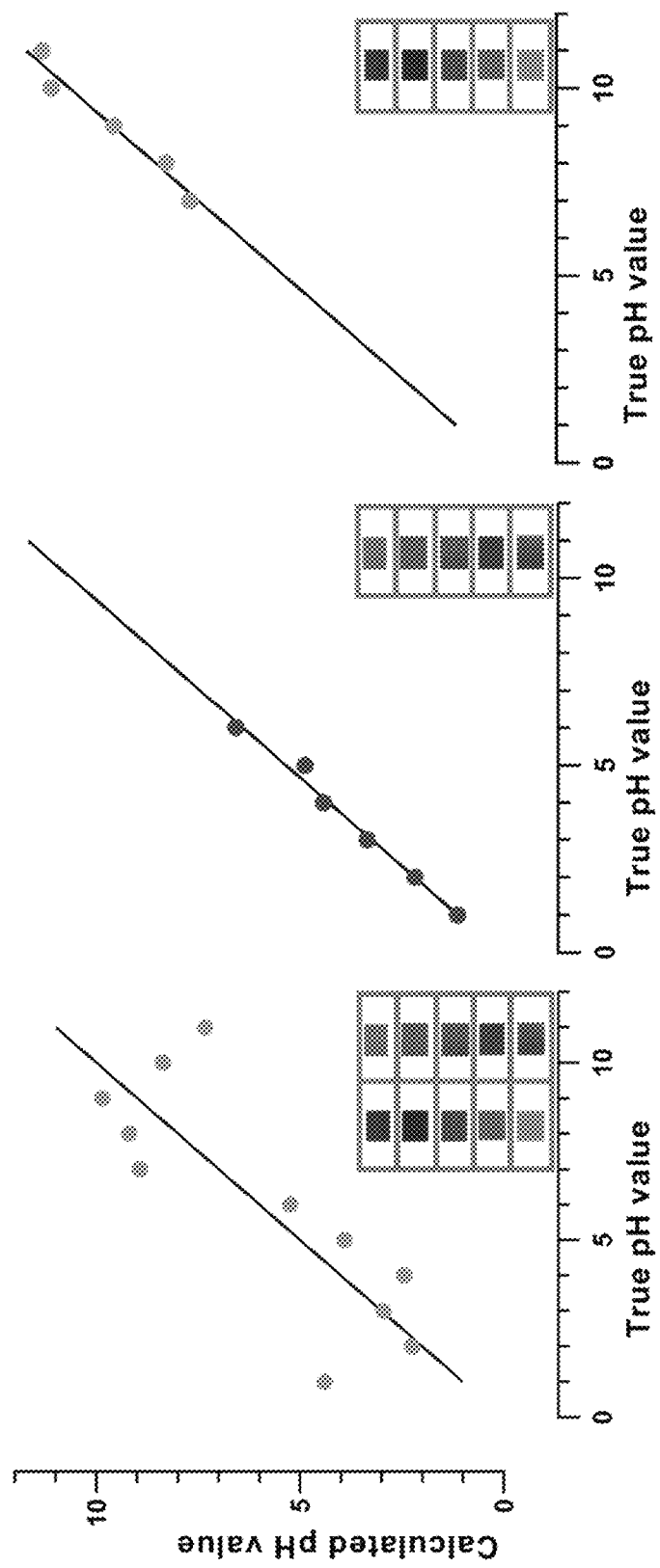
FIG. 10I shows graphs of the calculated pH value versus the true pH value for xurography based chip obtained by multivariate linear regression using all the normalized mean RGB values as independent variable vectors (M.S.E=2.17), only acidic (pH=[1-6]) normalized mean RGB values as independent variables (M.S.E=0.29) and only basic (pH=[7-11]) normalized mean RGB values as independent variables (MSE=0.448).
Figure 10J:
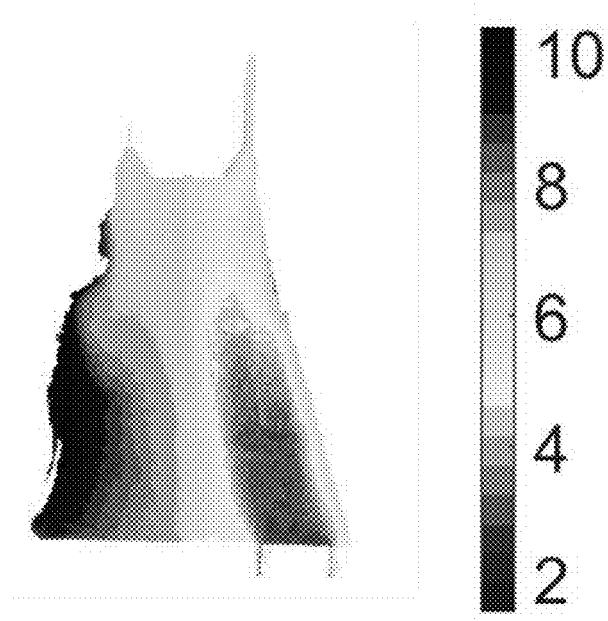
FIG. 10J-K show pH heatmaps of representative 3D printed (FIG. 10J) and xurography based (FIG. 10K) chips after ROI detection using the image segmentation module.

The 3D printed CIF chip is printed with HTL resin (the most transparent resin currently available in the market for the 3D-printer that can print the CIF geometry) has an inherent background from the photo-polymerized resin, which can skew visual pH measurements. Hence, the auto-CIF analyzer was a necessary tool to identify the outlets for effective pH range transfer to the 3D printed separation chip. The workflow is the same as described previously for xurography-based chips. For the image segmentation module, the machine learning classifier was trained on images from 3D printed chips and the confusion matrix of the testing data is shown in FIG. 10B. The classifier yielded an accuracy of 97.93%, sensitivity of 91.57%, and specificity of 98.91%. Furthermore, the segmented area predicted by machine learning is in excellent agreement with the area of the ROI calculated manually as shown in FIG. 10C. Owing to the background of the 3D printed chip, sequential digital images were taken by injecting different known pH solutions into the chip (FIG. 10F). By using all the normalized mean RGB values as independent variable vectors, a good correlation with its pH value was obtained with a MSE of 0.573 (FIG. 10H). The error was even further reduced by dividing the data into acidic (pH=[2-6]) and basic pH values (pH=[7-11]) yielding a pH MSE of 0.175 and 0.468, respectively (FIG. 10H). Subsequently, a pH surface plot was generated for a sample segmented test image of the 3D printed device as shown in FIG. 10J. The auto-CIF analyzer platform can conceptually be further used for other applications whose output corresponds to a digital image comprising of a gradient of colors such as concentration gradient generation, colorimetric ELISA, and similar tests.

Calculation of Separation Performance Metrics

The yield of an experiment is determined by the mass of protein obtained at each outlet as compared to the initial mass used for the separation experiment. Numerically, the yield for the $i^{th}$ outlet for each sample is calculated as:

$$\text{Yield}_i = \frac{(C_{sample} * \text{Volume}_i)}{(C_{Inlet} * \text{Inlet volume})} \times 100,$$

where the protein sample concentration is obtained by ELISA and Volume; is the volume collected from the $i^{th}$ outlet.

Recovery for a sample from the fractionation experiment is calculated using the values of the intensity peaks obtained from the spectrophotometer fluorescence scan for both inlet and sample outlet. For example, in the HDL and LDL separation experiment, recovery is calculated $$\text{Recovery}_{HDL} = \frac{(I_{HDL} - I_{LDL})_{HDL\,Outlet}}{I_{HDL\,Inlet}} \times 100;$$

$$\text{Recovery}_{LDL} = \frac{(I_{LDL} - I_{HDL})_{LDL\,Outlet}}{I_{LDL\,Inlet}} \times 100,$$

where $I_{HDL}$ is the HDL intensity peak value obtained from the denoted outlet, $I_{HDL\,Inlet}$ is the HDL intensity peak value of the sample in the inlet mixture, $I_{LDL}$ is the LDL intensity peak value obtained from the denoted outlet, and $I_{LDL\,Inlet}$ is the LDL intensity peak value of the sample in the inlet mixture The purity for HDL and LDL separation was determined using $$\text{Purity}_{HDL} = \frac{(\text{Yield}_{HDL})_{HDL\,Outlet}}{(\text{Yield}_{HDL} + \text{Yield}_{LDL})_{HDL\,Outlet}} \times 100;$$

$$\text{Purity}_{LDL} = \frac{(\text{Yield}_{LDL})_{LDL\,Outlet}}{(\text{Yield}_{HDL} + \text{Yield}_{LDL})_{LDL\,Outlet}} \times 100.$$

For HDL and RNP separation experiments, purity was determined using:

$$\text{Purity}_{HDL} = \frac{(\text{Yield}_{HDL})_{HDL\,Outlet}}{(\text{Yield}_{HDL} + \text{Yield}_{RNP})_{HDL\,Outlet}} \times 100;$$

$$\text{Purity}_{RNP} = \frac{(\text{Yield}_{RNP})_{RNP\,Outlet}}{(\text{Yield}_{HDL} + \text{Yield}_{RNP})_{RNP\,Outlet}} \times 100.$$

For LDL and Exosome separation experiments, purity was determined using:

$$\text{Purity}_{LDL} = \frac{(\text{Yield}_{LDL})_{LDL\,Outlet}}{(\text{Yield}_{LDL} + \text{Yield}_{Exosome})_{LDL\,Outlet}} \times 100;$$

$$\text{Purity}_{exosome} = \frac{(\text{Yield}_{Exosome})_{Exosome\,Outlet}}{(\text{Yield}_{LDL} + \text{Yield}_{Exosome})_{Exosome\,Outlet}} \times 100.$$

For RNP separation from plasma experiments, purity was determined using:

$$\text{Purity}_{RNP} = \frac{(\text{Yield}_{RNP})_{RNP\,Outlet}}{(\text{Yield}_{RNP} + \text{Yield}_{HDL} + \text{Yield}_{Exosomes} + \text{Yield}_{LDL})_{RNP\,Outlet}} \times 100.$$

Numerical Simulation

A 2D finite element simulation model of the ionic behavior in both straight and trapezoidal channels was developed using COMSOL Multiphysics 4.4. The steady-state model solved the Poisson-Nernst-Planck (PNP) equations coupled with Poisson-Boltzmann (PB) and Navier-Stokes (NS) equations. For fluid flow, a fully developed flow was assumed with no slip boundary condition on the walls. For PNP and PB equations, the walls of the channel were assigned a DC voltage bias of −V/2 and +V/2 from left to right with a no net ionic flux boundary condition. A constant concentration boundary condition was applied at the inlet whereas at the outlet a zero diffusive boundary condition was specified.

Image Acquisition

All colorimetric images were captured by a smartphone (Apple iphone 11 Pro), which was mounted on a tripod in a dark chamber with an external white light source to maintain constant illumination condition. For capturing fluorescence images, the separation chip was placed on a Dark Reader blue transilluminator (DR89 Mid-Size Transilluminator, Clare Chemical Research) which used pure visible blue light as the excitation source. The amber screen was adjusted on top of the chip using a clamp.

Image Analysis for Line Intensity Plots

Matlab was used to split the separation fluorescence images into red, green, and blue channels. The contrast of the green channel image was enhanced using imadjust function and line intensity plots were made.

Auto-CIF Analyzer

A Matlab application was developed that integrates an image segmentation module (by running ilastik in headless mode) and a pH detection module. The app enables the user to load a captured digital image, view the segmented image of the ROI alongside the overlaid image using machine learning, and determines the pH surface plot across the ROI.

Image Segmentation Module and pH Detection Module of auto-CIF Analyzer

Semantic segmentation classifier using ilastik was developed for each chip type: polycarbonate-based chip and 3D printed chip. Two classes, ROI and background, were made for the binary classification. The classifier extracted a total of 37 features which includes color/intensity, edge, and texture. The interactive GUI of ilastik was used to manually label pixels, monitor the output, and calibrate the labels with further annotations until acceptable segmentation was obtained for all the training images using the default random forest classifier with 100 trees. After successfully training the classifier manually using their interactive GUI, the test images were batch processed to generate the labelled binary images. For the xurography-based chip, 29 images were trained, and 136 test images were batch processed whereas for the 3D printed chip, 21 images were trained, and 41 test images were batch processed to obtain segmentation masks. The segmentation mask was then cleaned to fill holes and remove noisy pixels by area filter. The original colorimetric test images were then exported to Matlab and its image labeler app was used to generate ground truth data for all the test images. The label corresponding to each pixel of the ground truth data and the predicted binary image was then compared across all test images for the respective chip type to calculate True Positive (TP), True Negative (TN), False Positive (FP) and False Negative (FN). These values are shown in tabular format (FIG. 11) and were used to make the confusion matrix (FIGS. 10B and 10D). Furthermore, other semantic segmentation metrics were calculated as defined as:

$$\text{Accuracy} = \frac{(TP + TN)}{(TP + TN + FP + FN)};$$

$$\text{Sensitivity} = \frac{TP}{(TP+FN)};$$

$$\text{Sensitivity} = \frac{TP}{(TP+FP)}.$$

Figure 12A:
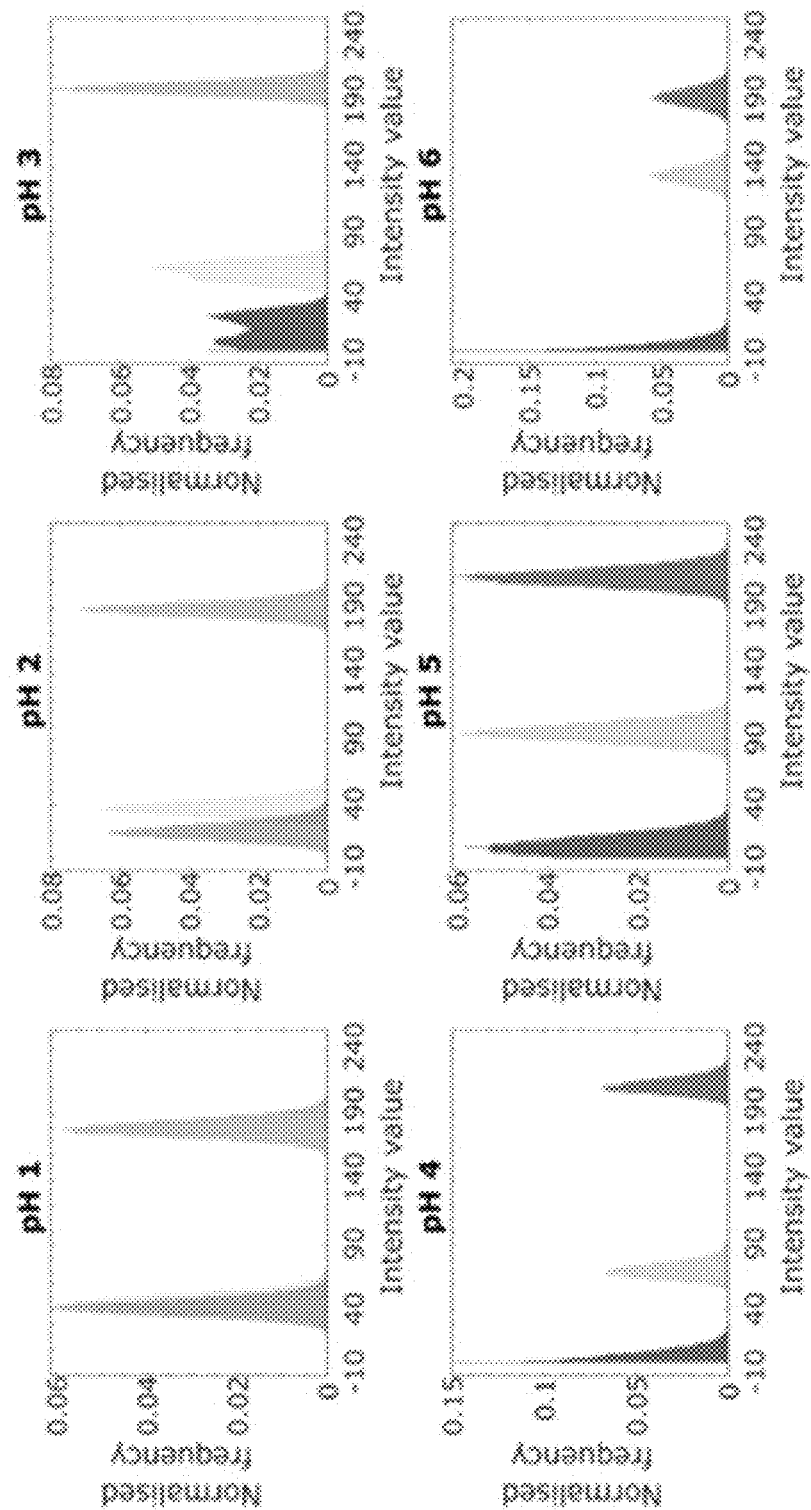
FIG. 12A-B show histograms of the red, green, and blue intensities of an image of a pH reference chart corresponding to acidic pH (FIG. 12A) and basic pH (FIG. 12B). The digital image was taken by a smartphone of the pH reference chart (Hydrion One Drop Indicator Solution Kit 1-11m, level7chemical.com) shown in FIG. 10G.
Figure 12B:
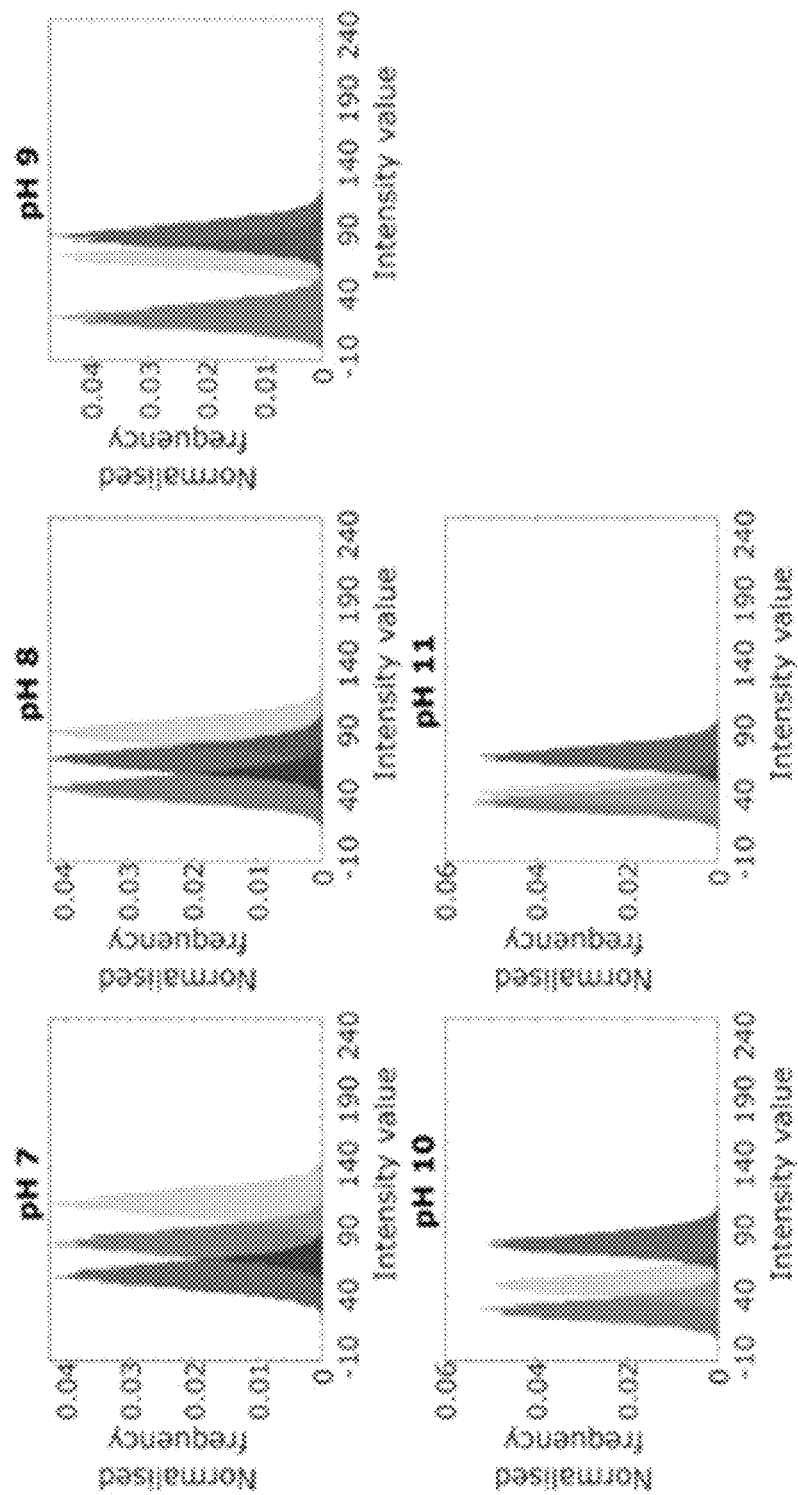

In the pH detection module, two different calibration curves were generated depending upon the chip type. For the transparent xurography-based chip, first, an image was taken by a smartphone of the pH reference chart of Hydrion pH Indicator Solution (Microessential lab, Cat. UI-100). The histograms of the RGB values corresponding to each pH [1-11] are shown in FIG. 12. Mean RGB values were then calculated corresponding to each pH value. To further minimize the effect of uneven illumination from the constant illumination source on the mean RGB values, they were additionally normalized to obtain R, G, and B values such that:

$$\hat{R} = \frac{R}{R+G+B};$$

$$\hat{G} = \frac{G}{R+G+B};$$

$$\hat{B} = \frac{B}{R+G+B}.$$

A multivariate linear regression model was developed based on the $\hat{R}\hat{G}\hat{B}$ values using:

$$pH = \alpha\hat{R} + \beta\hat{G} + \gamma\hat{B},$$

where $\alpha$, $\beta$, and $\gamma$ are fitting coefficients.

Figure 13A:
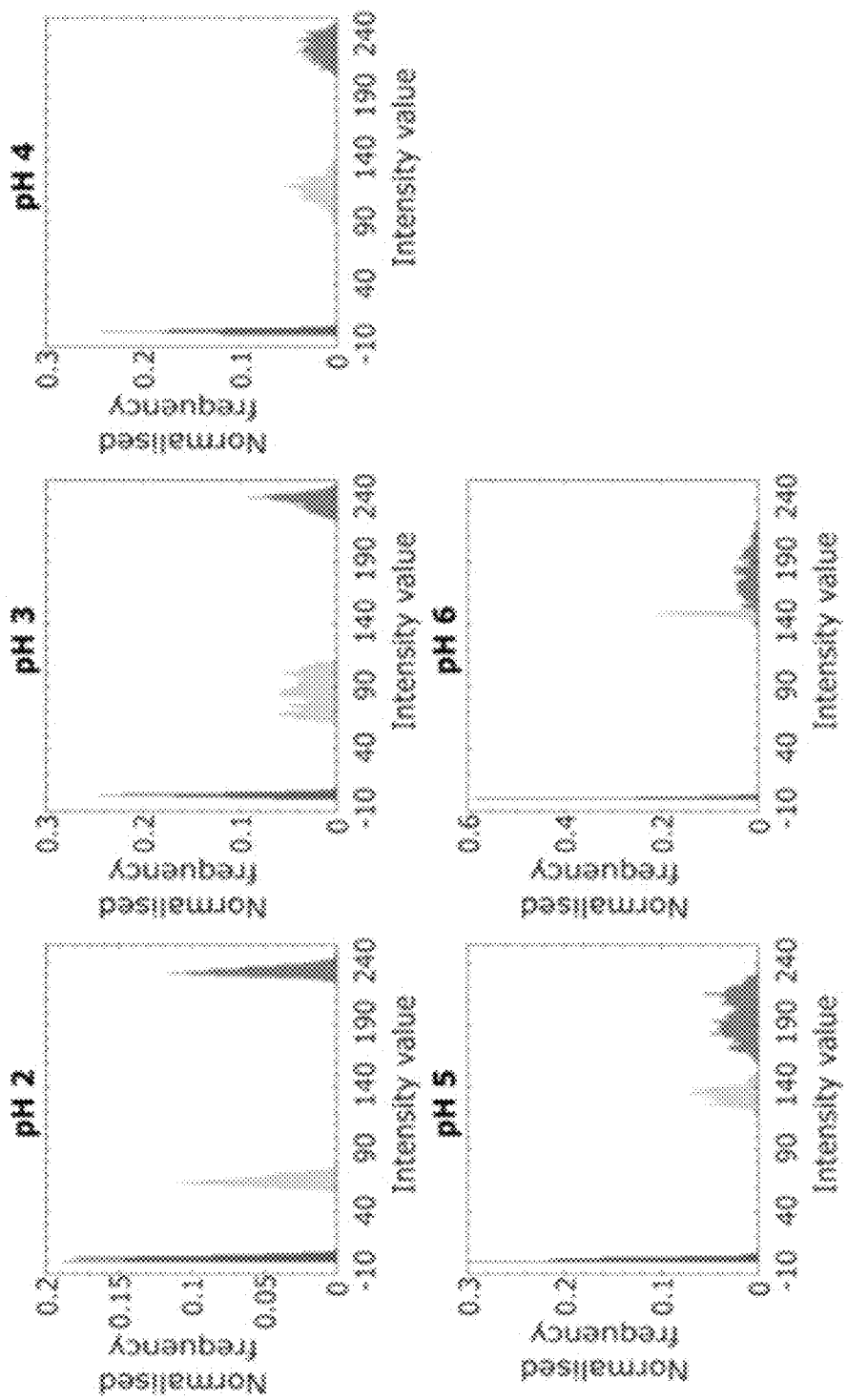
FIG. 13A-B show histograms of the red, green, and blue intensities of images (shown in FIG. 10F) corresponding to acidic pH (FIG. 13A) and basic pH (FIG. 13B) for 3D printed chips.
Figure 13B:
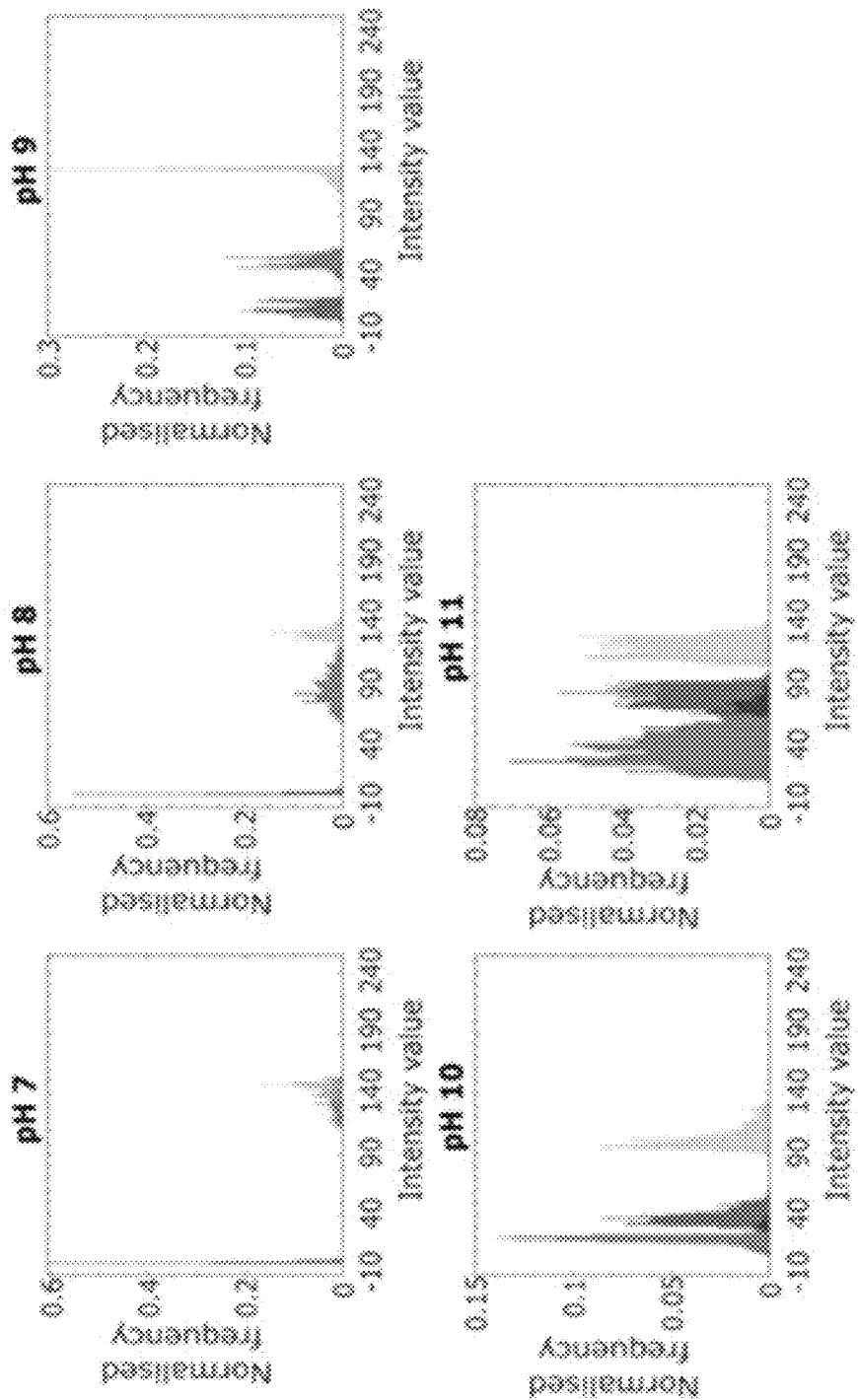

In the case of the 3D-printed chip, owing to the presence of large background, a new calibration curve was generated by taking a sequence of images by injecting different known pH solutions into the chip. The histograms of the RGB values corresponding to each pH [2-11] are shown in FIG. 13. Once the coefficients were obtained for each chip type, the linear formula was used to calculate the pH corresponding to each pixel in the experimental image. The segmented image of the ROI was multiplied by the original colorimetric image, and a pH surface plot across the ROI was generated.

Quantification and Statistical Analysis

OriginPro 8.6 and GraphPad Prism were used for graphical representation along with statistical analysis. The data in this study have been presented as mean±standard deviation unless otherwise specified. For statistical analysis, GraphPad Prism was used to perform Student's two-tailed independent t-test with Welch correction, and a p-value less than 0.05 was considered statistically significant.

Example 2

Design of Integrated CIF Microfluidic Platform

Figure 1C:
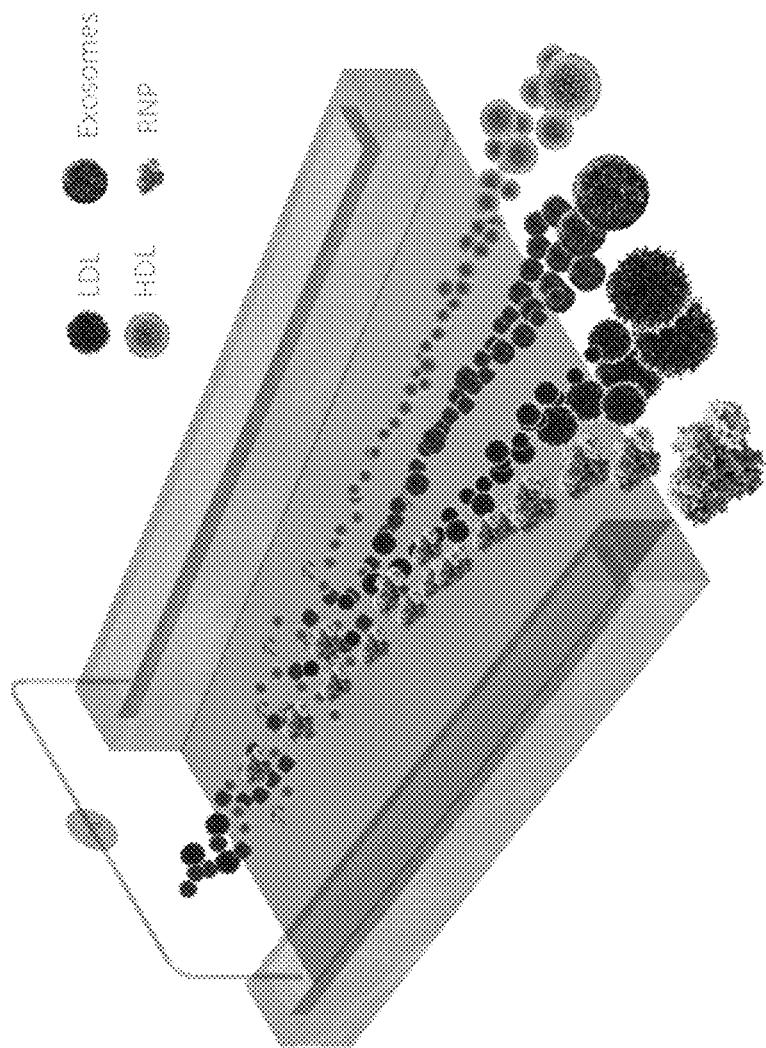

The CIF device consists of two microfluidic chips: (i) an upstream pH gradient chip for the generation of a coarse pH gradient (pH 3-11) from water (see inset of FIG. 1A). A portion of the effluent from the pH gradient chip is then injected downstream into (ii) a separation chip to produce a high-resolution pH gradient to enable the isoelectric focusing of different nanocarriers (FIGS. 1A and 1C). The only calibration needed is to determine the portion of the effluent of the first chip should be extracted to separate specific nanocarriers in the downstream separation chip.

The pH gradient chip incorporates a pair of bipolar membranes (BiM), which splits water into $H_3O^+$ and $OH^-$ ions under optimized reverse bias voltage. These ions are electrophoretically driven through their respective membranes into the main channel where they are then partitioned (FIG. 1B) via a splitter-mixer microfluidics design to a trapezoidal channel. The $H_3O^+$ and $OH^-$ ions at different lateral positions of the pH gradient chip are further transported to a trapezoidal separation chip (or multiple separation chips), where a high-resolution pH gradient is formed (e.g., pH=3-6 for HDL and LDL, pH=2-8 for HDL and RNP, pH=4-5.5 for exosome) (FIG. 1C). The unique geometric design of the separation trapezoidal channel together with optimized flow rates facilitate a high-resolution pH gradient with a high separation efficiency.

Stretchable Linear pH Profile by a Transverse Field

The robustness of the scalable linear pH profile in both the trapezoidal chambers of the pH gradient generation and separation chips is a key to the design. It removes the need for immobilized ampholyte to maintain a stable pH gradient in a gel or matrix that does not permit high throughput. A simple mechanistic explanation is provided based on the relative distributions of the $H_3O^+$ and $OH^-$ ions as well as the anions and cations in the buffer solution, that leads to this surprising but desirable feature. As their generation modules are on opposite sides of the channel, the first set of reactive ions are segregated at two ends of the flow channel upon entry. This stipulates that their charge-compensating ions are inert buffer ions and not each other. The buffer ions will redistribute from the middle of the channel, in the presence of the transverse field, to ensure electroneutrality. Once established, the zero-flux Boltzmann distributions (with equal but opposite electromigration and diffusive flux) of the inert buffer ions are dominant, with $H_3O^+$ and $OH^-$ equilibrating rapidly via the rapid and reversible water dissociation reaction whose water dissociation kinetics has been favored by the deficiency of either $H_3O^+$ or $OH^-$. By introducing two streams of different pH into the separation channel, the field at the separation chip maintains the universal buffer ion Boltzmann distributions and segregation of the reactive $H_3O^+$ and $OH^-$ ions, but with a different average pH and buffer concentration. This universal feature allows extraction of any linear pH profile and stretching its spatial resolution by an arbitrary factor downstream.

Figure 3A:
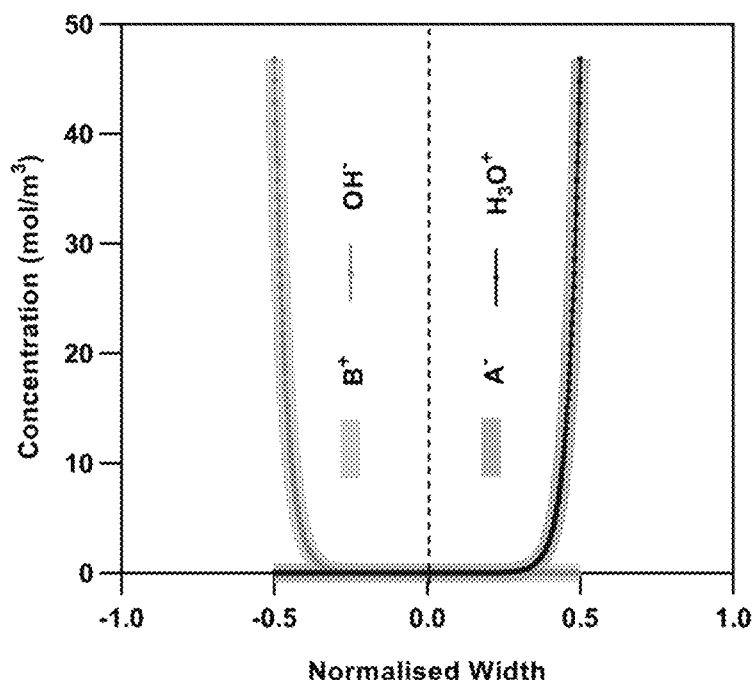
FIG. 3A-F show theoretical, finite element (FEM) simulations, and experimental results of pH gradient generation and separation chip.
Figure 3B:
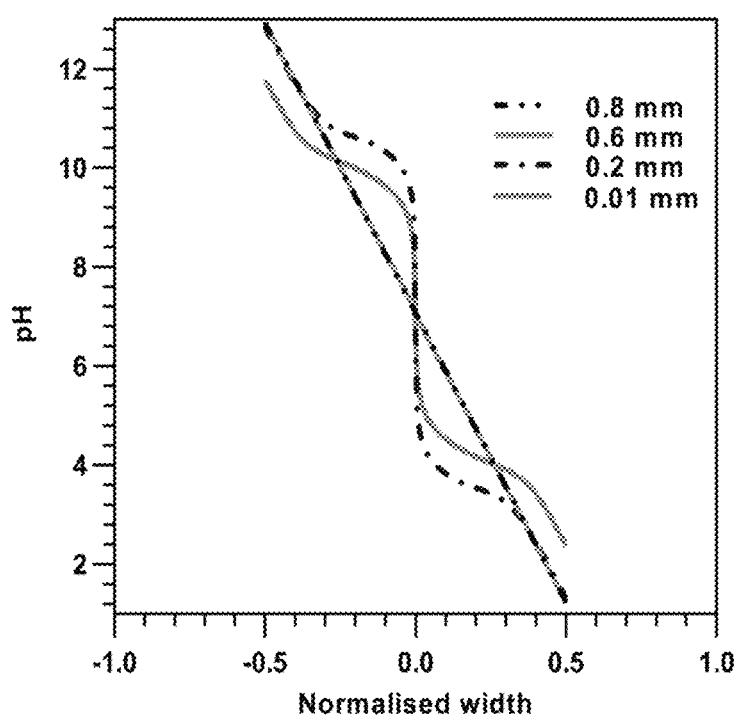
Figure 3C:
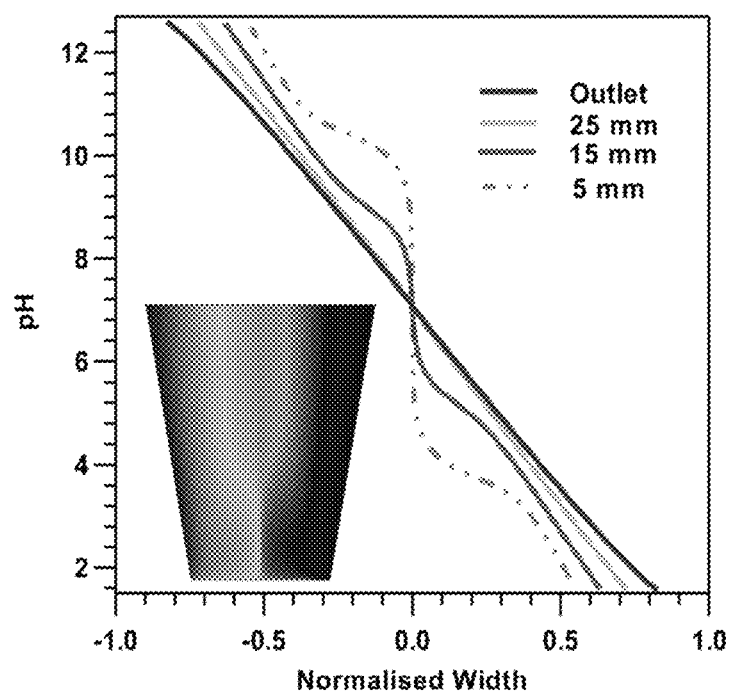
Figure 3D:
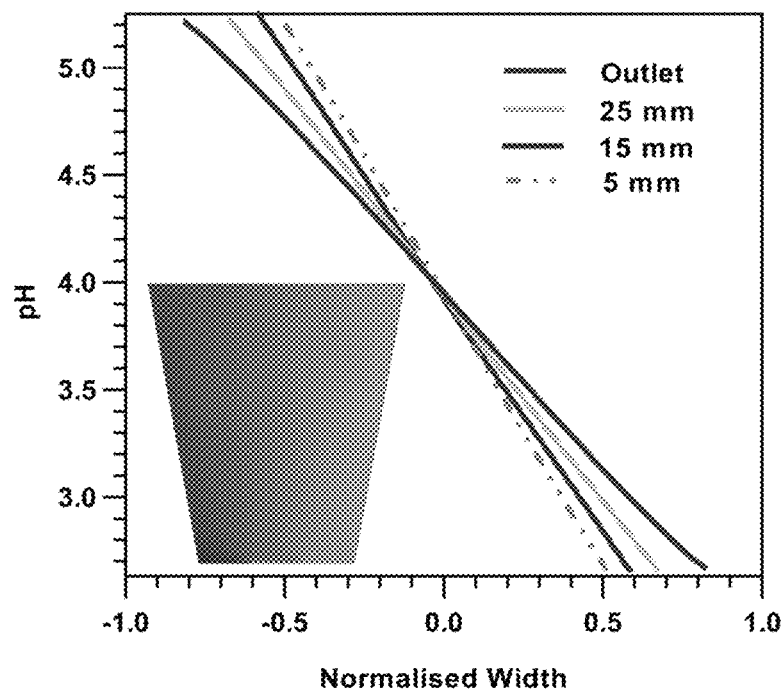
Figure 3E:
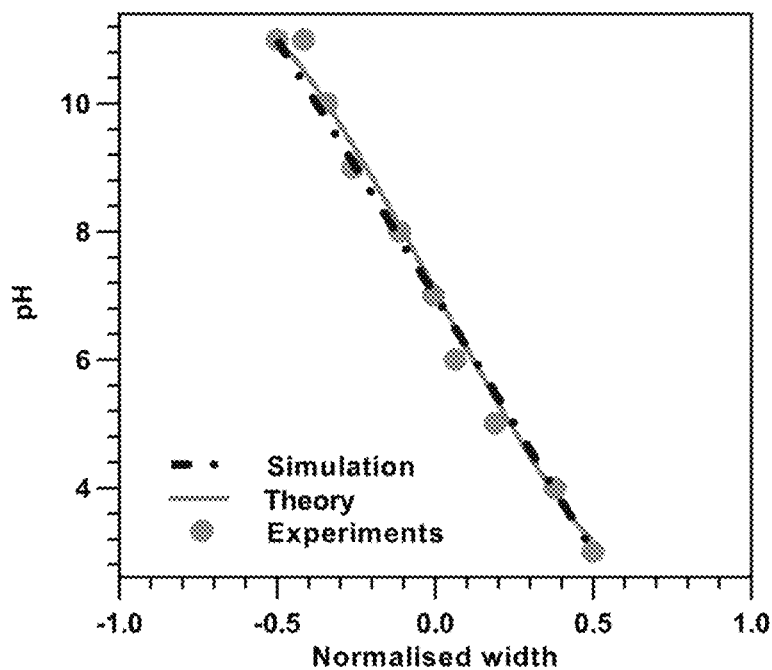
Figure 3F:
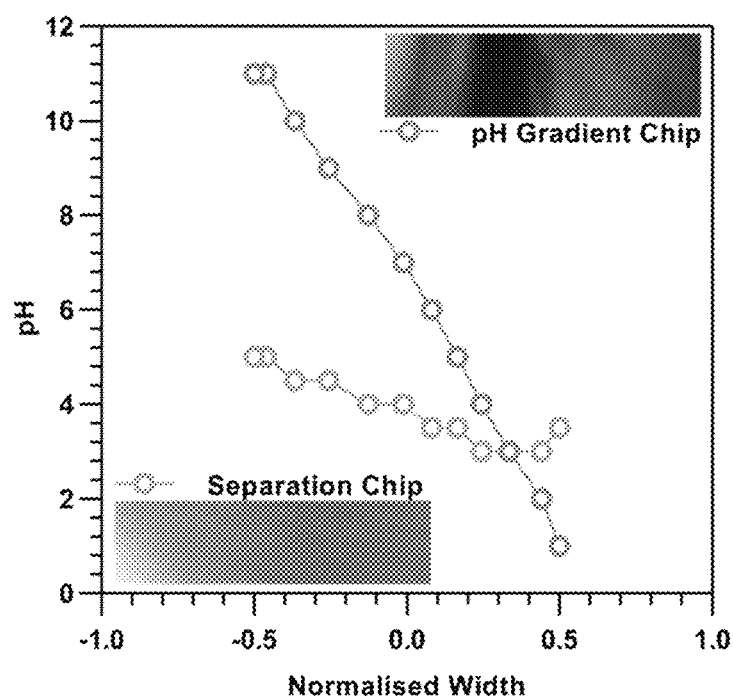

This design concept was benchmarked against finite element method (FEM) simulations. FIG. 3A shows the concentration profiles of the two dominant ions (labelled $A^-$ and $B^+$, respectively) in Boltzmann equilibrium while the hydroxide and hydronium ions are in negative Boltzmann equilibrium as predicted by the theory. Also, FIG. 3B shows that pH profile becomes linear moving downstream in x confirming the theoretical predictions. Scale invariant pH stretching suggests that instead of the commonly used rectangular microchannels, a trapezoidal geometry can reduce the pH gradient and provide a higher resolution pH profile. This was confirmed experimentally, where the pH profile calculated numerically agrees well with the experimental measurements when normalized by the angle θ and length/of the trapezoidal arm, as shown in FIG. 3E. Furthermore, FIG. 3C shows that in a trapezoidal geometry, after an inlet transition region, the pH profile fans out radially parallel to the trapezoidal boundary. FIG. 3D shows a section of the pH profile (pH: 3-5) from FIG. 3C when fed to a trapezoidal chamber merely stretches out downstream with same pH range and is experimentally confirmed further in FIG. 3F. The experimentally measured pH profiles for both the pH gradient and separation chips are in good agreement with the numerically computed ones shown in FIGS. 2c and 2d, where a negative Boltzmann distribution offsets the natural Boltzmann distribution of the hydronium ions. Note that standard pH dyes make it difficult to visually discern narrow pH gradients (FIG. 3F inset). An automated process was developed using machine learning to accelerate and optimize the repeatable transfer of narrow pH gradients from generation to the separation chip.

Effluent Selection for Separating LDL and HDL Mixture Spiked in Buffer

Figure 15:
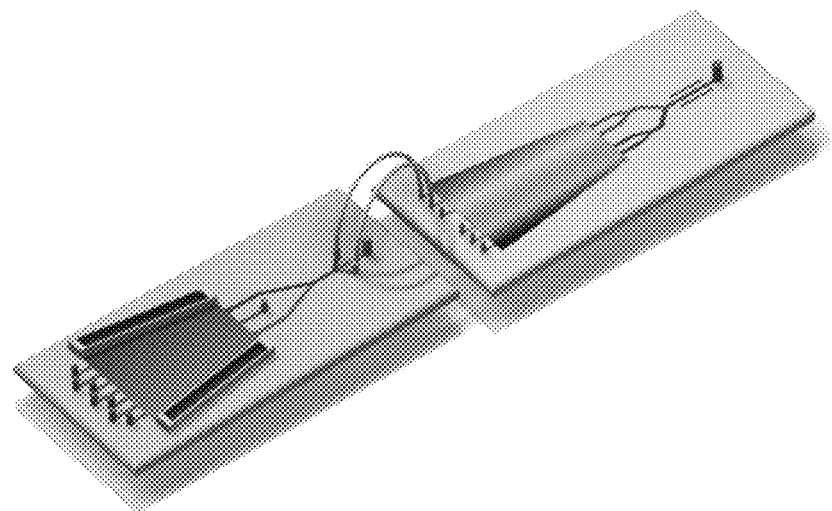
FIG. 15 shows schematics of the experiment for the separation of HDL and LDL mixture. Top: A pH gradient generation chip produces a wide pH (2-11) and a selective pH (3-6) that is transferred downstream into a separation chip. Bottom: The experimental images of the devices connected in a continuous manner depicting the transfer of a pH (3-6) downstream to a separation chip. Insets show the formation of the pH gradient in the pH gradient chip and the transferred pH (pH range 3-6).
Figure 15:
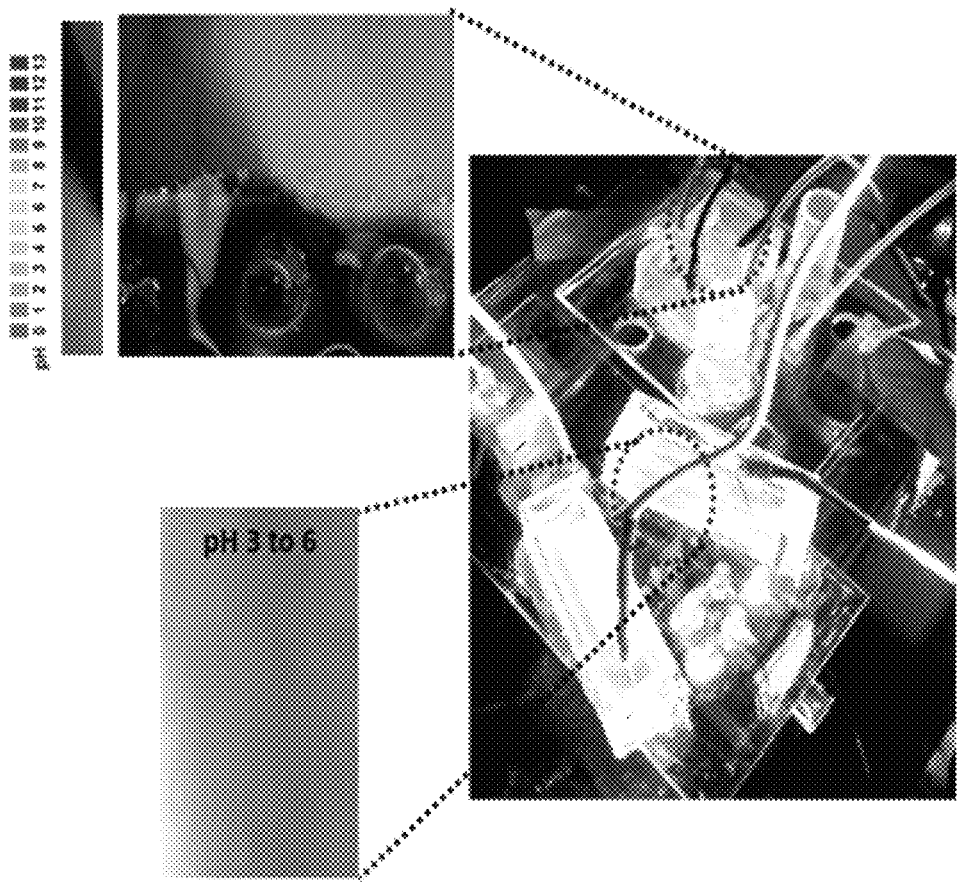

HDL (pI=4.62) and LDL (pI=5.01) cholesterol levels are important in determining the risk of coronary artery disease. They are also known to carry functional molecules that are biomarker candidates. Yet, a comprehensive understanding of their functional cargo is currently limited as the separation of these biomarkers from plasma at high throughput is challenging owing to very small differences in size and charge. Initial studies with individual nanocarrier show both HDL and LDL respond to a pH gradient and moved to their respective isoelectric points (FIGS. 6, 14, and 15. FIG. 16A shows the measured zeta potential of HDL and LDL to be $-16.56\pm3.73$ mV and $-12.44\pm1.85$ mV respectively, suggesting that their isoelectric fractionation will be challenging. Hence, to achieve their fractionation, a high-resolution gradient is created by transferring the pH=3 to 6 band from the pH gradient chip to the separation chip.

Figure 16B:
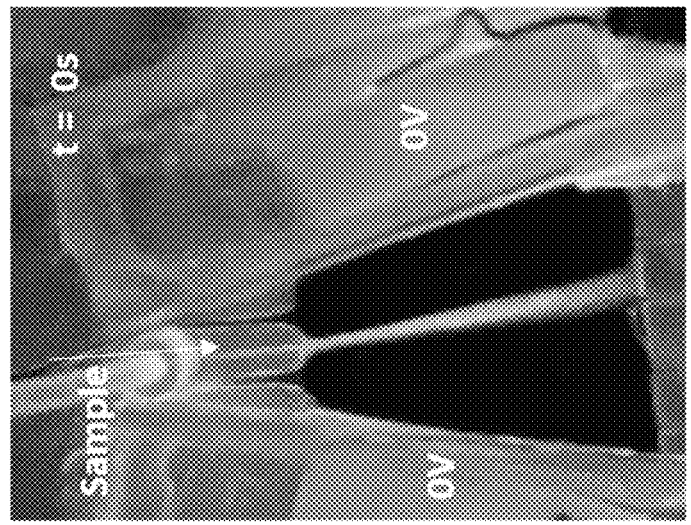
FIG. 16B shows sequential images of CFSE dye-tagged HDL (green) and Atto dye-tagged LDL (orange) mixture illustrating isoelectric focusing in the separation chip. When no voltage is applied, the mixture sample follows the injection streamline. At 150 V, the LLPs are deflected towards their respective isoelectric points, and eventually, two distinct streams are observed which are directed to two different outlets.
Figure 16B:
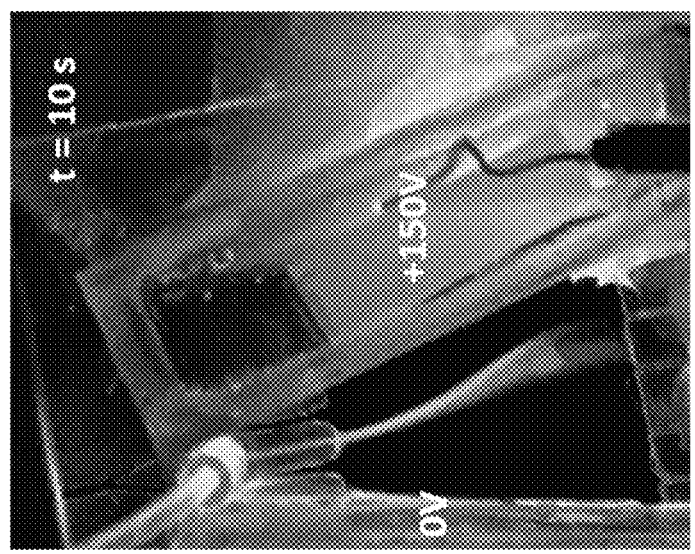
Figure 16B:
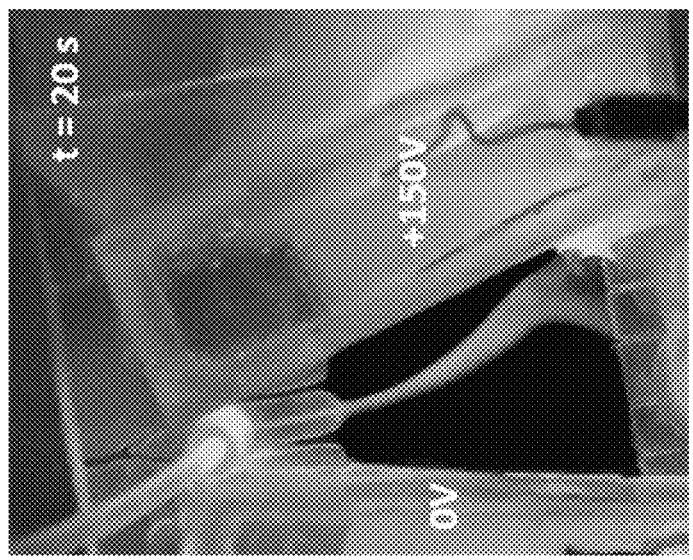
Figure 16C:
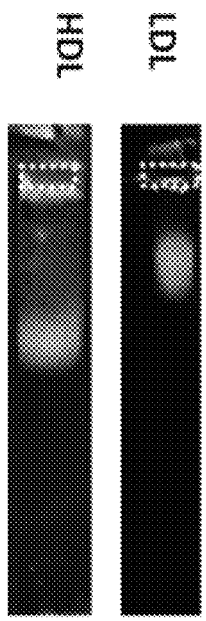
FIG. 16C shows on-chip gel electrophoresis of samples collected from the HDL outlet (outlet 1) and LDL outlet (outlet 2) showing negligible cross-contamination during CIF separation. The outlet numbering starts from right to left.
Figure 16D:
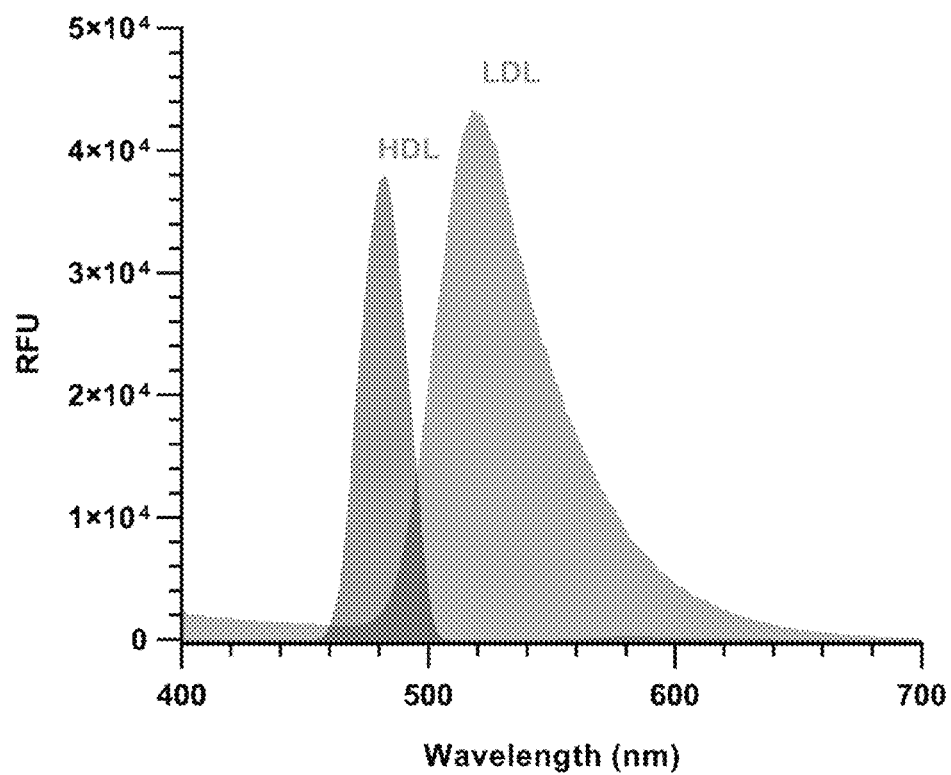
FIG. 16D shows fluorescence spectrophotometer data collected from the respective sample outlets 1 and 2 showing a high fraction of HDL and LDL, respectively, with very little cross-contamination.
Figure 16E:
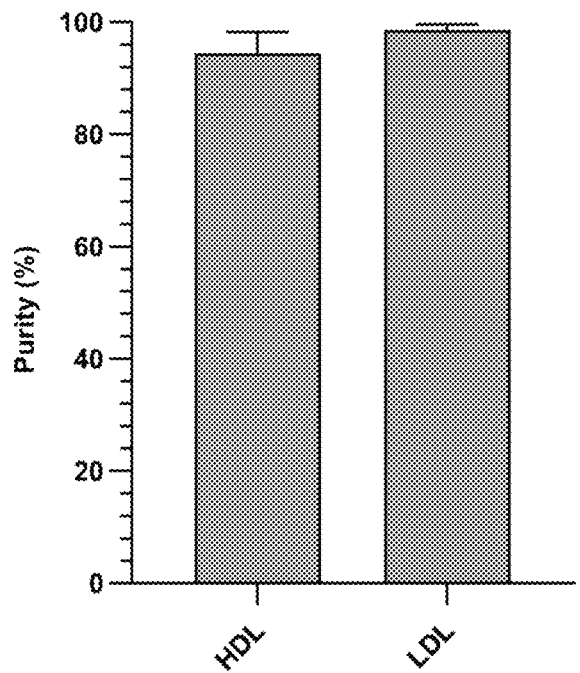
FIG. 16E shows that purities of HDL and LDL are 94.43+3.82% and 98.59+1.01% for n=4.
Figure 16F:
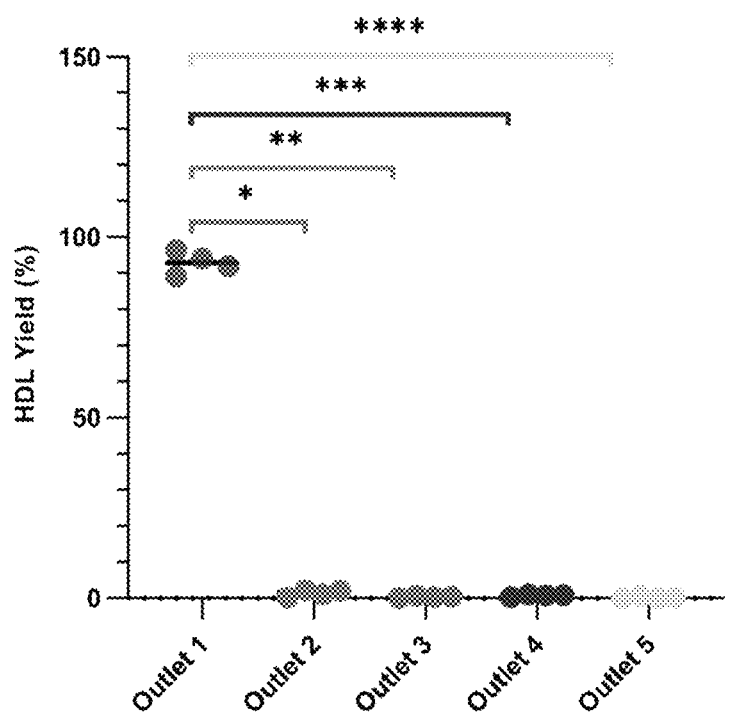
FIG. 16F shows box plots showing yield (obtained by Apo A1 ELISA) of HDL (n=4) obtained at different outlets with statistically significant difference between HDL outlet (outlet 1) as compared to all other outlets (*indicates p=2.51× $10^{-6}$;  indicates p=9.37×$10^{-6}$; * indicates p=8.94×$10^{-6}$; **** indicates p=9.01×$10^{-6}$).
Figure 16G:
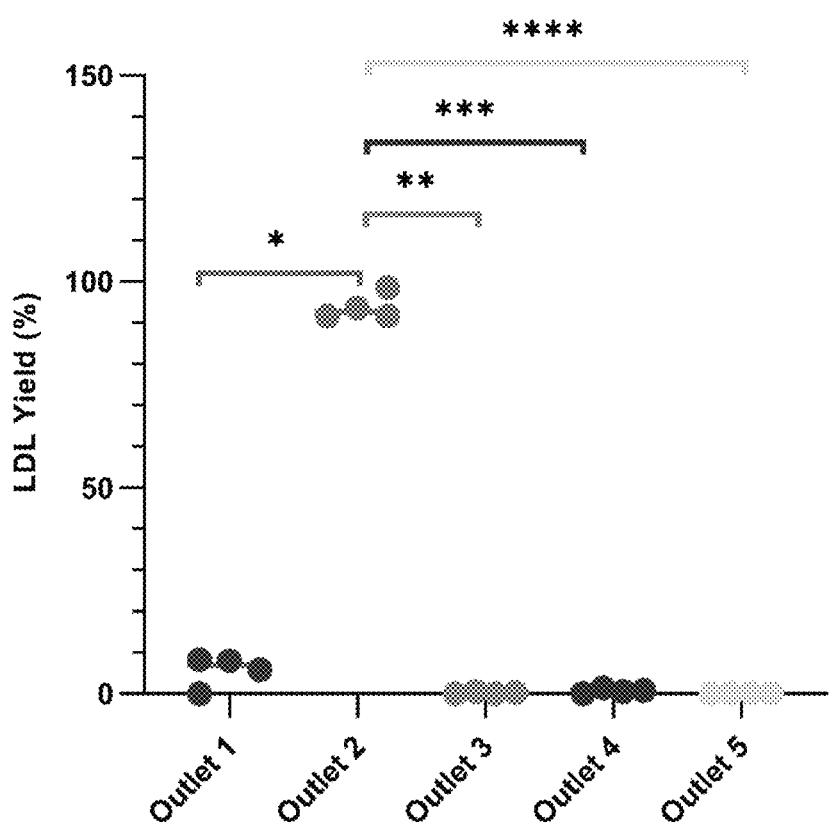
FIG. 16G shows box plots showing yield (obtained by ApoB ELISA) of LDL (n=4) obtained at different outlets with statistically significant difference between the primary LDL outlet (outlet 2) as compared to all other outlets (* indicates p=5.40×$10^{-8}$;  indicates p=9.90×$10^{-6}$; * indicates p=6.68×$10^{-6}$; **** indicates p=1.09×$10^{-5}$).
Figure 16H:
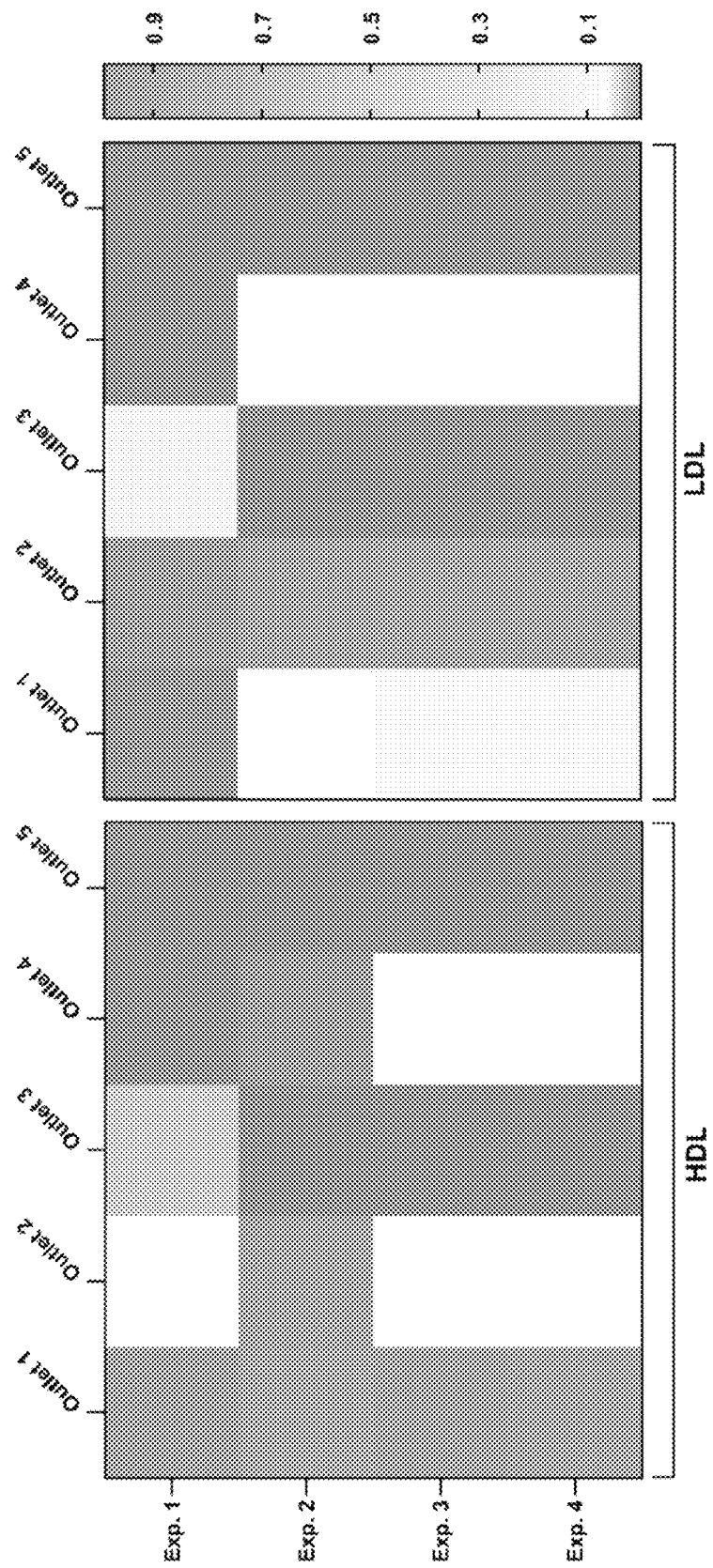
FIG. 16H shows heatmaps of the yield for the separation of HDL and LDL across 4 different experiments for all 5 outlets of the separation chip.
Figure 16I:
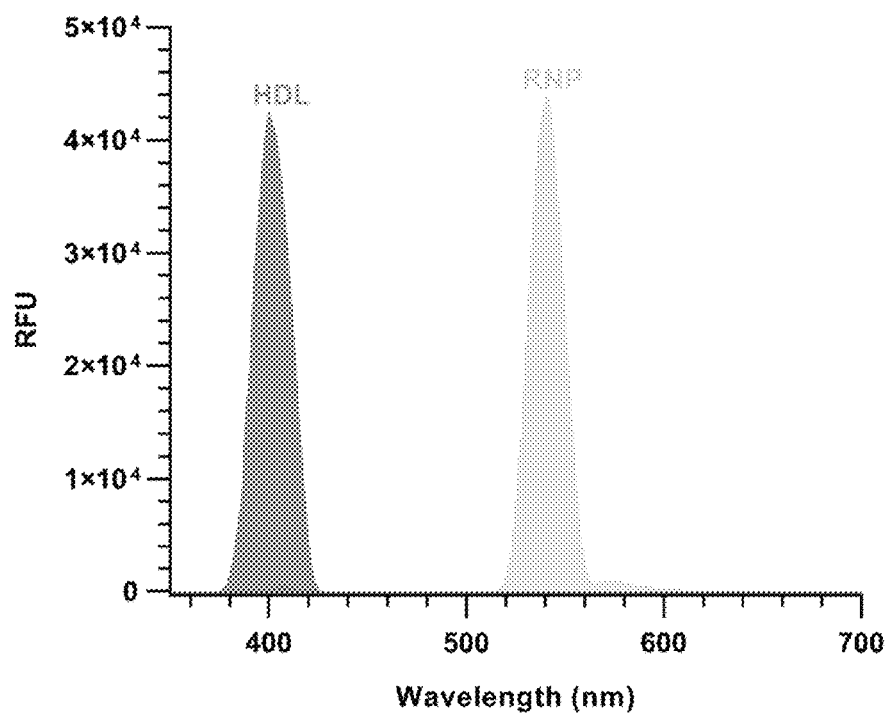
FIG. 16I shows fluorescence spectrophotometer data of the sample collected at the HDL outlet (outlet 1+ outlet 2) and RNP outlet (outlet 4+ outlet 5) showing a pure separation of a binary mixture of HDL and RNP with very little cross-contamination.
Figure 16J:
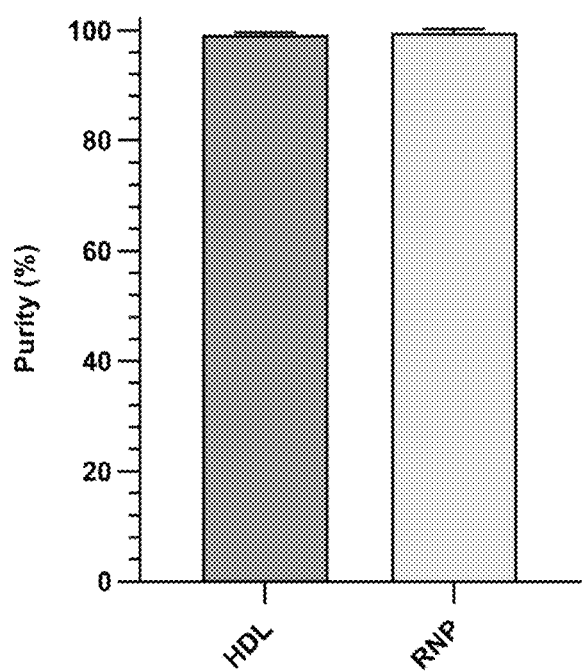
FIG. 16J shows that purities of HDL and RNP are 99.28±0.37% and 99.61±0.63%, respectively for n=4.
Figure 16K:
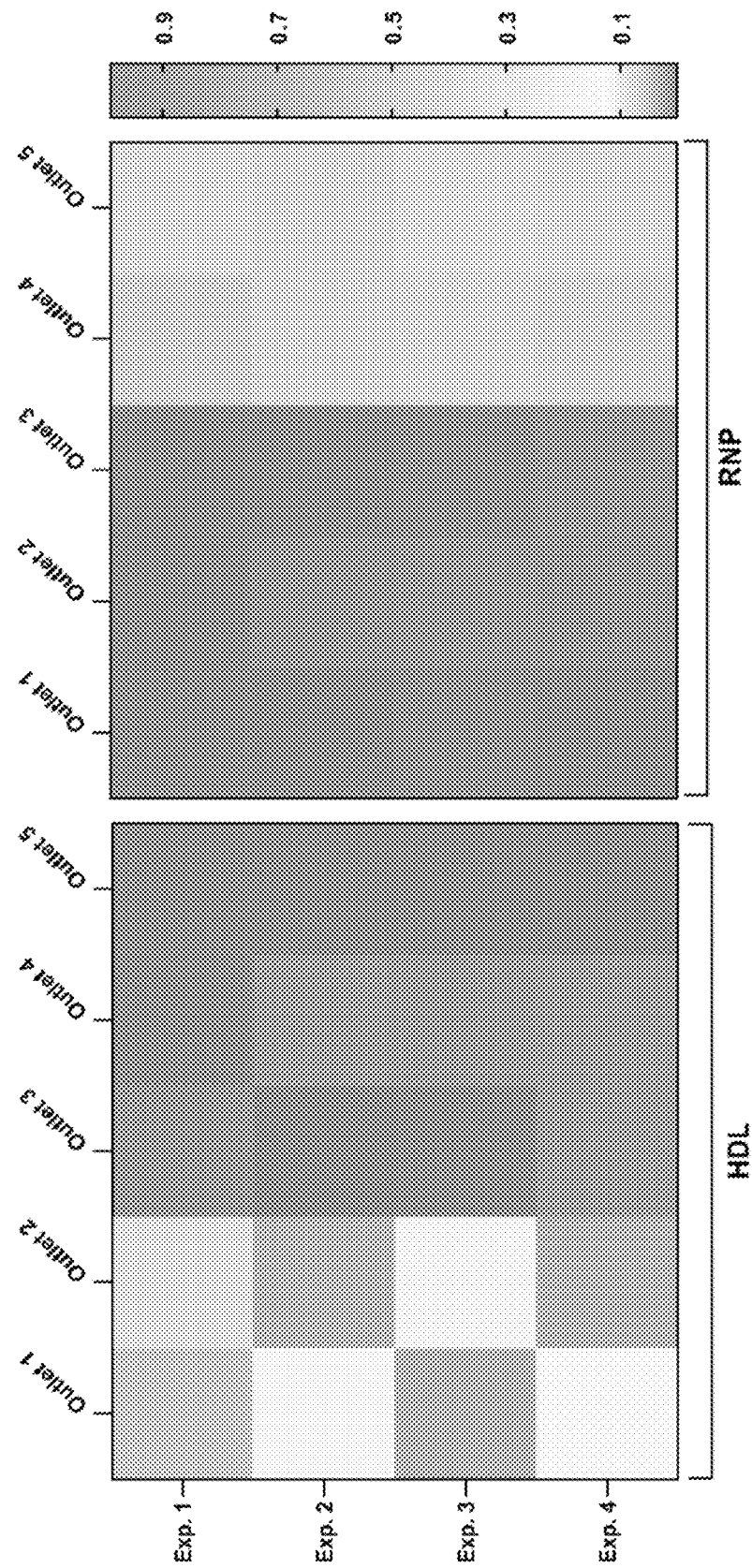
FIG. 16K shows heatmaps of the yield for the separation of HDL (obtained by Apo A1 ELISA) and RNP (obtained by cas9 ELISA) across 4 different experiments for all 5 outlets of the separation chip. The HDL primarily exits outlet 1 and outlet 2 whereas RNP comes out from the outlets 4 and 5.
Figure 16L:
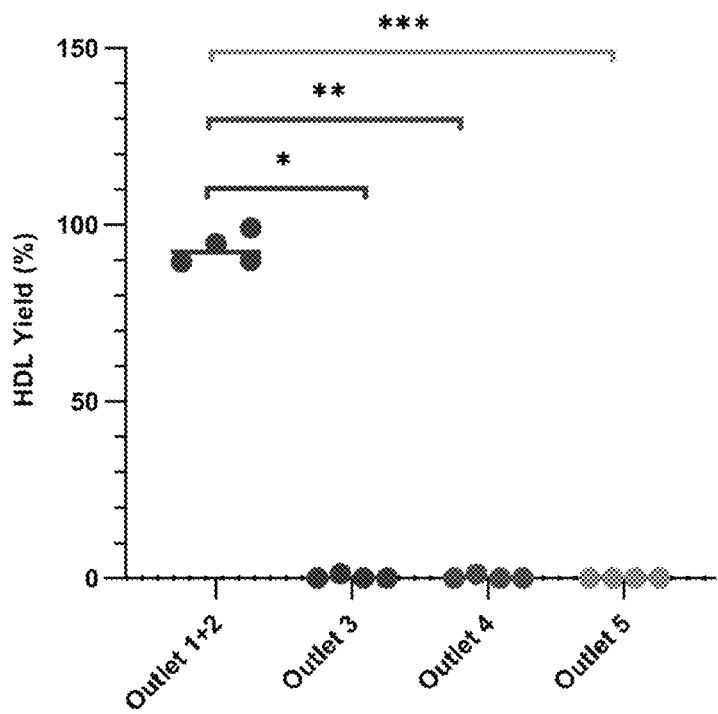
FIG. 16L shows box plots showing a yield of HDL (n=4) obtained at different outlets with statistically significant difference between HDL outlet (outlet 1+outlet 2)
Figure 16M:
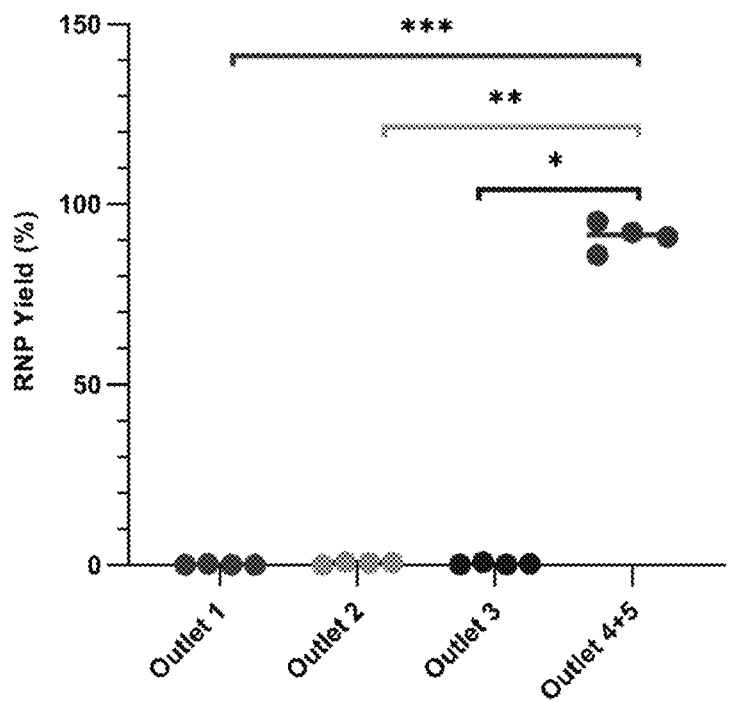
FIG. 16M shows box plots showing the yield of RNP (n=4) obtained at different outlets with statistically significant difference between RNP outlet (outlet 4+outlet 5) as compared to all other outlets (* indicates $p=1.85 \times 10^{-5}$;  indicates $p=1.87 \times 10^{-5}$; * indicates $p=2.03 \times 10^{-5}$).
Figure 16N:
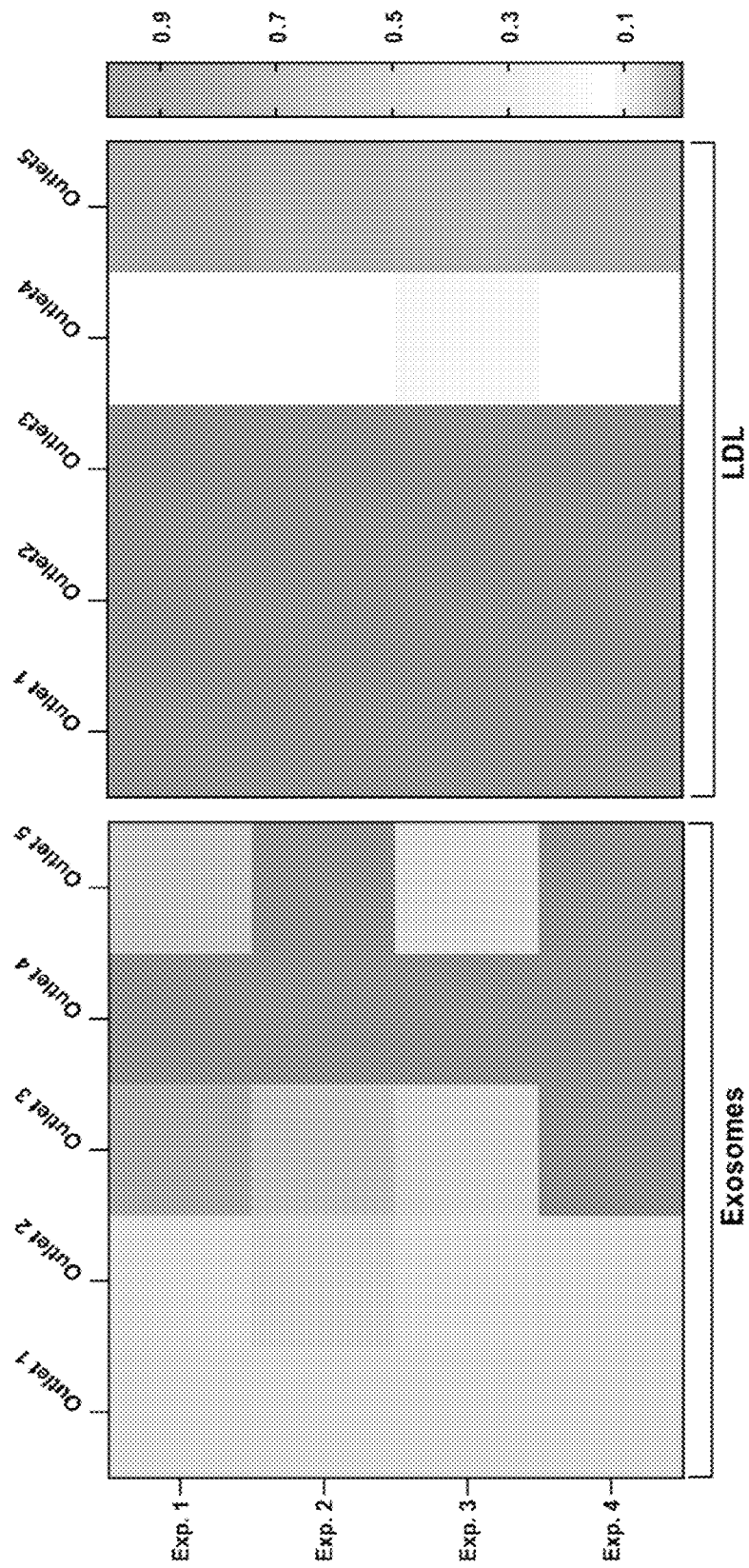
FIG. 16N shows heatmaps of yield for the separation of LDL (obtained by ApoB ELISA) and commercial exosomes (obtained by CD63 ELISA) across 4 different experiments for all 5 outlets of the separation chip. The LDL primarily exits outlets 4 and outlet 5 whereas exosomes come out of outlets 1 and 2.
Figure 16O:
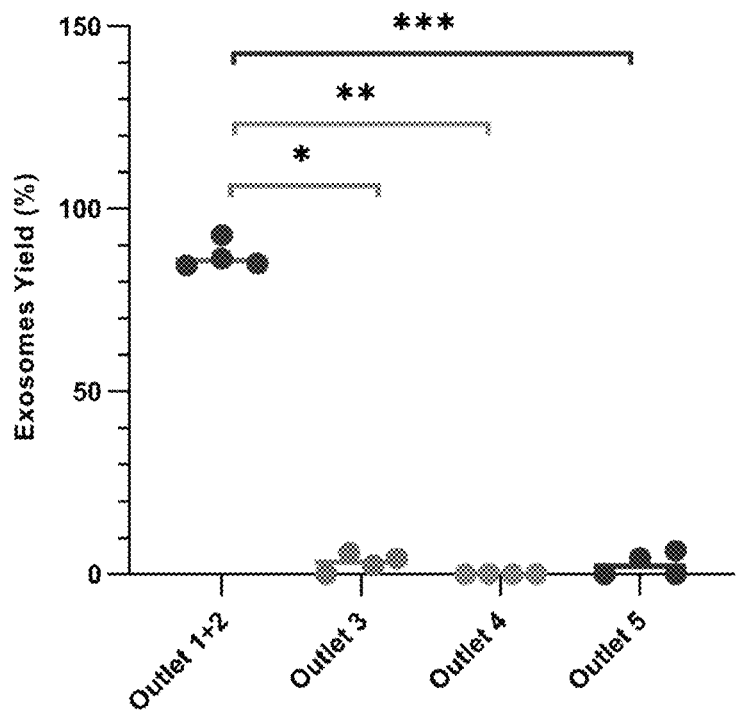
FIG. 16O shows box plots showing the yield of commercial exosomes (n=4) obtained at different outlets with statistically significant differences between exosome outlets (outlet 1+outlet 2) as compared to all other outlets (*indicates $p=1.63 \times 10^{-7}$;  indicates $p=6.33 \times 10^{-8}$; * indicates $p=2.30 \times 10^{-5}$).
Figure 16P:
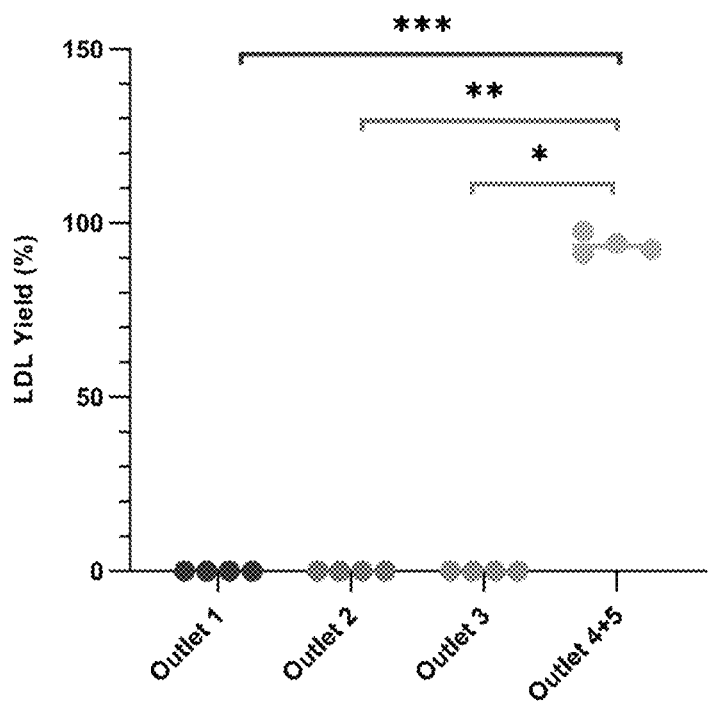
FIG. 16P shows box plots showing the yield of commercial exosomes (n=4) obtained at different outlets with statistically significant differences between LDL outlets (outlet 4+outlet 5) as compared to all other outlets (*indicates $p=7.01 \times 10^{-6}$,  indicates $p=7.01 \times 10^{-6}$, * indicates $p=7.01 \times 10^{-6}$).
Figure 16Q:
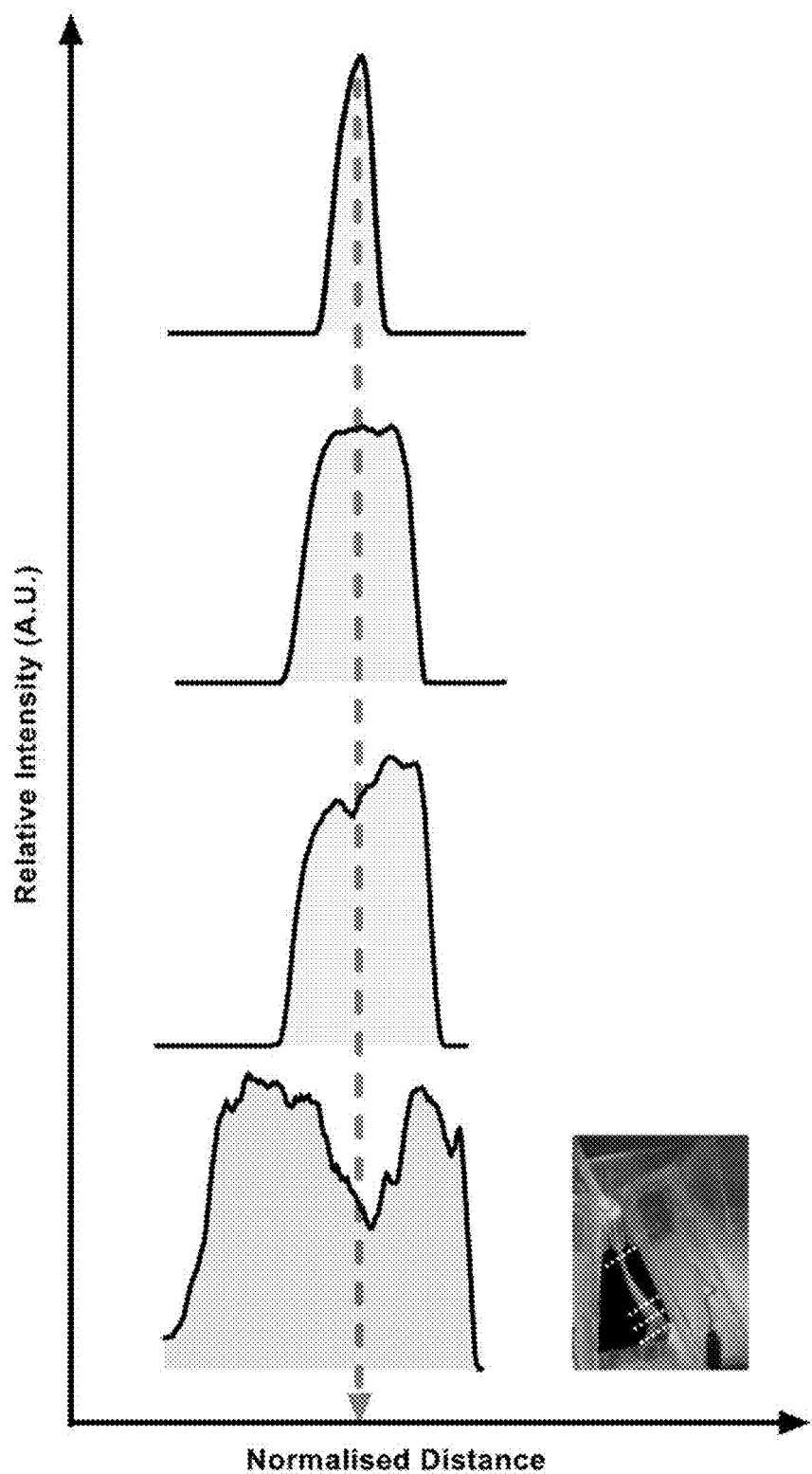
Figure 17A:
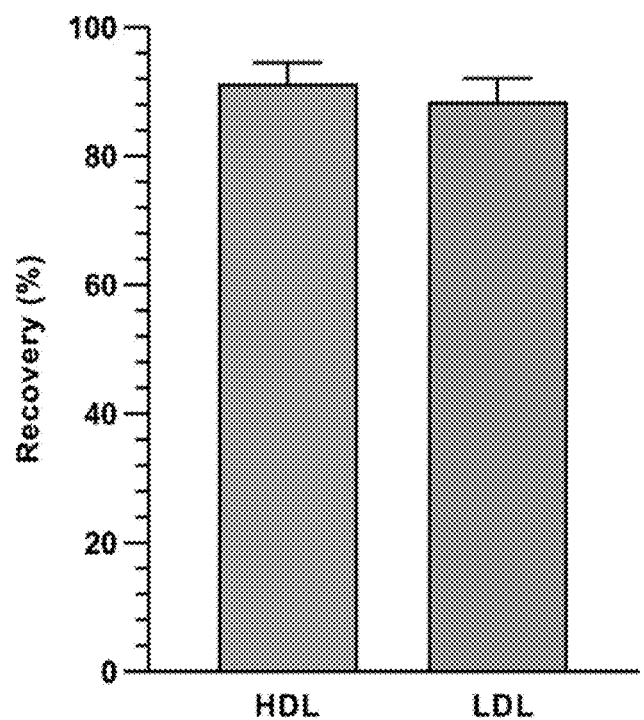
FIG. 17A shows recovery of HDL and LDL from the CIF (n=5). The data show 91.33±3.22% and 88.48+3.62% recovery of pure HDL and LDL, respectively, from the mixture.

As shown in the sequence of fluorescence images of FIG. 16B, when no voltage is applied, the LLPs mixture (HDL is green and LDL is orange) followed its streamline. When 150 V was applied across the trapezoidal channel, the labelled mixture is directed toward the positive electrode and two distinct bands become visible, green for HDL and orange for LDL after nearly 10 seconds (FIG. 16B). Line intensity plots were extracted at the indicated four axial locations along the separation channel of an image taken at a steady state (FIG. 16Q). A clear separation of peaks is observed as the sample progresses downstream and the line intensity plots denote the spatial separation of the LLPs mixture as the nanocarriers are gradually focused on their respective pIs. Moreover, the collected effluents from the two outlets were subsequently analyzed using gel electrophoresis, and as shown in FIG. 16C, two distinct bands are observed with qualitatively no apparent cross-contamination. For further qualitative assessment, the collected effluents were analyzed using a fluorescence spectrophotometer (FIG. 16D), which also confirmed little cross-contamination between the HDL and LDL fractions. The calculated recovery of the HDL and LDL from the mixture was $91.33\pm3.22\%$ and $88.48\pm3.62\%$ respectively (FIG. 17A). Furthermore, the effluents were analyzed from all five outlets of the separation chip using ApoA1 and ApoB ELISA kits for quantitative detection of HDL and LDL. FIG. 16H shows two heatmaps placed adjacent to each other depicting the yield of HDL and LDL from each outlet. As shown in the heatmaps, the isolated HDL exclusively came from outlet 1 while the isolated LDL from outlet 2, thus illustrating very little cross-contamination of the two targets. Moreover, FIGS. 3f and 3g show that the yields obtained from the LDL outlet ($93.87\pm3.21\%$) and HDL outlet ($92.87+3.14\%$) are statistically significant across all four (n=4) experiments. The purity of the LLPs mixture separation at the HDL outlet was evaluated to be $94.43\pm3.82\%$ whereas at the LDL outlet to be $98.59\pm1.01\%$ (FIG. 16E).

Effluent Selection for Separating HDL and RNP Mixture Spiked in Buffer

Figure 7A:
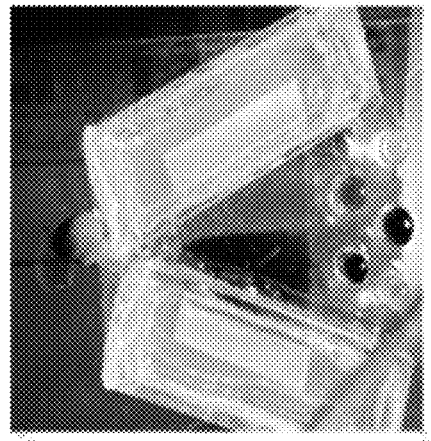
FIGS. 7A and B collectively show the optimization of the IEF separation of a mixture of pure HDL and RNP.
Figure 7A:
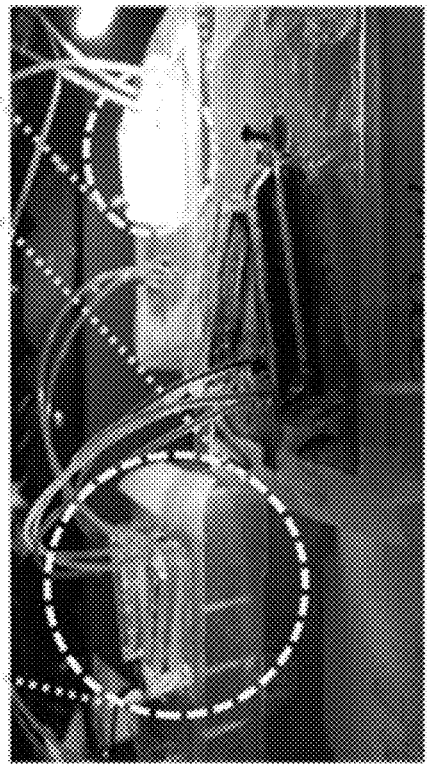
Figure 7B:
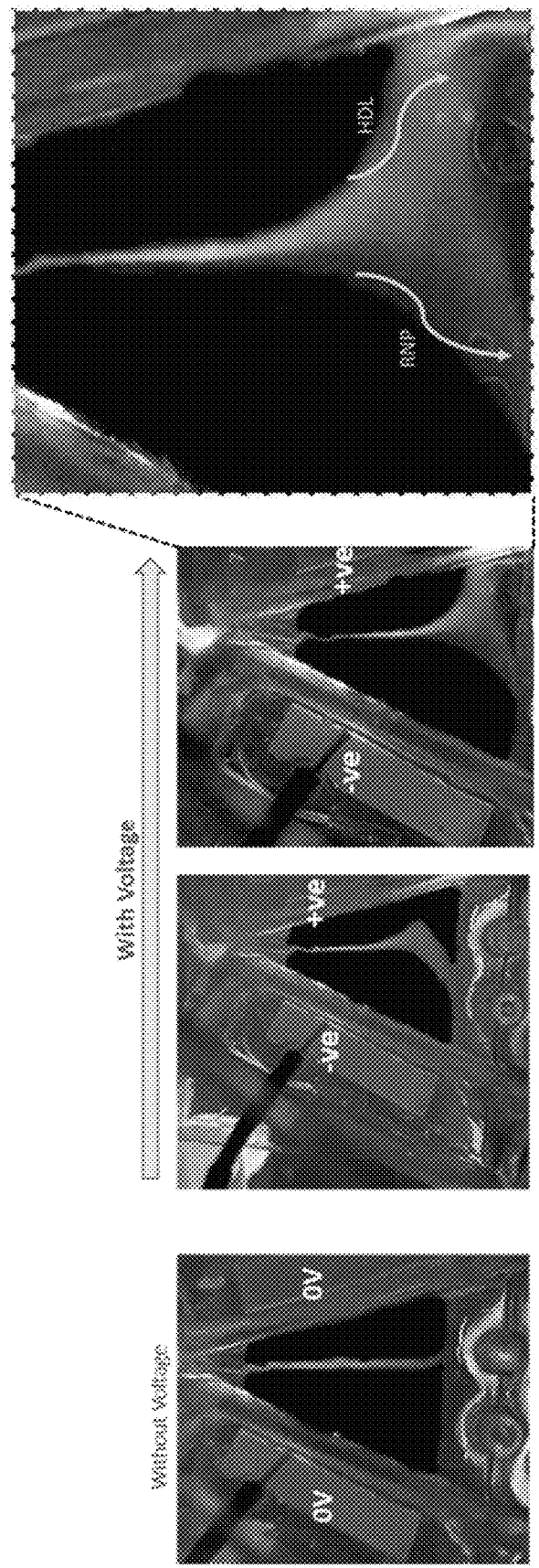
FIG. 7B shows that as voltage is applied across the chip, the bioanalytes begin to separate into two different streams until they reach their isoelectric point. Two images show the movement of RNP and HDL towards the correct potentials. A zoomed version of the last image shows the broad band of HDL and RNP (right image).
Figure 8A:
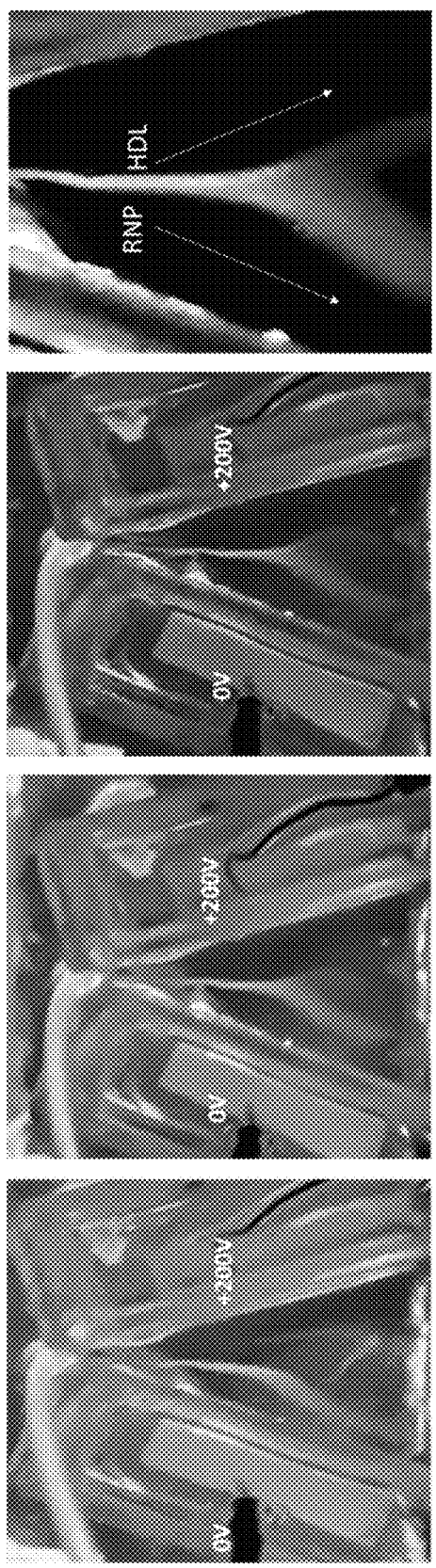
FIG. 8A shows sequential images of the separation of HDL and RNP mixture in the separation chip. When 200 V is applied, the HDL is deflected towards the positive electrode while the RNP is deflected towards the negative electrode and eventually two distinct streams are observed (right image).
Figure 16R:
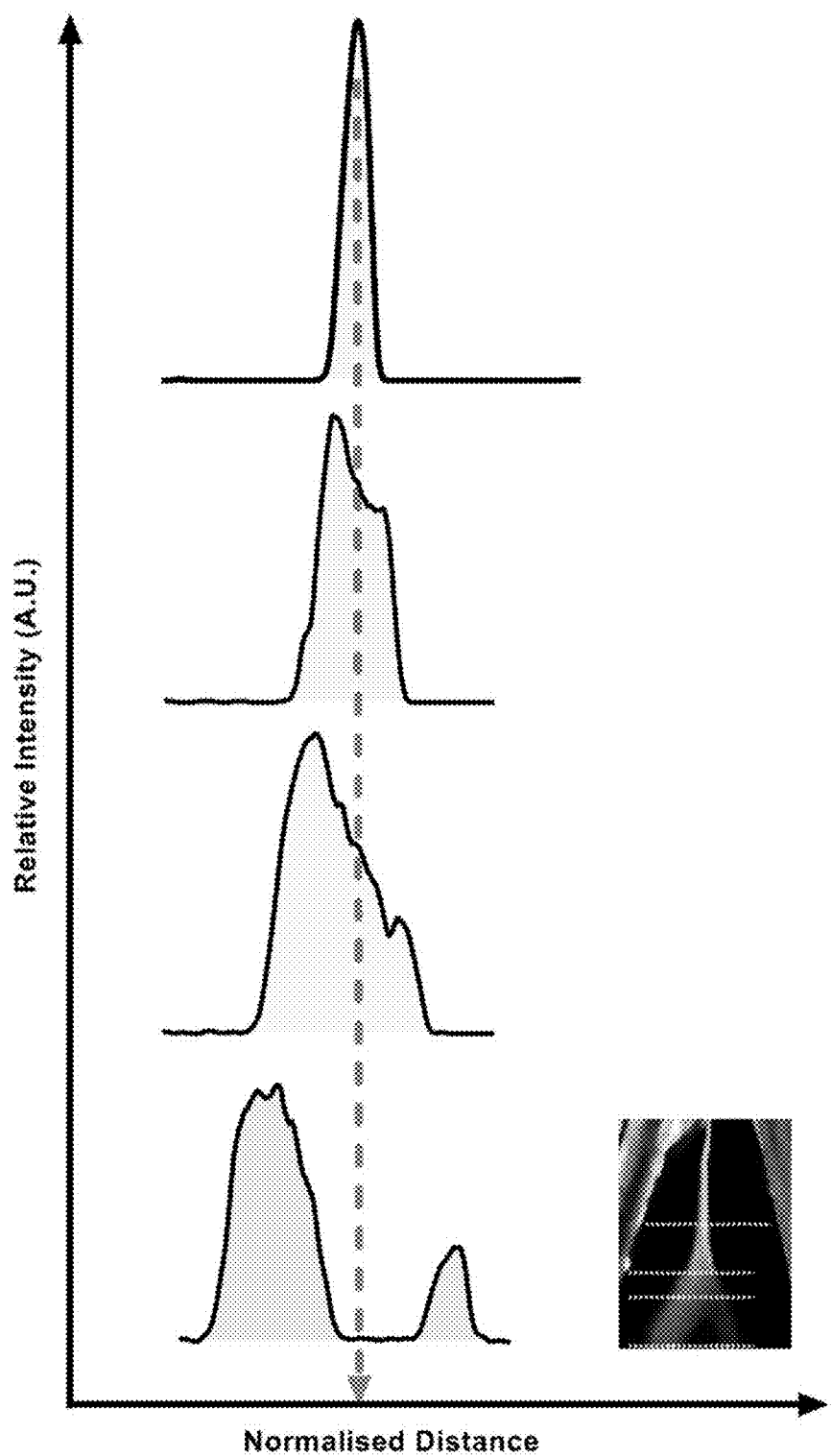

RNPs, another important exRNA nanocarrier, has been implicated in transcription, regulating gene expression, and protection of free-floating mRNA/miRNA biomarkers. A mixture of RNP and HDL were used to check the feasibility of RNP separation based on its isoelectric point. As seen in FIG. 16A, the measured zeta potential of RNP and HDL to be $-16.56\pm3.73$ mV and $-0.98\pm1.16$ mV, respectively. Given the large difference in pIs of RNP (pI=7.4-8.1) and HDL (pI=5.01), a pH gradient in the range of 2-8 was transferred into the separation chip after initial optimization (FIGS. 7A and 7B). As expected, under the application of no voltage bias, the injected HDL (green)-RNP (orange) mixture in the separation chip remains inseparable. Under 200 V, the mixture sample starts separating with HDL moving towards the positive electrode and RNP moving towards the negative electrode until they reach their isoelectric point (FIG. 8A) with two distinct bands, showing a clear separation of the mixture which is collected into different outlets. Line intensity plots in four different spatial locations show that as the sample moves downstream, the intensity peaks broaden out which eventually divides into two peaks, thus depicting the separation of HDL and RNP from the mixture (FIG. 16R).

Figure 8B:
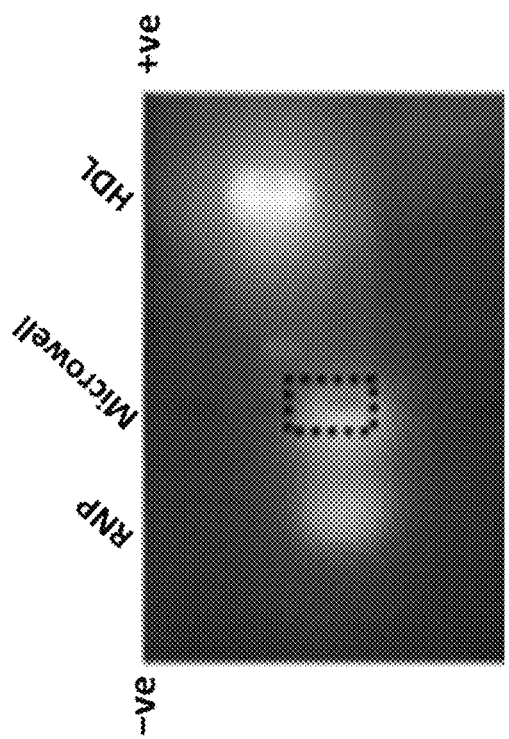
FIG. 8B shows gel electrophoresis of the collected HDL and RNP from their respective outlets showing distinct bands of HDL and RNP without any significant cross-contamination.
Figure 9A:
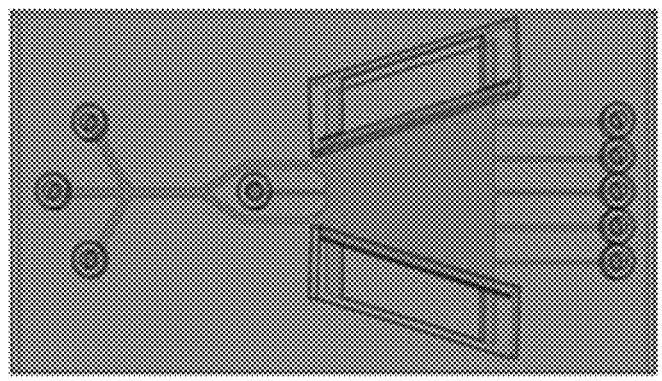
FIG. 9A shows Solidworks models of the 3D printed device in isometric wireframe mode and in solid isometric views.
Figure 9A:
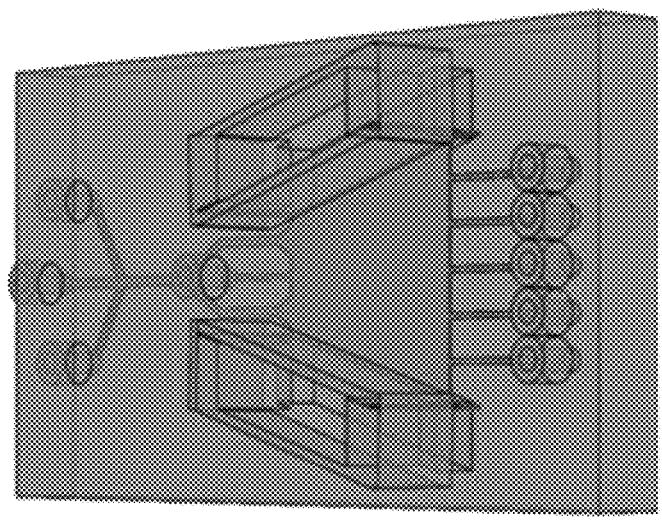
Figure 9A:
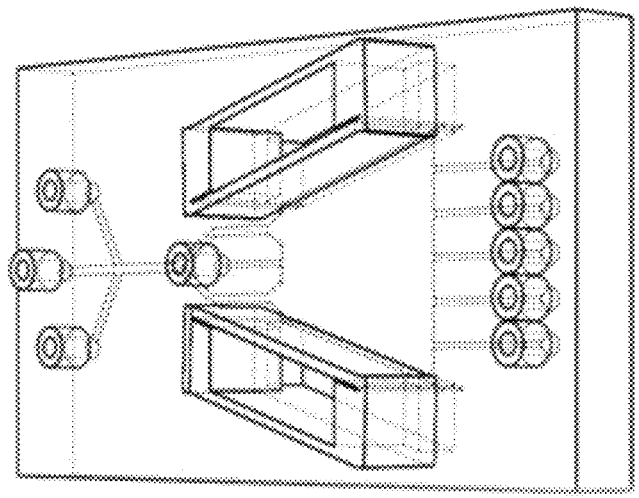
Figure 9B:
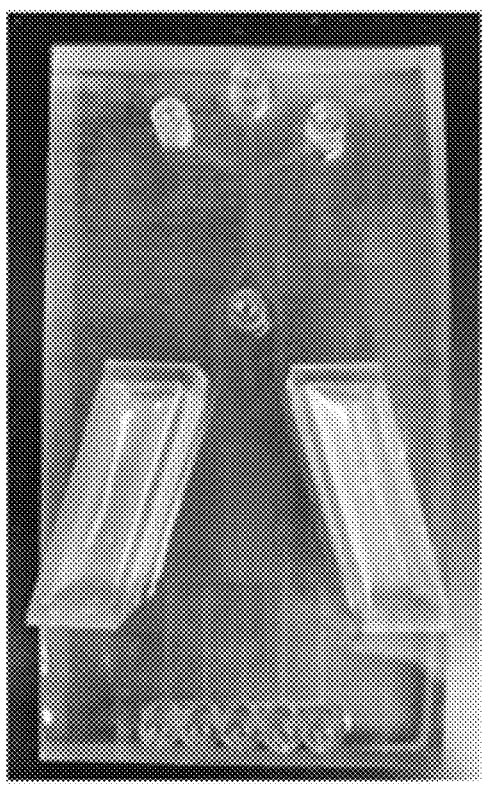
FIG. 9B shows a 3D printed device made by a commercial vendor (BMF).
Figure 17B:
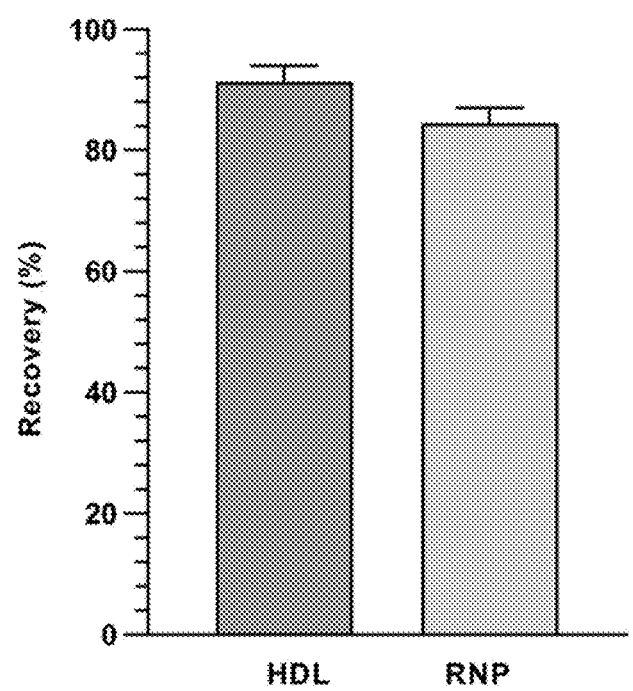
FIG. 17B shows recovery of HDL and RNP from the separation chip (n=5). The data show 91.26±2.71% and 84.48+2.59% recovery of pure HDL and pure RNP, respectively, from the mixture.

Qualitative analysis of the collected samples from these outlets was conducted using gel electrophoresis, which shows a bright band of HDL and RNP in their respective outlets with negligible cross-contamination (FIG. 8B). The collected samples were further analyzed using a fluorescence spectrophotometer which showed very little cross-contamination in the two outlets containing HDL and RNP respectively (FIG. 16I). The calculated recovery of the HDL and RNP from the mixture was $91.26+2.71\%$ and $84.48+2.59\%$, respectively (FIG. 17B). FIG. 16K shows two adjacently placed heatmaps of HDL and RNP yield from each outlet of the separation chip for different experiments (n=4). The majority of the HDL is separated into outlets 1 and 2 while RNP exits from outlets 4 and 5. Moreover, quantitative measurements show that the yield obtained from HDL outlets 1 and 2 ($93.35\pm4.52\%$) and RNP outlets 4 and 5 ($91.05\pm3.82\%$) are statistically significant across all experiments (FIG. 16L-M). The purity of the fractionation at the HDL outlets was evaluated to be $99.28\pm0.37\%$ whereas at the RNP outlets were $99.61\pm0.63\%$ (FIG. 16J).

Effluent Selection for Separating Exosomes and LDL with Sequential Separation Chips Finally, the device was used to separate exosomes and LPPs, which are abundant circulating biomarkers in blood and have a significant overlap in size distribution and density. Cryogenic electron microscopy images and morphological properties of lipoproteins and EVs are identical to a large extent. A recent study also found that LDL can mimic the properties of blood plasma-derived EVs, skewing subsequent downstream analysis. Gel electrophoresis was performed using pure samples of commercially available exosomes, LDL, HDL, and RNP to qualitatively examine their electrophoretic mobilities. The band of commercial exosomes lies in between and with some overlap with the LDL and HDL band, suggesting a very small difference between their isoelectric points (FIG. 5). Moreover, the overlapping error bars for zeta potential measurements (FIG. 16A) of the commercial exosomes ($-17.57\pm4.35$ mV), HDL ($-16.56\pm3.73$ mV), and LDL ($-12.44\pm1.85$ mV) confirm the gel electrophoresis observation. This suggests that the successful separation of exosomes and LDL for example, will require a very high-resolution pH gradient.

Figure 16S:
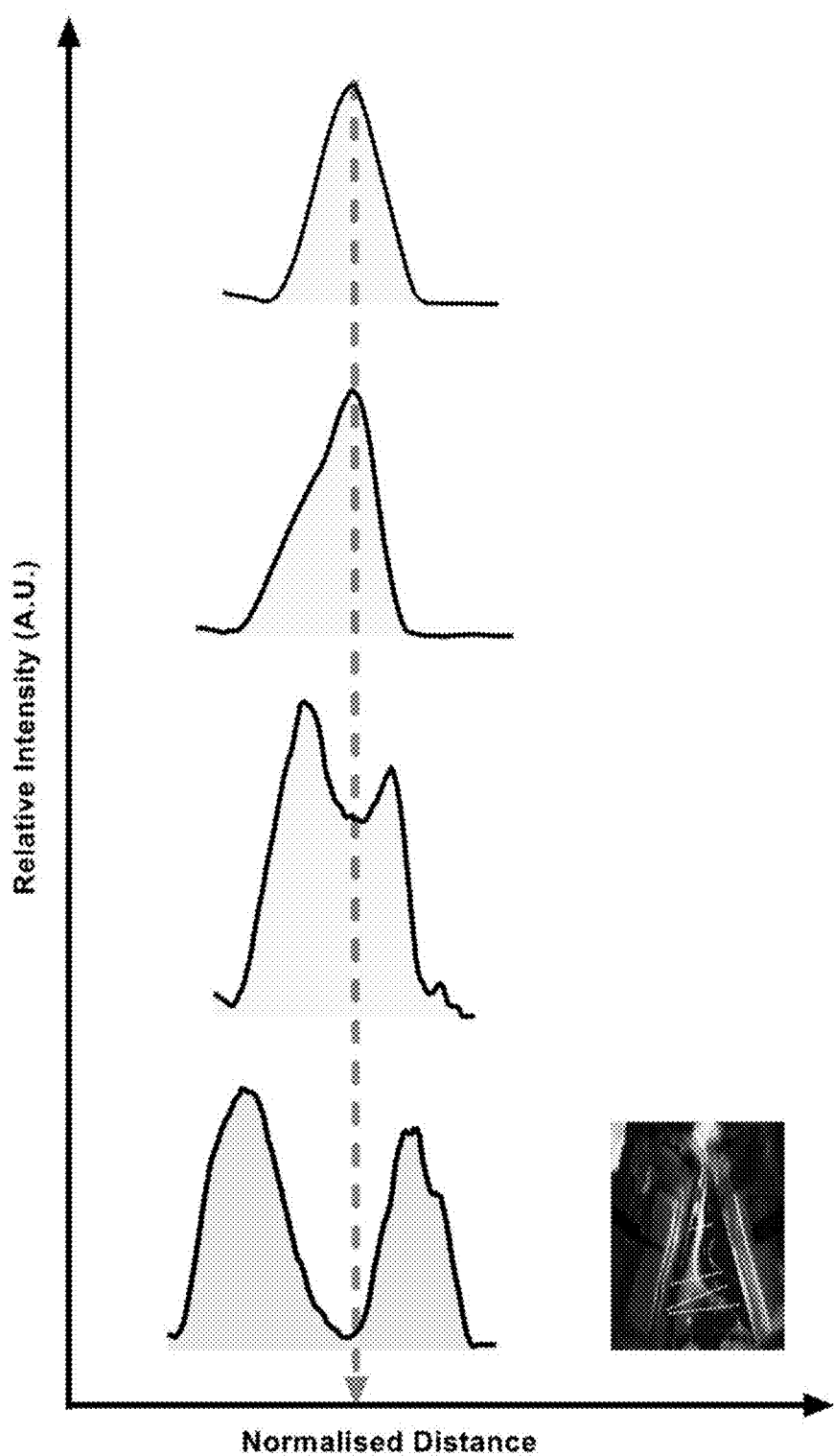
Figure 18A:
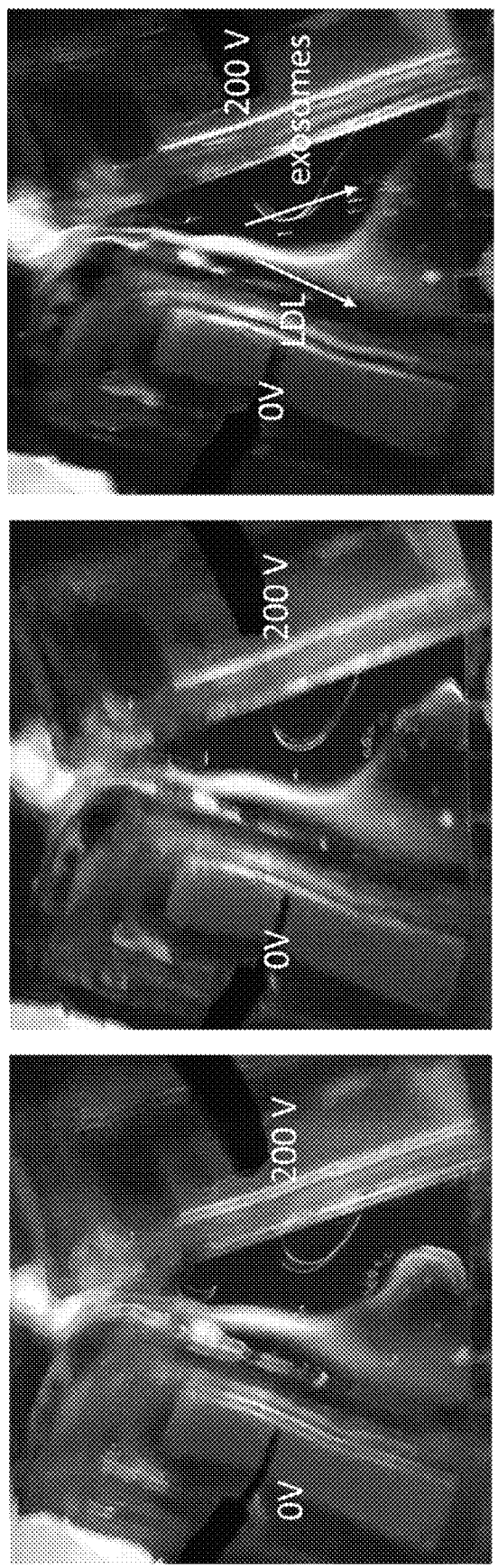
FIG. 18A shows sequential images of the separation of LDL and exosome mixture in the separation chip under a very high-resolution pH gradient. The LDL is deflected towards the negative electrode and the exosomes are deflected towards the positive electrode.
Figure 18B:
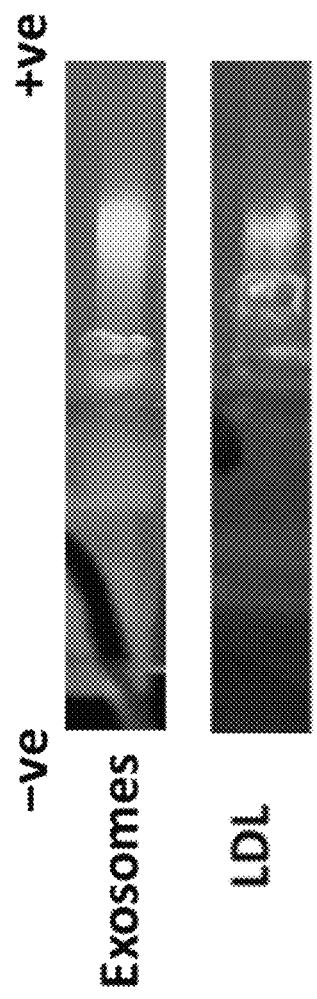
FIG. 18B shows on chip gel electrophoresis experiments of exosomes and LDL from the different outlets showing negligible cross-contamination.

Attempts at CIF separation of LDL and exosomes by transferring the pH in the range from 2-6 from the pH gradient chip to the separation chip were unsuccessful. To generate an even finer pH gradient, two separation chips were connected in series along with the pH gradient chip. A pH in the range of 2-6 was first transferred downstream into the first separation chip and subsequently, the pH roughly in the range of 4-5.5 was transferred into the second separation chip; the sample of a mixture of exosome and LDL in 1×PBS buffer solution was then injected into the second separation chip. As shown in FIG. 18A, the series of images of the second separation chip at different time points show that the LDL particles are deflected toward the negative electrode and exosomes are deflected towards the positive electrode, illustrating successful isoelectric focusing. Image analysis of the fluorescence image with line intensity plots in four different spatial locations shows that as the sample moves downstream, the intensity peaks broaden out which eventually divides into two peaks, thus depicting the separation of LDL and exosome from the mixture (FIG. 16S). The fractionated effluents were collected from two separate outlets and qualitatively analyzed using gel electrophoresis (FIG. 18B) showed insignificant cross-contamination between different outlets.

FIG. 16M shows two adjacently placed heatmaps of LDL and exosome yield from each outlet of the separation chip for four different experiments. As shown in heatmaps, the majority of exosomes exit outlets 1 and 2, while the LDL exit outlets 4 and 5, with very little cross-contamination. Moreover, for quantitative measurements, FIG. 16O and FIG. 16P show that yields obtained from the exosome outlets (87.25±3.81%) and LDL outlets (93.83±2.76%) are statistically significant across all experiments. The purity of the mixture fractionation at the exosome outlet was evaluated to be 99.99997±5.77×10$^{-6}$) % whereas the LDL outlet was evaluated to be 97.32567±3.19564% (FIG. 17C).

Automated CIF (Auto-CIF) Analyzer Using Machine Learning

Figure 19A:
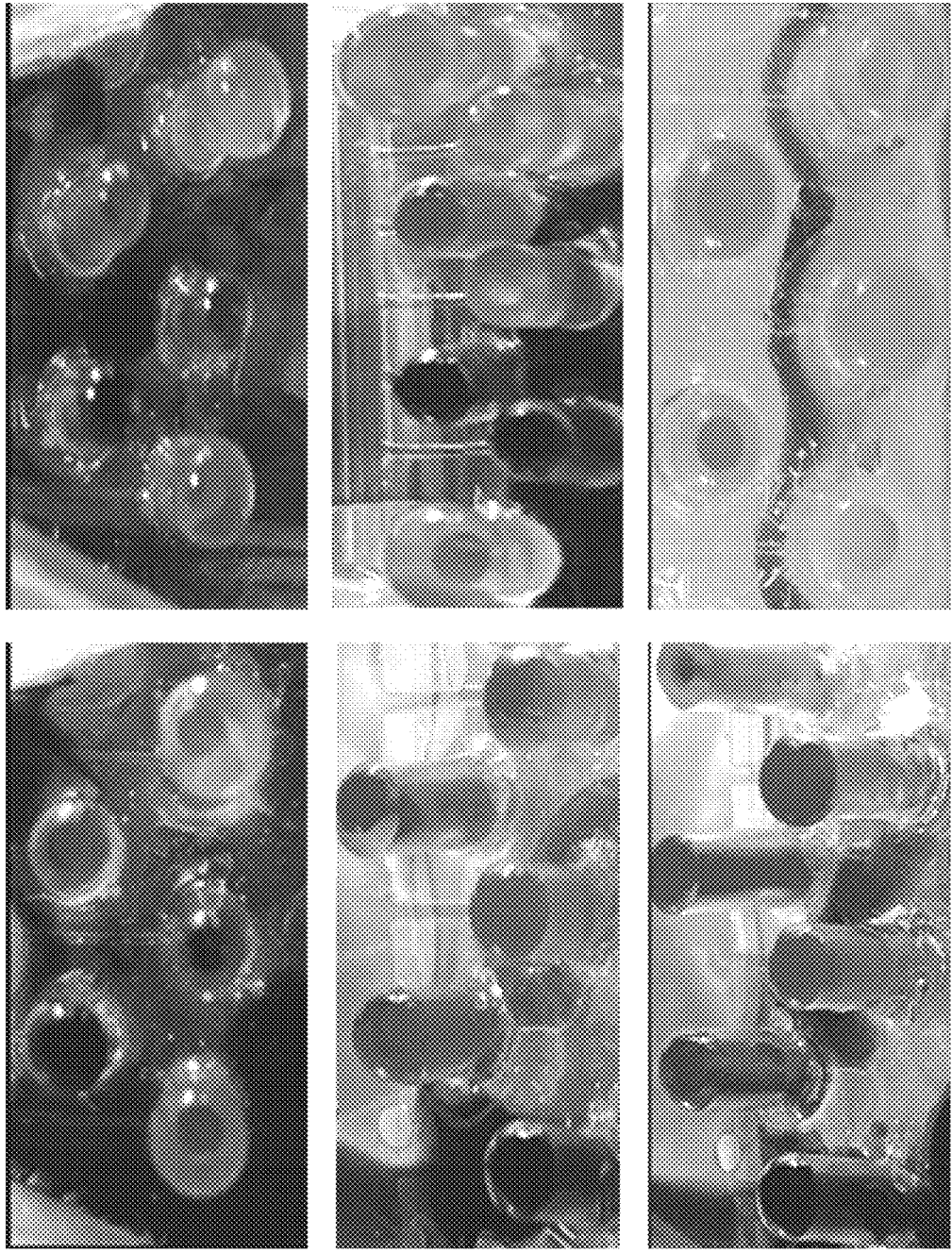
FIG. 19A shows a series of experimental images depicting different colors of pH dye in different outlets with different pH generation chips. The colors at the outlets appear dark red/pink (acidic pH) or dark blue/black (basic pH). This obscures user judgement regarding the pH value coming from each outlet. An appropriate method will be to use an auto CIF analyzer platform to determine the pH value in the pH generation trapezoidal channel itself.
Figure 20:
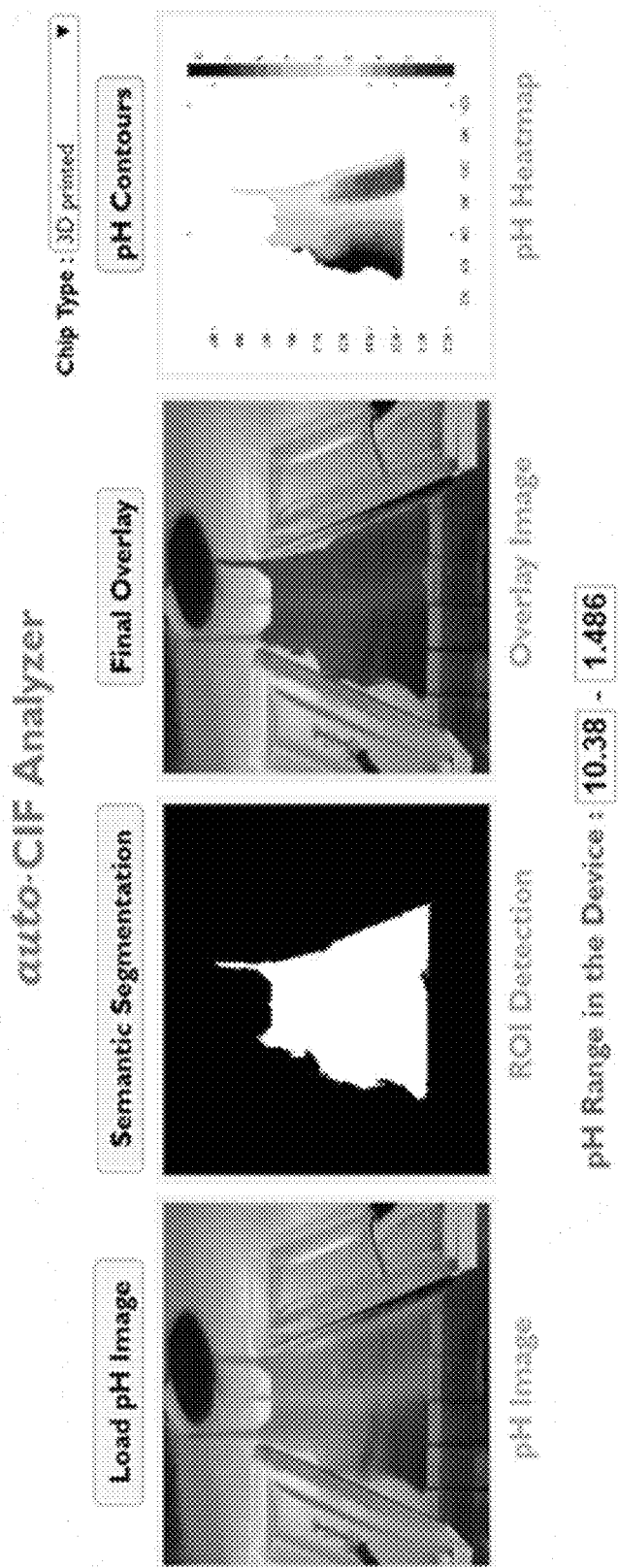
FIG. 20 shows an example of a graphical user interface for the auto-CIF analyzer MATLAB® application that loads a colorimetric image taken from a smartphone image, identifies the ROI using machine learning, generates a segmentation mask, overlays the original image with the segmentation mask, and generates the pH profile depending upon the chip type.

Although the pH effluent range was calibrated for the key nanocarriers in spiked buffers, the isoelectric points of the nanocarriers may change in plasma and other physiological fluids. To account for isoelectric point variation and achieve fine fractionation, tedious tuning is required to select the desired pH range from the pH gradient chip, followed by visual inspection and comparison to a pH reference chart. Both procedures are inefficient and can lead to user-dependent variance in pH selection for the separation chip (FIG. 19A). To reduce user-driven bias and improve device repeatability, an auto-CIF analyzer was developed, a machine learning platform for automatic pH detection (FIG. 20). The auto-CIF analyzer's workflow (FIG. 10A) is divided into two modules: an image segmentation module59, which identifies the ROI using machine learning, and the pH detection module which generates a spatial pH profile of the ROI by assigning a pH value to each pixel using a custom developed calibration curve.

Figure 10K:
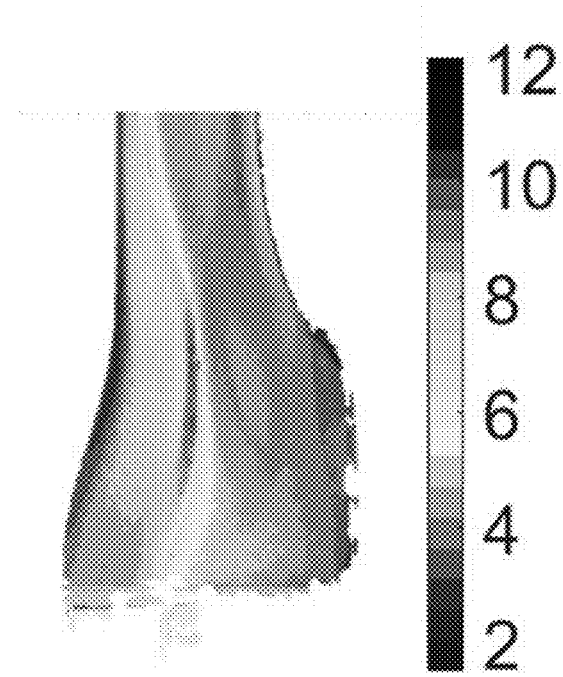
Figure 10L:
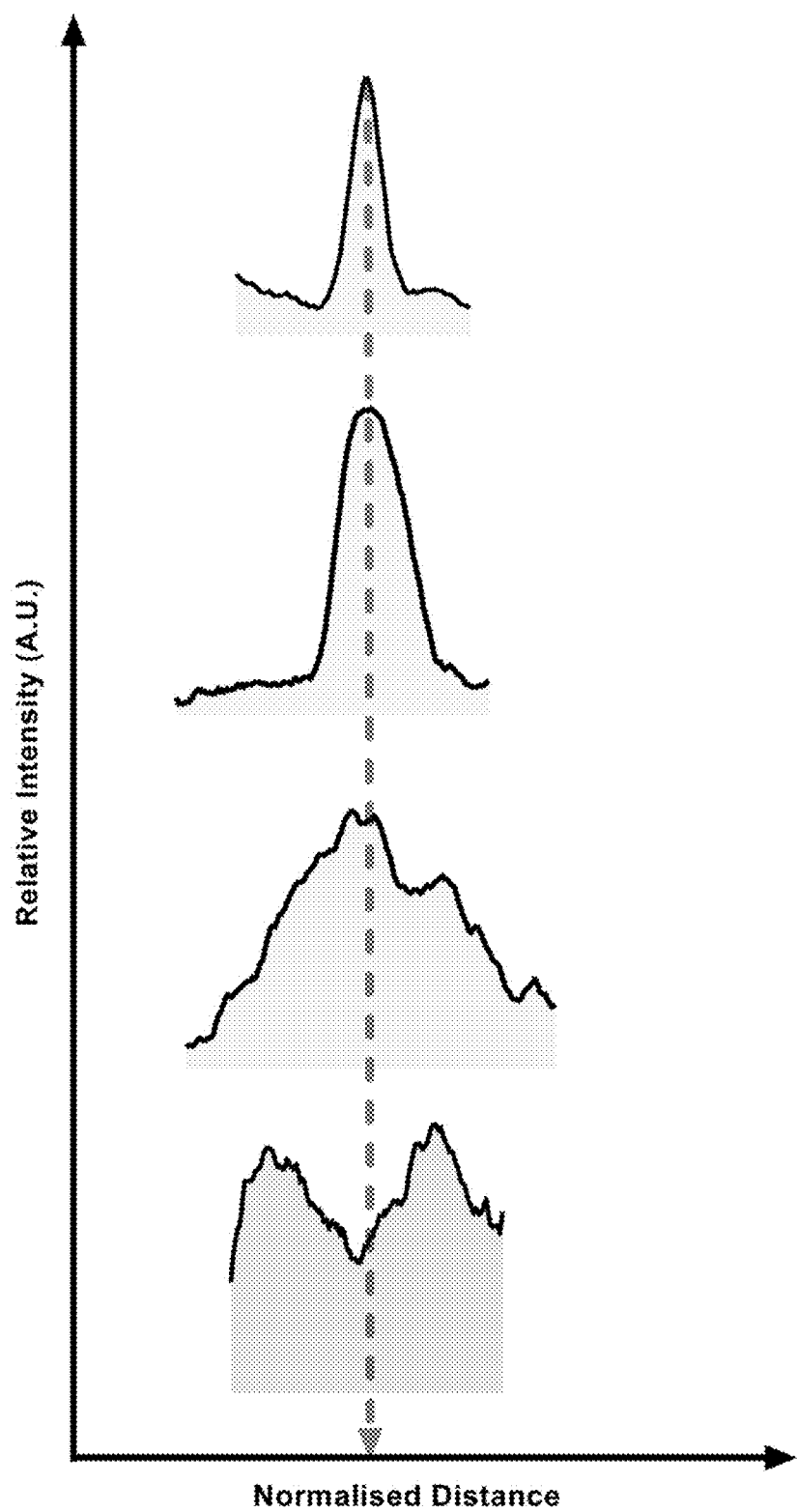
FIG. 10L shows the line intensity plots at different downstream locations confirming the separation of HDL and LDL nanocarriers with the auto-CIF analyzer.
Figure 19B:
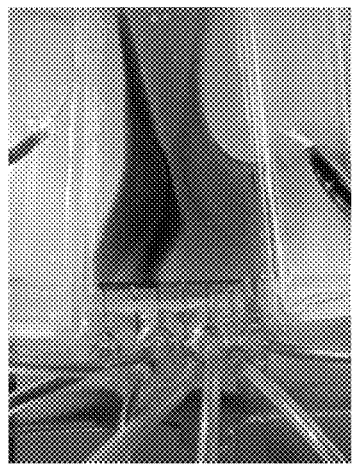
FIG. 19B shows the pH generation chip generating a coarse and linear pH gradient.
Figure 19C:
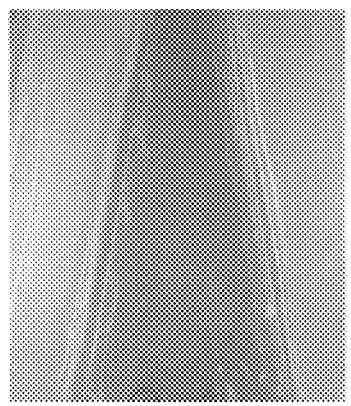
FIG. 19C shows a separation chip image after transferring solution from outlet 3 and outlet 4 (outlet number starts from right to left) from the pH generation chip.
Figure 19D:
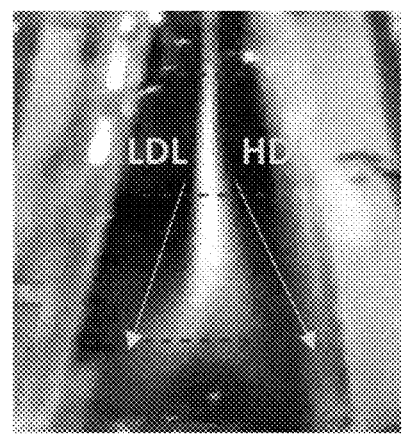
FIG. 19D shows a processed fluorescence image depicting clear separation of HDL and LDL in the separation chip. The red lines indicate the spatial locations which are used to draw line intensity plots shown in FIG. 10L.

The test data prediction results of image segmentation module for xurography-based chip are represented by a confusion matrix (FIG. 10D) show excellent accuracy (96.30%), sensitivity (94.83%) and specificity (96.73%). Moreover, the area (#of pixels) of the ROI calculated manually correlates linearly with machine learning prediction (FIG. 10E). For the pH detection module of the xurography-based chip, the normalized mean RGB values taken from a pH reference chart (FIG. 10G) gave poor correlation with the pH (FIG. 10I). However, when the data was divided into acidic (pH=[1-*6]) and basic pH values (pH=[7-*11]), a good calibration curve was obtained (FIG. 10J). Subsequently, using this calibration curve, a pH surface plot for the ROI of a test image (shown in FIG. 10A) was generated (FIG. 10K). The pH plot guides the user regarding in selecting outlets 3 and 4 from the pH gradient chip (FIG. 19B) to transfer into the separation chip for HDL-LDL mixture fractionation (FIG. 19C). Line intensity plots were extracted at the indicated four axial locations of a fluorescence image taken at steady-state (FIG. 19D) indicating clear segregation of peaks in FIG. 10L, as the sample progresses downstream.

Figure 10M:
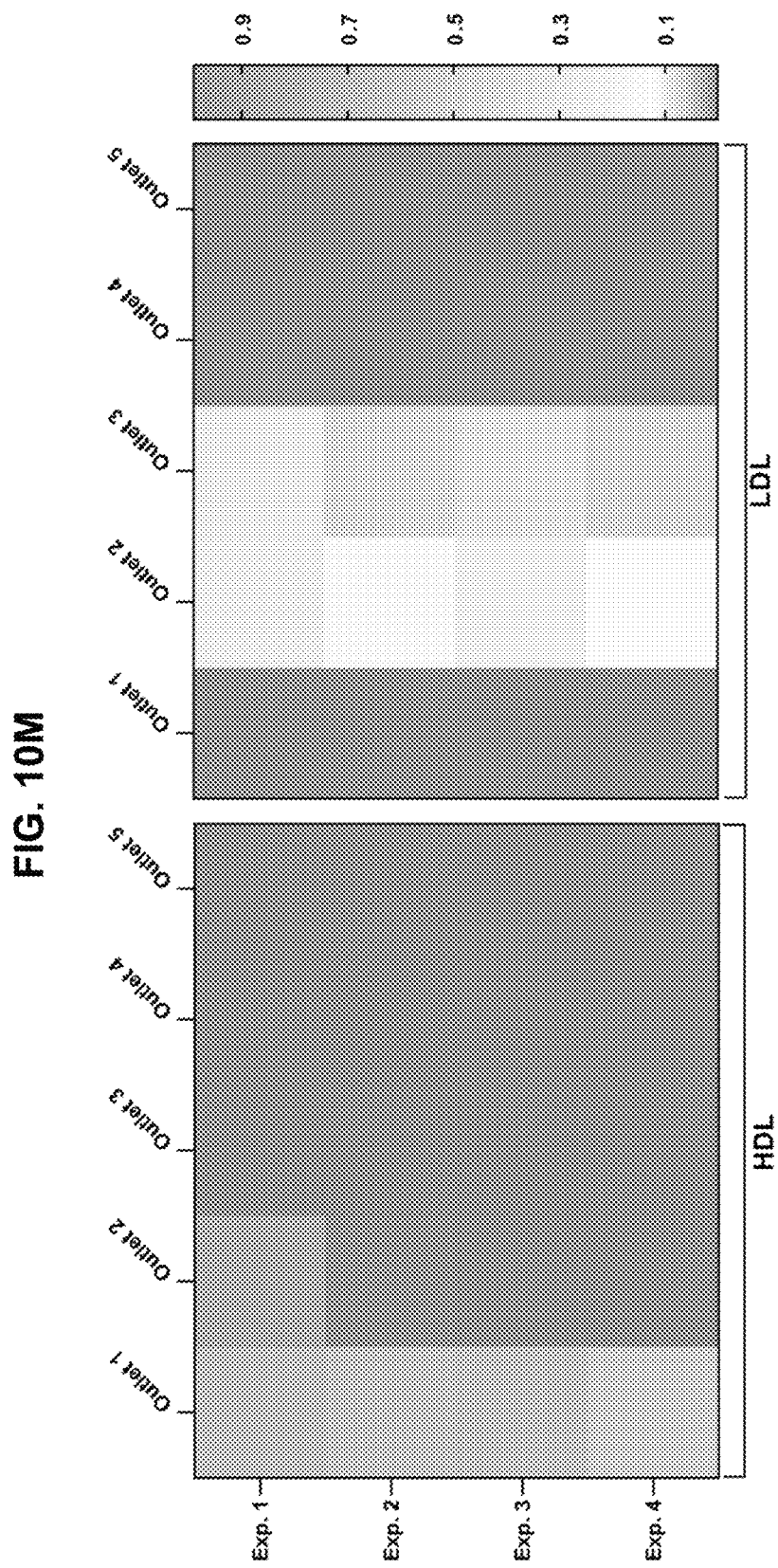
FIG. 10M shows heatmaps of yield for the separation of HDL and LDL across 4 different plasma experiments (n=4) in all 5 outlets of the separation chip. The HDL comes primarily from outlet 1, whereas LDL comes from outlets 2 and 3.
Figure 10N:
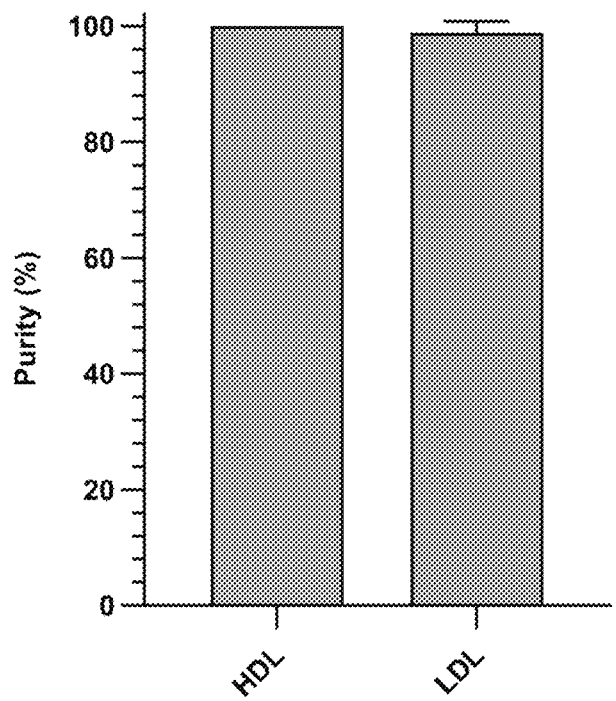
FIG. 10N shows that the purities of HDL and LDL from human plasma are 99.99904+0.00126% and 98.83900+1.99225%, respectively.
Figure 10O:
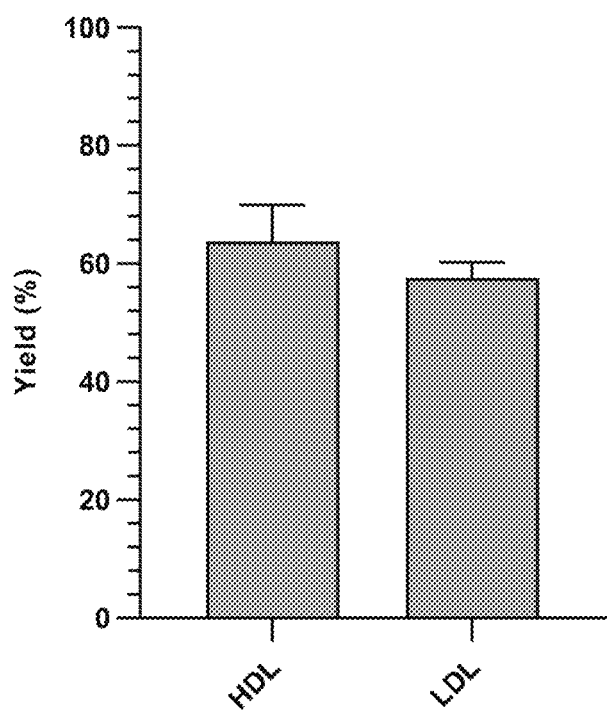
Figure 21A:
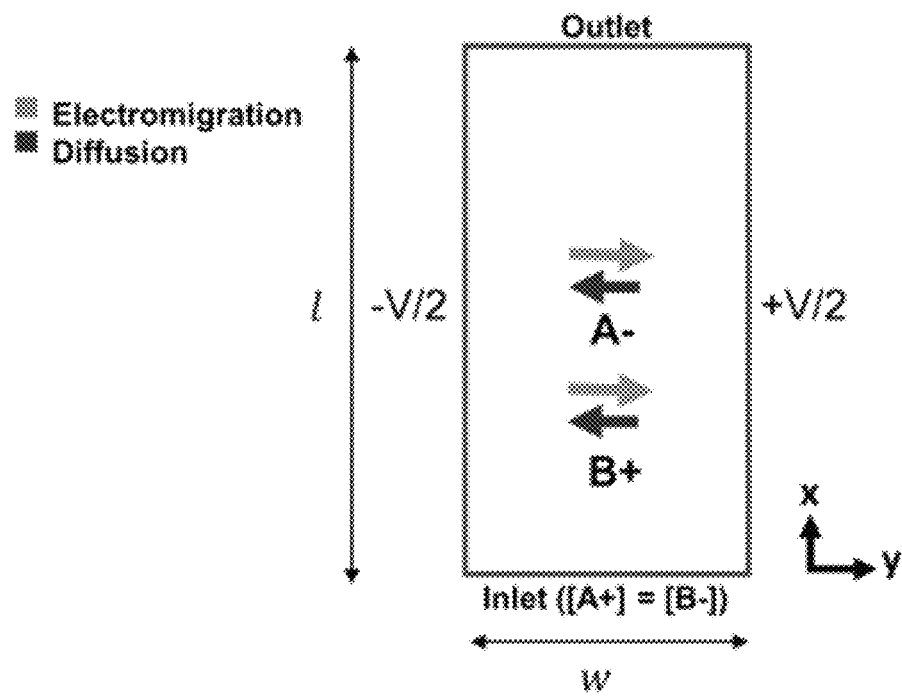
FIG. 21A-D show schematics for a FEM simulation setup for straight (FIG. 21A) and trapezoidal (FIG. 21B) geometries with an inlet width of w, length of l, and trapezoidal angle (θ).
Figure 21B:
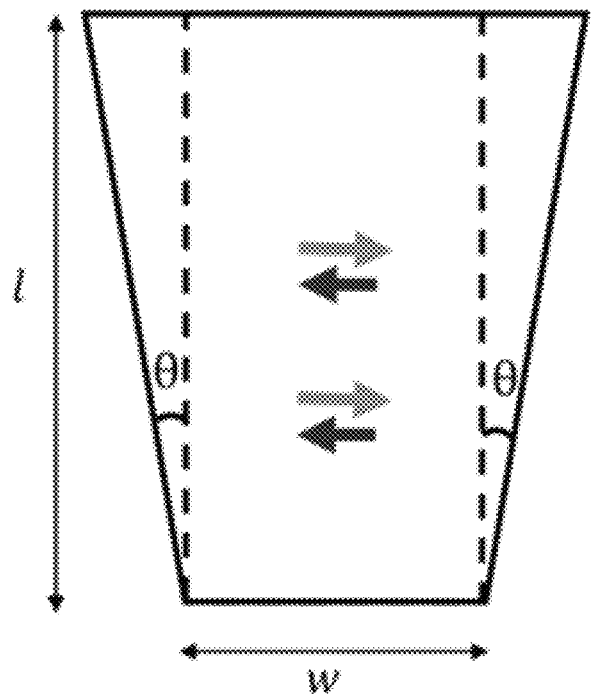
Figure 21C:
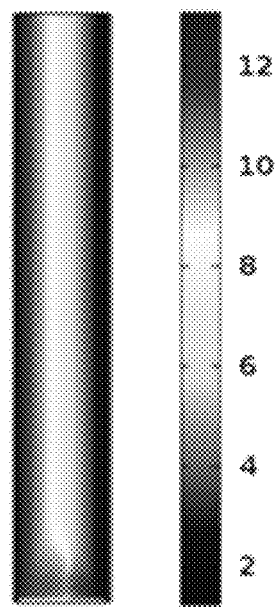
Figure 21D:
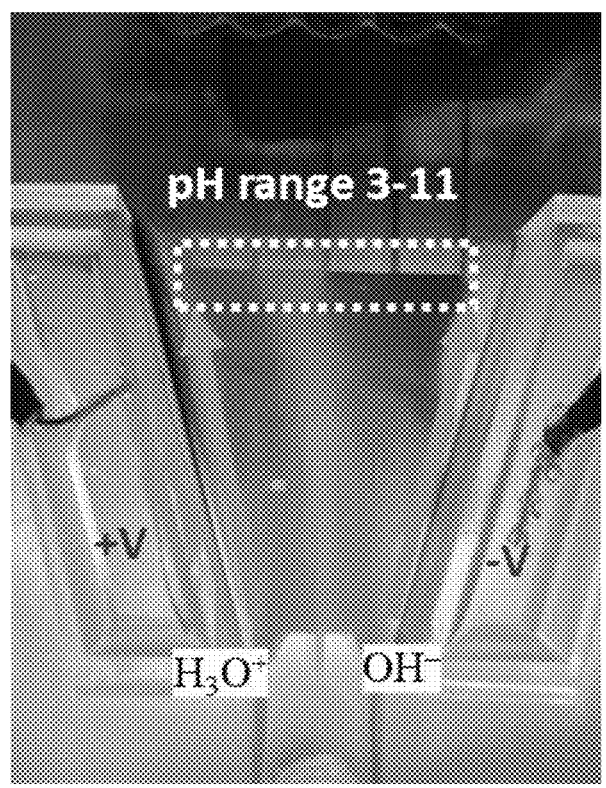

Similarly, the feasibility of the CIF device was evaluated coupled with auto-CIF analyzer by fractionating HDL and LDL nanocarriers present in 20× diluted human plasma samples, using the optimized protocols from spiked buffers, fine-tuned by the auto-CIF analyzer to adjust for the change in isoelectric points. The effluents from all five outlets of separation chip were collected for plasma experiments (n=4). FIG. 10M shows two adjacently placed HDL and LDL heat maps representing their yield from each outlet for all four experiments, where HDL primarily exited outlet 1 and LDL exited outlets 2 and 3. As shown in FIG. 10N, the purity of the separation at the HDL outlet was evaluated to be 99.99904±0.00126% whereas for LDL outlets were 98.83900±1.99225%. FIG. 10O shows that the yield obtained from the HDL outlet was 63.82±6.10% and 57.67±2.53% from the LDL outlets. Furthermore, to demonstrate the high throughput fabrication potential of the CIF device, a 3D-printed CIF prototype was built, a linear pH gradient was generated in the device (FIG. 21D), and an auto-CIF analyzer was developed for this chip type whose workflow is the same as described above (FIG. 10A).

Separating RNP from HDL, LDL and Exosomes from Plasma Sample

Highly pure fractionation of HDL and LDL (ΔpI<0.5) was performed from human plasma using the CIF coupled with the auto-CIF analyzer. Further experiments demonstrate comprehensive, high-purity, high-yield, and probe-free isolation of RNPs from human plasma using the CIF coupled with auto-CIF analyzer. A pH gradient in the range of 2-8 was transferred into the separation chip using auto-CIF analyzer as this effluent range worked well previously.

Figure 22A:
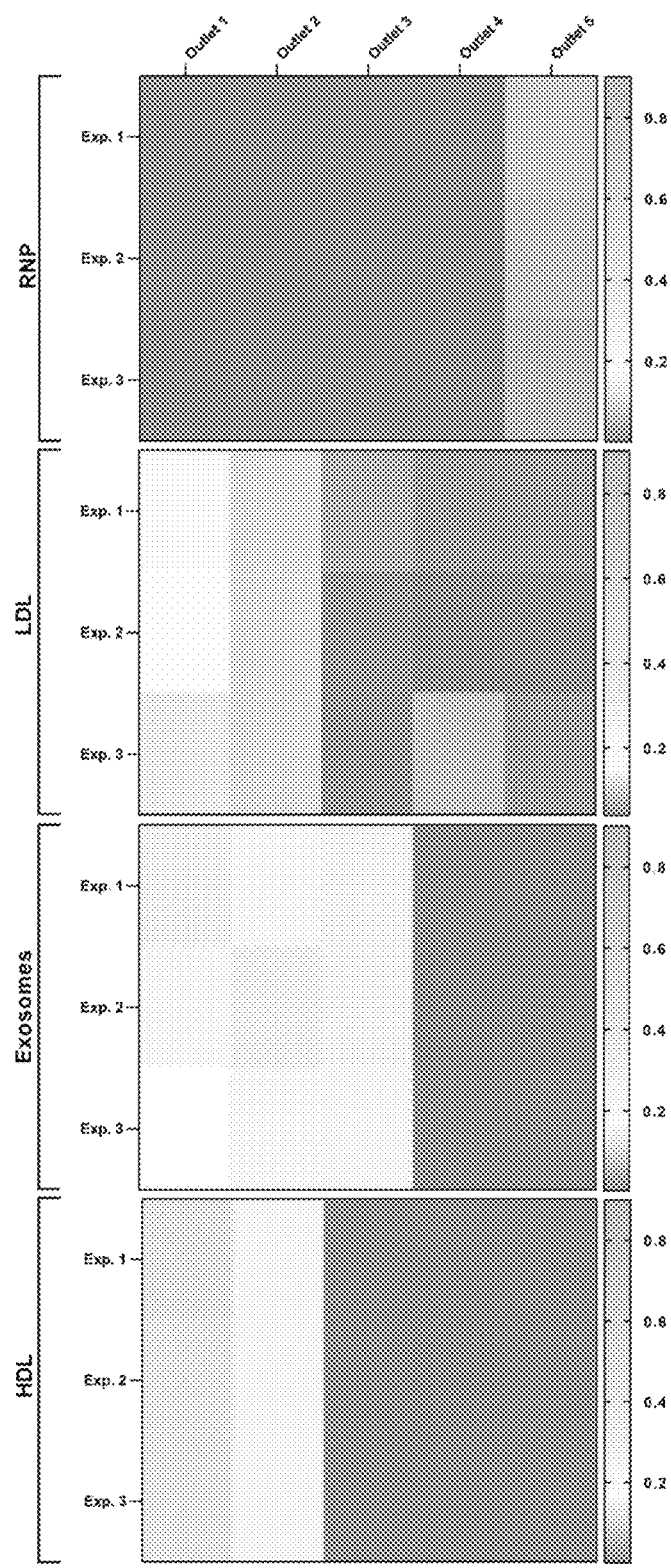
FIG. 22A-D show the fractionation of RNP from HDL, LDL, and extracellular vesicles (EVs) from human plasma.
Figure 22B:
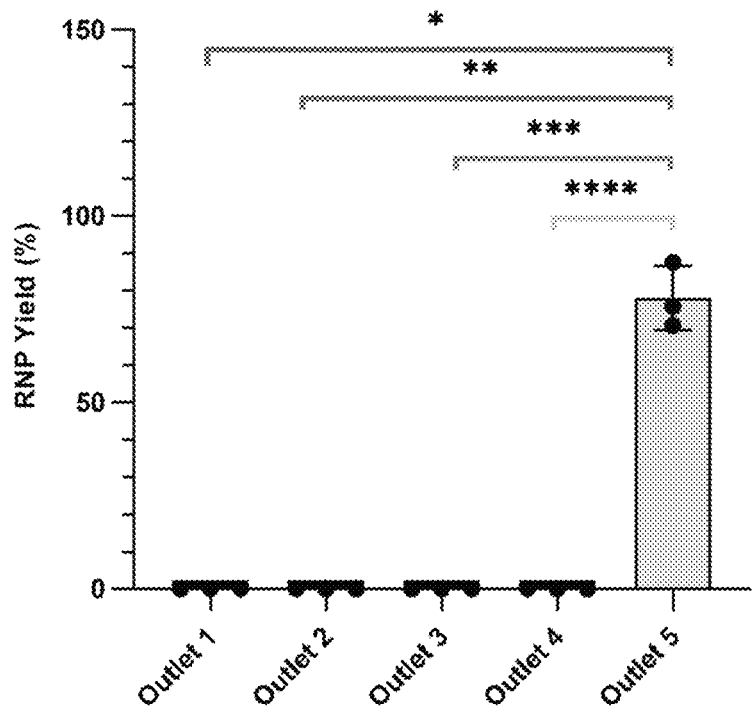
Figure 22C:
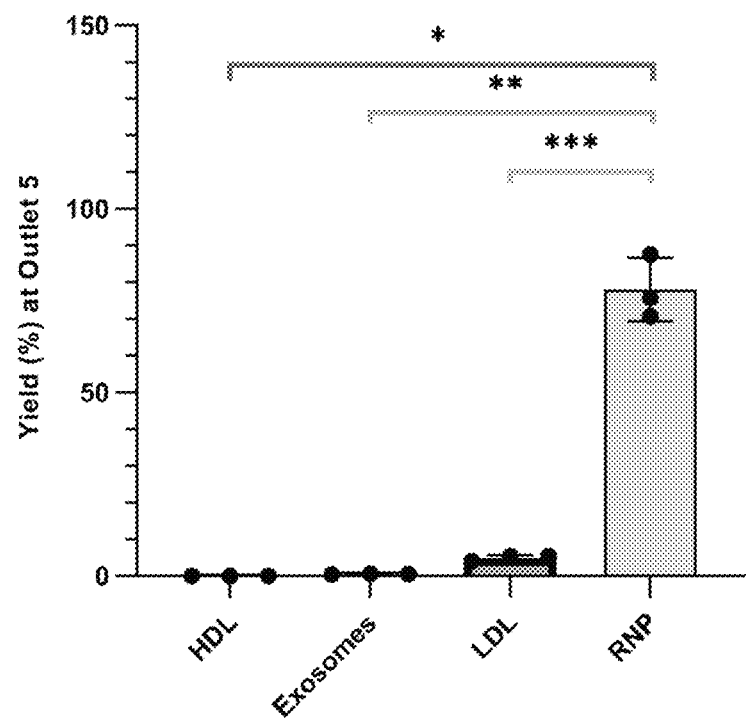
Figure 22D:
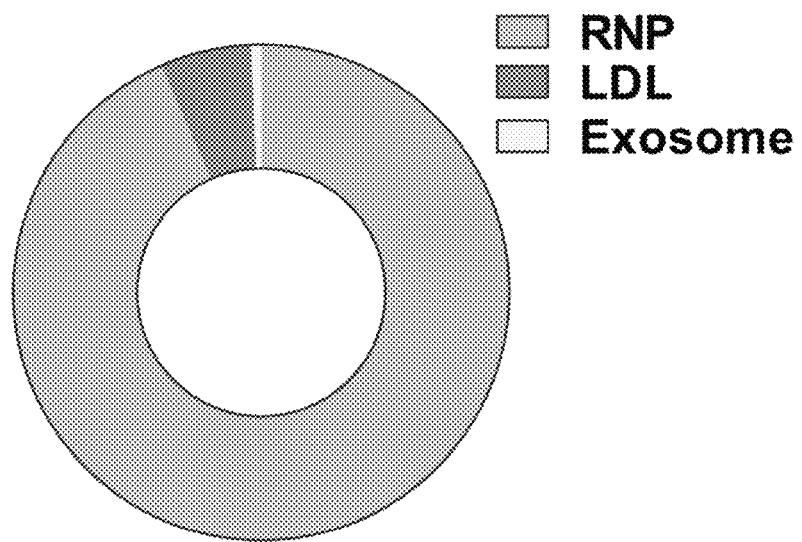

Cas9-miRNA21 RNP complex was added into 20× diluted healthy human plasma before injecting the sample into the separation chip. As described earlier, for quantitative assessments, the effluents collected from all the outlets of the chip were analyzed by ELISA, to determine the concentration profiles of RNP, HDL, LDL, and exosomes. FIG. 22A shows a series of heatmaps of RNP, LDL, exosomes, and HDL from each outlet of the separation chip for different experiments (n=3). The heatmaps clearly show high-purity separation of RNP from HDL, LDL, and exosomes in plasma with very little cross-contamination. Mostly, RNP is fractionated into outlet 5 while HDL and LDL exit from outlets 1 and 2. Exosomes on the other hand are obtained in outlets 1, 2 and 3. Closer data analysis reveals that the RNP yield obtained from outlet 5 (78.06±7.07%) is statistically significant across all experiments as compared to other outlets (FIG. 22B). Furthermore, the presence of other nanocarriers obtained in the RNP outlet was evaluated and the purity of RNP fractionation was determined to be 93.39±0.88% (FIGS. 22B and 22D). Therefore, this proof-of-concept study demonstrates the successful fractionation of RNP from HDL, LDL, and exosomes nanocarriers in 0.75 mL of plasma within 30 minutes using the difference in their isoelectric point, thus significantly outperforming established gold standard methods such as RIC and CLIP in terms of purity and throughput.

Figure 23:
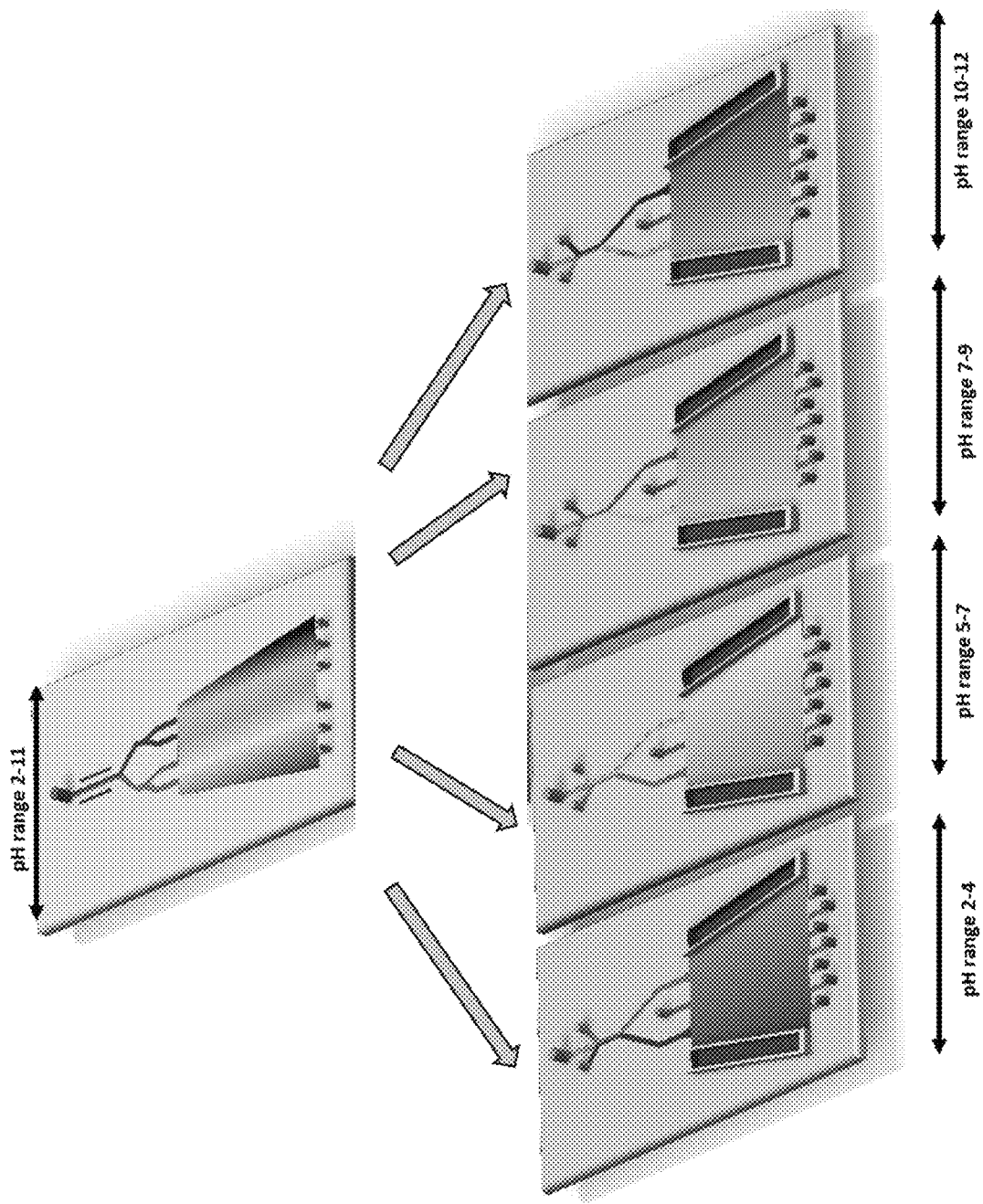
FIG. 23 shows a star topological configuration with a pH gradient chip being the central node and different separation chips acting as connected nodes.

Described herein is a bias-free, high throughput (~mL/hr) and continuous free-flow isoelectric separation device that allows binary fractionation and isolation of nanocarriers such as LLPs, RNP, and exosomes, as well fractionation of RNP from LLPs and exosomes in 20× diluted healthy human plasma at high yield and purity. This technology is uniquely based on the distinct isoelectric points of individual RNA nanocarriers (instead of size and density where significant overlap exists) allowing their fractionation within a residence time of ten seconds and with a minimum ΔpI resolution of 0.3. In the pH gradient chip, the applied voltage bias across two BiMs splits water into hydronium and hydroxide ions in a single microfluidic channel, thus overcoming the need for ampholytes or multiple acid/base buffer inflows. The linear pH profile results from the rapid equilibration of the inert ions to a no-flux Boltzmann equilibrium and reversible water dissociation at each location to maintain electroneutrality. The versatile amplification of the spatial pH resolution was demonstrated by extracting one portion of the full pH profile and expanding it in subsequent trapezoidal separation chip(s), further optimized by a machine learning procedure, as necessary for nanocarrier separation. Furthermore, this efficient, yet low-cost device has the potential to be used in a star topological configuration, with the pH gradient chip being the central node and different separation chips acting as connected nodes (FIG. 23) for high-throughput separation of multiple nanocarriers from a single 2 mL plasma sample. As multiplexed detection of different biomarkers is challenging due to wild type/inhibiting molecules, spectral overlap, and low sensitivity of biosensors, high throughput CIF-based purification can help enable bias-free and label-free separation leading to more accurate detection and quantification. This device represents a significant advancement as it overcomes the various limitations described earlier of commonly utilized traditional isolation technologies including ultracentrifugation, immunocapture, and ultrafiltration techniques.

Although there is enormous interest in extracellular RNA-carriers spanning basic laboratory research, the pharmaceutical industry and the clinic, the lack of carrier purification as well as unequivocally demonstrating the specific RNA pool as causative in physiological effects on target cells, are among the most significant challenges in this field. Since non-EV carriers fractionate with EVs during common isolation procedures, it is possible that while RNAs are contained within specific subtypes of EVs as reported in the literature, others are present in other carriers that co-isolate. The CIF-based purification described here alleviates these issues. Additionally, the CIF platform can be used to explore the heterogeneity of EVs such as fractionating different EV types with cargoes derived from cancer cells (e.g., GPC-1, Active EGFR, AR-V7). It will likely require multiple separation devices to achieve sufficient pH resolution. This technology can be used to purify other biological nanoparticles including virus vaccines, exosome drug carriers, amyloid-beta aggregates, and peptide assemblies.

What is claimed:

1. A system for continuous isoelectric fractionation and isolation of a plurality of biomolecules with high resolution, the system comprising:
a microfluidic device comprising:
a plurality of chips comprising:
a first chip comprising:
a water inlet;
a bipolar membrane junction;
a first chip microchannel capillary network;
a first chip chamber comprising a gradually diverging or widening geometry configured to generate an initial coarse pH gradient running transverse to a fluid flow; and
one or more first chip outlets, fluidly connected to one or more subsequent separation chips via a separation chip inlet; and
one or more subsequent separation chips comprising:
one or more separation chip inlets fluidly connected to the one or more first chip outlets;
a sample inlet fluidly connected to a separation chip chamber, the sample inlet being configured to load a biological sample containing the plurality of biomolecules;
the separation chip chamber fluidly connected to the one or more separation chip inlets and the sample inlet, the separation chip chamber comprising a gradually diverging or widening geometry configured to generate a fine pH gradient running transverse to the fluid flow;
a separation chip microchannel capillary network fluidly connecting the one or more separation chip inlets and the separation chip chamber;
a positive electrode and a negative electrode configured to apply a current across the separation chip chamber; and
one or more separation chip outlets; and
fluid connections between the one or more first chip outlets and the one or more separation chip inlets for the transfer of select subset pH zones from the first chip to the one or more subsequent separation chips;
a voltage source connected to the microfluidic device; and
a pump connected to the microfluidic device for inducing the fluid flow.

2. The system of claim 1, wherein the bipolar membrane junction comprises an ion-exchange membrane-based bipolar junction comprising a plurality of ion-exchange membranes, a positive electrode, and a negative electrode.

3. The system of claim 2, wherein the plurality of ion-exchange membranes comprises one or more cation exchange membranes and one or more anion exchange membranes.

4. The system of claim 3, wherein each of the one or more cation exchange membranes and the one or more anion exchange membranes has a thickness of about 400 μm to about 700 μm.

5. The system of claim 4, wherein each of the one or more cation exchange membranes and the one or more anion exchange membranes has a thickness of about 500 µm to about 600 µm.

6. The system of claim 1, wherein the bipolar membrane junction is configured to dissociate water into $H_3O^+$ and $OH^-$ ions.

7. The system of claim 6, wherein the first chip microchannel capillary network partitions the $H_3O^+$ and $OH^-$ ions downstream of the bipolar membrane junction.

8. The system of claim 1, wherein the first chip microchannel capillary network is connected to the first chip chamber through a first chip microchannel capillary network outlet and a first chip chamber inlet.

9. The system of claim 8, wherein the connection between the first chip microchannel capillary network outlet and the first chip chamber inlet has an angle of about 45°.

10. The system of claim 1, wherein the initial coarse pH gradient is from about pH 0.5 to about 13.5.

11. The system of claim 10, wherein the initial coarse pH gradient is from about pH 2 to about 11.

12. The system of claim 1, wherein the fine pH gradient comprises a pH gradient encompassing a pH range between any two pH values from about 0.5 to about 13.5.

13. The system of claim 1, wherein the plurality of chips are formed from one or more materials comprising one or more of polyethylene terephthalate (PET), polycarbonate (PC), polypropylene (PP), polyimide (PI), or polyethersulphone (PES).

14. The system of claim 1, wherein the fluid connections comprise one or more tube components formed from one or more materials comprising one or more of polyethylene terephthalate (PET), polycarbonate (PC), polypropylene (PP), polyimide (PI), polyethersulphone (PES), or silicone.

15. The system of claim 1, wherein the first chip chamber has a trapezoidal-shaped geometry.

16. The system of claim 15, wherein the trapezoidal-shaped geometry has dimensions equal to about 20 mm×26 mm×37 mm.

17. The system of claim 1, wherein the separation chip chamber has a trapezoidal-shaped geometry.

18. The system of claim 17, wherein the trapezoidal-shaped geometry has dimensions equal to about 9 mm×26 mm×37 mm.

19. The system of claim 1, wherein the select subset pH zones transferred from the first chip to the one or more subsequent separation chips are based on the specific isoelectric points of the plurality of biomolecules.

20. The system of claim 1, wherein the plurality of biomolecules comprises extracellular RNA (exRNA) nanocarriers comprising extracellular vesicles, lipoproteins, ribonucleoproteins, or combinations thereof.

21. The system of claim 20, wherein the plurality of biomolecules comprises small extracellular vesicles, large extracellular vesicles, exosomes, high-density lipoproteins, low-density lipoproteins, very-low-density lipoproteins, ribonucleoproteins, or combinations thereof.

22. The system of claim 1, wherein the voltage source is configured to apply a voltage (V) of about 20 V to about 220 V to the microfluidic device.

23. A system for continuous isoelectric fractionation and isolation of a plurality of extracellular RNA (exRNA) nanocarriers with high resolution, the system comprising:
a microfluidic device comprising:
a plurality of chips formed from one or more materials comprising one or more of polyethylene terephthalate (PET), polycarbonate (PC), polypropylene (PP), polyimide (PI), or polyethersulphone (PES), the plurality of chips comprising:
a first chip comprising:
a water inlet;
an ion-exchange membrane-based bipolar junction configured to dissociate water into $H_3O^+$ and $OH^-$ ions, the bipolar junction comprising one or more cation exchange membranes and one or more anion exchange membranes, a positive electrode, and a negative electrode, wherein each of the one or more cation exchange membranes and the one or more anion exchange membranes has a thickness of about 500 µm to about 600 µm;
a first chip microchannel capillary network positioned downstream of the ion-exchange membrane-based bipolar junction and configured to partition the $H_3O^+$ and $OH^-$ ions;
a first chip chamber comprising a trapezoidal-shaped geometry and configured to generate an initial coarse pH gradient running transverse to a fluid flow, wherein the first chip microchannel capillary network is connected to the first chip chamber through a first chip microchannel capillary network outlet and a first chip chamber inlet at an angle of about 45°, and wherein the initial coarse pH gradient is from about pH 0.5 to about 13.5; and
one or more first chip outlets, fluidly connected to one or more subsequent separation chips via a separation chip inlet; and
one or more subsequent separation chips comprising:
one or more separation chip inlets fluidly connected to the one or more first chip outlets;
a sample inlet fluidly connected to a separation chip chamber, the sample inlet being configured to load a biological sample containing the plurality of exRNA nanocarriers;
the separation chip chamber fluidly connected to the one or more separation chip inlets and the sample inlet, the separation chip chamber comprising a trapezoidal-shaped geometry configured to generate a fine pH gradient running transverse to the fluid flow, wherein the fine pH gradient comprises a pH gradient encompassing a pH range between any two pH values from about 0.5 to about 13.5;
a separation chip microchannel capillary network positioned downstream of the one or more separation chip inlets, fluidly connecting the one or more separation chip inlets and the separation chip chamber, and configured to partition the $H_3O^+$ and $OH^-$ ions;
a positive electrode and a negative electrode configured to apply a current across the separation chip chamber; and
one or more separation chip outlets, wherein the plurality of exRNA nanocarriers are fractionated into different separation chip outlets based on the specific isoelectric points of the plurality of exRNA nanocarriers; and
fluid connections between the one or more first chip outlets and the one or more separation chip inlets for the transfer of select subset pH zones from the first chip to the one or more subsequent separation chips, wherein the fluid connections comprise silicone tubing, and wherein the select subset pH zones transferred from the first chip to the one or more subsequent separation chips are based on the specific isoelectric points of the plurality of exRNA nanocarriers;
a voltage source configured to apply a voltage (V) of about 20 V to about 220 V to the microfluidic device; and
a pump connected to the microfluidic device for inducing the fluid flow.

* * * * *